United States Patent
Wang et al.

(10) Patent No.: US 11,343,142 B1
(45) Date of Patent: May 24, 2022

(54) DATA MODEL DRIVEN DESIGN OF DATA PIPELINES CONFIGURED ON A CLOUD PLATFORM

(71) Applicant: Humana Inc., Louisville, KY (US)

(72) Inventors: Huaxia Wang, San Jose, CA (US); Padma Sriram, Cupertino, CA (US); Yuan Yao, Santa Clara, CA (US); Bing Zhang, Pleasanton, CA (US)

(73) Assignee: Humana Inc., Louisville, KY (US)

( * ) Notice: Subject to any disclaimer, the term of this patent is extended or adjusted under 35 U.S.C. 154(b) by 0 days.

(21) Appl. No.: 17/402,379

(22) Filed: Aug. 13, 2021

Related U.S. Application Data

(60) Provisional application No. 63/175,283, filed on Apr. 15, 2021.

(51) Int. Cl.
  *G06F 15/173* (2006.01)
  *H04L 41/0813* (2022.01)
  *G06F 9/38* (2018.01)

(52) U.S. Cl.
  CPC ........ *H04L 41/0813* (2013.01); *G06F 9/3867* (2013.01)

(58) Field of Classification Search
  CPC ............................ H04L 41/0813; G06F 9/3867
  See application file for complete search history.

(56) References Cited

U.S. PATENT DOCUMENTS

| | | | |
|---|---|---|---|
| 9,020,945 B1 * | 4/2015 | Hollister | G06F 16/285 707/737 |
| 9,483,622 B1 * | 11/2016 | Snyder | G06F 3/0482 |
| 9,741,197 B2 * | 8/2017 | Ghouri | G07F 9/002 |
| 10,118,773 B2 * | 11/2018 | Mahar | B65G 47/71 |
| 10,163,175 B2 * | 12/2018 | Stephenson | G16H 20/00 |
| 10,179,706 B2 * | 1/2019 | Kapadia | B65G 47/682 |
| 10,263,946 B2 * | 4/2019 | Fehling | G06Q 10/107 |
| 10,540,478 B2 * | 1/2020 | Singh | G16H 50/30 |
| 10,643,750 B2 * | 5/2020 | Ghouri | G16H 10/60 |
| 2006/0283930 A1 * | 12/2006 | Shafer | H04L 67/327 235/375 |
| 2019/0354720 A1 * | 11/2019 | Tucker | G06N 5/02 |

* cited by examiner

*Primary Examiner* — Thanh T Nguyen
(74) *Attorney, Agent, or Firm* — Fenwick & West LLP

(57) ABSTRACT

A system performs continuous delivery of a data pipeline on a cloud platform. The system receives a specification of the data pipeline comprising data pipeline units. The system generates a deployment package for each data pipeline unit for a cloud platform. The system provisions computing infrastructure on the cloud platform according to the system configuration of the data pipeline unit. The data pipeline may be implemented as a data mesh. The data pipeline generates one or more data models. The system receives a schema representing a modification in a data model based on a change in the requirements of a consumer system. The system determines the changes to the data pipeline based on the received schema and reconfigures the data pipeline to generate the modified data model. The system manages access control of data to minimize the exposure to data in case of accidental or malicious data breach.

20 Claims, 39 Drawing Sheets

FIG. 1F

Analytic Labs  My STARS Report 1  (Draft) ⌄

— 165

How to prepare data with your T-SQL prep environment:

1. Connect to your provisioned Azure SQL database:

Connection String
   ```
   Server=tcp:myserver.database.windows.net,1433;Database=myDatabase;
   UserID=mylogin@myserver;Password=myPassword;Trusted_Connection=True;
   Encrypt=True;
   ```
   [Copy to Clipboard]

[Launch local SQL client]    [View in Azure SQL Console]

2. Use the entry point stored procedure SP_prep_data and sourced input table views to project your output data views 3. Once you're done, you can select the data you want to serve as outputs of your data product under the "Outputs" menu

- Overview
- Inputs
- Preparation
- Outputs
- Certification

FIG. 1G

DATA MODEL DRIVEN DESIGN OF DATA PIPELINES CONFIGURED ON A CLOUD PLATFORM

CROSS-REFERENCE TO RELATED APPLICATION

This application claims the benefit of U.S. Provisional Application No. 63/175,283, filed on Apr. 15, 2021, which is incorporated by reference in its entirety.

FIELD OF INVENTION

The disclosure relates to cloud platform-based systems in general and more specifically to managing access control of data pipelines configured on a cloud platform.

BACKGROUND

Organizations are increasingly storing and processing large amount of data. Organizations often store their data in a repository that allows storage of unstructured and structured data, referred to as data lakes. Monolithic data lakes and other large centralized data storage and access systems complicate management of resource used for processing data. Large data lakes can also make it difficult for non-technical users to access and interact with relevant data. Organizations often find it difficult to predict the amount of resources needed for processing the data stored in the data lakes. Organizations are increasingly using cloud platforms for their infrastructure needs. Cloud platforms provide infrastructure that can be scaled on demand including computing resources, storage resources, networking, software, and so on. Examples of such cloud platforms include MICROSOFT AZURE, GOOGLE CLOUD PLATFORM (GCP), AMAZON WEB SERVICES (AWS), and so on. Cloud platform-based systems are used for continuous integration/continuous delivery of software artifacts. However, managing cloud resources requires expertise and may introduce new problems in addition to the complications already present in such large systems.

Conventional techniques for complex data processing use monolithic architecture that integrates large systems for an organization such as relational databases, extract transform and load (ETL) tools, and data analytics tools. Such monolithic architectures are complex and difficult to manage. Any change to such a monolithic architecture is a complex project that requires significant development resources and computing resources and often has significant downtime. For example, such an architecture can only be modified by developers that have deep technical understanding of various systems that form part of the architecture and also have familiarity with the system. Furthermore, there are challenges in making changes to such monolithic architectures. For example, changes in the requirements or the interface to the architecture often requires making changes that affect the entire architecture and may require rebuilding the entire system. Furthermore, such large data lakes are difficult to customize for different use cases. Therefore, these systems have low reusability and are difficult to manage and modify.

SUMMARY

A system configures and executes data pipelines on cloud platforms. The system performs continuous integration/continuous delivery of updates to the data pipeline based on changes to declarative specifications based on schemas that define the data model output by the data pipeline.

The system receives a specification of a data pipeline comprising a plurality of data pipeline units. The data pipeline generates output representing a data model associated with an application. The data model conforms to a schema, for example, an original interoperability schema. An interoperability schema defines format for exchanging data across computer systems independent of the format of storage of the data in the computer systems. For each data pipeline unit of the data pipeline, the system generates instructions for configuring the data pipeline unit on the cloud platform from the specification of the data pipeline unit. The system deploys the data pipeline on the cloud platform using the generated instructions.

In an embodiment, the generated instructions comprise: (1) a system configuration for the data pipeline unit, the system configuration comprising instructions for configuring: one or more storage units on the cloud platform, a cluster of servers for execution of the data pipeline unit on the cloud platform, and one or more processing engines for executing instructions of the data pipeline unit, and (2) a deployment package comprising: data flow instructions for orchestrating the flow of data across resources of the data pipeline unit, and a transformation processing instructions package for performing the one or more data transformations of the data pipeline unit.

The system may modify an existing data pipeline unit to generate the modified data model. For example, the system may identify a data pipeline unit of the data pipeline that generates all elements of the modified interoperability schema. If the data pipeline unit generates a set $S_i$ of outputs, the system modifies the data pipeline unit to generate a set $S_o$ of outputs representing the modified data model.

The system may modify the structure of the data pipeline by adding data pipeline units. For example, the system identifies a data pipeline unit $D_1$ that generates a subset $S_1$ of elements of the modified interoperability schema and a data pipeline unit $D_2$ that generates a subset $S_2$ of elements of the modified interoperability schema. The system generates a data pipeline unit $D_3$ that receives inputs from the data pipeline unit $D_1$ and the data pipeline unit $D_2$ and generates a set of outputs representing the modified data model.

The system further receives a differential interoperability schema representing a modification to the data model associated with the application. The differential interoperability schema specifies differences compared to the original interoperability schema. The system generates a set of instructions to modify the data pipeline. The modified data pipeline generates outputs representing a modified data model conforming to a composition of the original interoperability schema and the differential interoperability schema. The system reconfigures the data pipeline on the cloud platform based on the generated instructions. The system executes the reconfigured data pipeline on the cloud platform to provide data conforming to the modified data model to the application.

The techniques disclosed herein provide various benefits including distributed execution of data pipeline, modular upgrades to portions of data pipeline, selecting re-execution of the data pipeline, decentralized ownership and scaling using autonomous teams and individual data pipeline development, and so on.

The techniques disclosed herein may be implemented as computer-implemented methods, computer instructions stored on non-transitory computer readable storage medium, and computer systems comprising computer processors and non-transitory computer readable storage medium.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 1F-H show screenshots of user interfaces for receiving user input for specifying attributes of a data pipeline unit according to an embodiment.

Figure 1A:
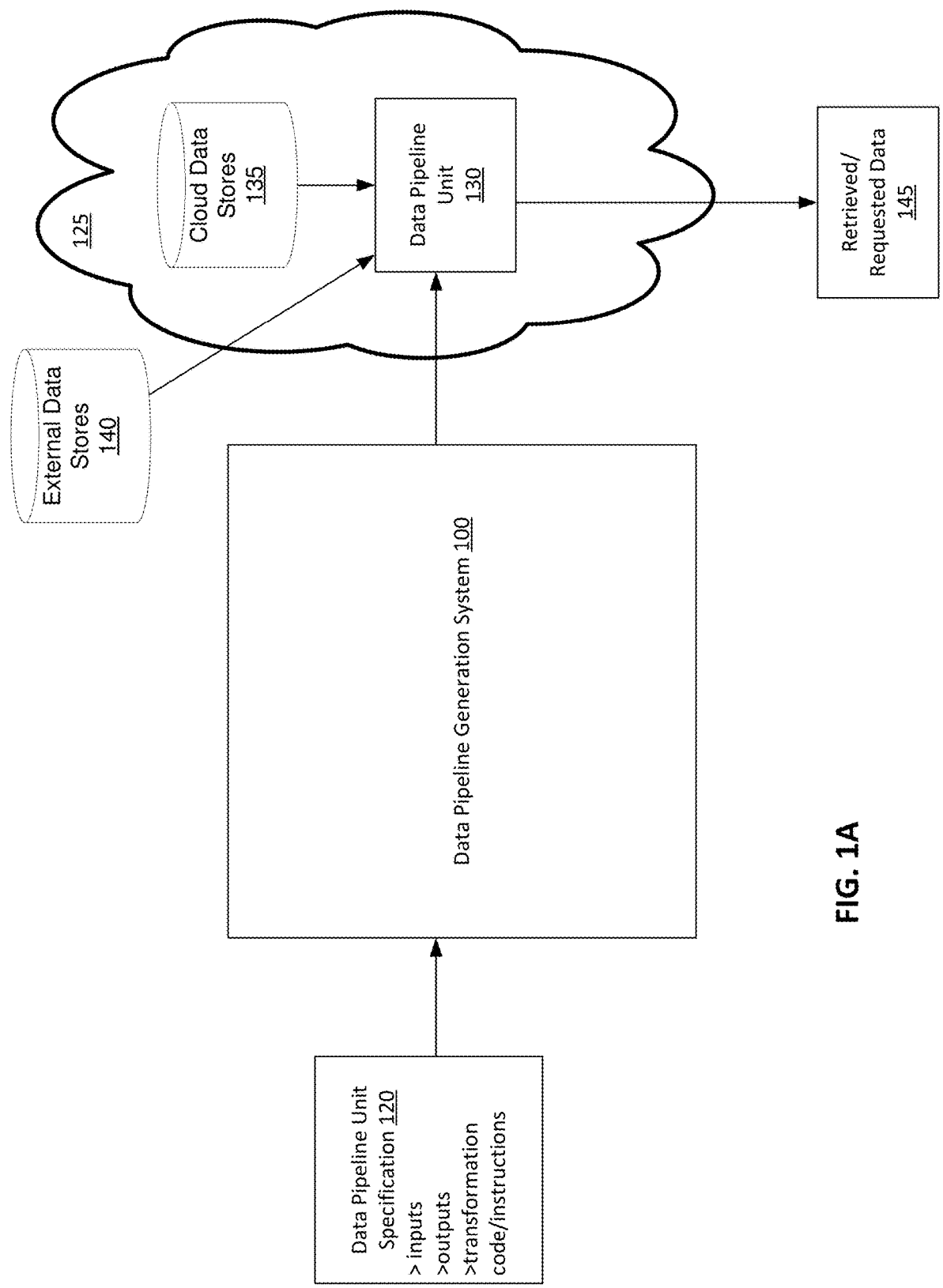
FIG. 1A shows the overall system environment of a system configured to create and use data pipeline units, according to an embodiment.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

A system according to various embodiments implements a data pipeline on a cloud platform. The system performs continuous delivery of the data pipeline on the cloud platform. The system receives a specification of a data pipeline. The specification of the data pipeline is represented in a declarative fashion that describes the structure and behavior of the data pipeline rather than providing a procedure for implementing the data pipeline. The specification of the data pipeline is split into smaller specifications of data pipeline units. Each data pipeline unit can be specified independent of other data pipeline units and managed independent of the other data pipeline units.

According to an embodiment, the specification of a data pipeline unit describes: (1) inputs of the data pipeline unit, (2) outputs of the data pipeline unit, (3) one or more storage units used by the data pipeline unit, and (4) one or more data transformations performed by the data pipeline unit. The system identifies a target cloud platform for deployment and execution of the data pipeline. The system generates instructions for deploying and executing the data pipeline unit on the target cloud platform from the specification of the data pipeline unit. The generated instructions package includes (a) a system configuration for the data pipeline unit and (b) a deployment package. The system configuration comprises instructions for configuring (1) one or more storage units on the cloud platform, (2) a cluster of servers for execution of the data pipeline unit on the cloud platform, and (3) one or more processing engines (or applications) for executing instructions of the data pipeline unit. The deployment package comprises (1) data flow instructions for orchestrating the flow of data across the data pipeline unit, and (2) transformation processing instructions for performing the data transformations of the data pipeline unit.

The system creates a connection with the target cloud platform. The system uses the connection to provision computing infrastructure on the target cloud platform for the data pipeline unit according to the system configuration of the data pipeline unit. Examples of computing infrastructure include processor, computer storage, network, memory, and so on. Subsequently, if the data pipeline deployed on the target cloud platform receives input data, the data flow instructions stored in the deployment package of various data pipeline units of the data pipeline are executed for processing the input data. The data pipeline unit accepts data in multiple formats and transforms the data into one or more specified output formats.

The data pipeline units are used modularly to form a data mesh architecture that represents a set of data pipeline units interacting with each other such that a data pipeline unit may perform data transformations individually, but may use input data that was output from other data pipeline units and provide data as input to other data pipeline units. For example, an input data pipeline unit may receive data from an external source and perform transformations to prepare and organize raw data inputs, while a subsequent data pipeline units receives the pre-processed data and transforms the data to generate common data that is useful for multiple purposes. The data from these data pipeline units is further processed by subsequent data pipeline units to adapt the data for specific purposes. The modular structure of individually provisioned data pipeline units enables improvements in privacy and authorization controls.

System Environment

FIG. 1A shows the overall system environment of a system configured to create and use data pipeline units, according to an embodiment. A data pipeline unit may also be referred to herein as a data analytics node, or a data product, or data processing unit. The cloud platform may also be referred to herein as a cloud computing system or a cloud computing platform.

The data pipeline generation system 100 receives a declarative specification of a data pipeline unit and generates and deploys a data pipeline unit 130 in a cloud platform 125. The declarative specification of the data pipeline unit specifies various attributes of a data pipeline unit including inputs of the data pipeline unit, outputs of the data pipeline unit, and possible transformations performed by the data pipeline unit to map the inputs to a data model and the data model to outputs of the data pipeline unit. The data model may be mapped to multiple sets of outputs, each set of outputs used for a different purpose, for example, each set of outputs may be used for a different project or used by a different team. An input of the data pipeline unit may be generated by another data pipeline unit. Alternatively, an input of the data pipeline unit may be received from a data source that may be an external data source or a data stored in a local data store. An output or a set of outputs may be provided as input to another data pipeline unit. Alternatively, an output or a set of outputs may be provided as the input of a system, for example, an external system, or stored within a storage for consumption by another system. The data pipeline generation system interacts with a deployment system, such as a cloud web service to allocate the computing infrastructure for the data pipeline unit. When a data pipeline unit is established on a cloud computing system, the data pipeline generation system may maintain information about the status of the data pipeline unit. The data pipeline generation system 100 may also be referred to herein as an online system or a system.

The data pipeline generation system 100 processes the declarative specification of the data pipeline unit to generate the data pipeline unit 130. In an embodiment, the data pipeline unit 130 is deployed on a cloud platform 125. The deployed data pipeline unit 130 is configured to receive the input from cloud data stores 135 or from external data stores 140. The deployed data pipeline unit 130 receives the input data and processes the input data to generate output 145 that may be retrieved or requested by a system, for example, another data pipeline unit 130.

Client devices may be used by a user for interacting with the data pipeline generation system 100. A client device can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device can be any device having computer functionality, such as a personal digital assistant (PDA), mobile telephone, smartphone, wearable device, etc.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

The interactions between the client devices and the online system are typically performed via a network, for example, via the Internet. The network enables communications between the client device 105 and the online system. In one embodiment, the network uses standard communications technologies and/or protocols. The data exchanged over the network can be represented using technologies and/or formats including the hypertext markup language (HTML), the extensible markup language (XML), YAML, JSON (JavaScript object notation), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

Figure 1B:
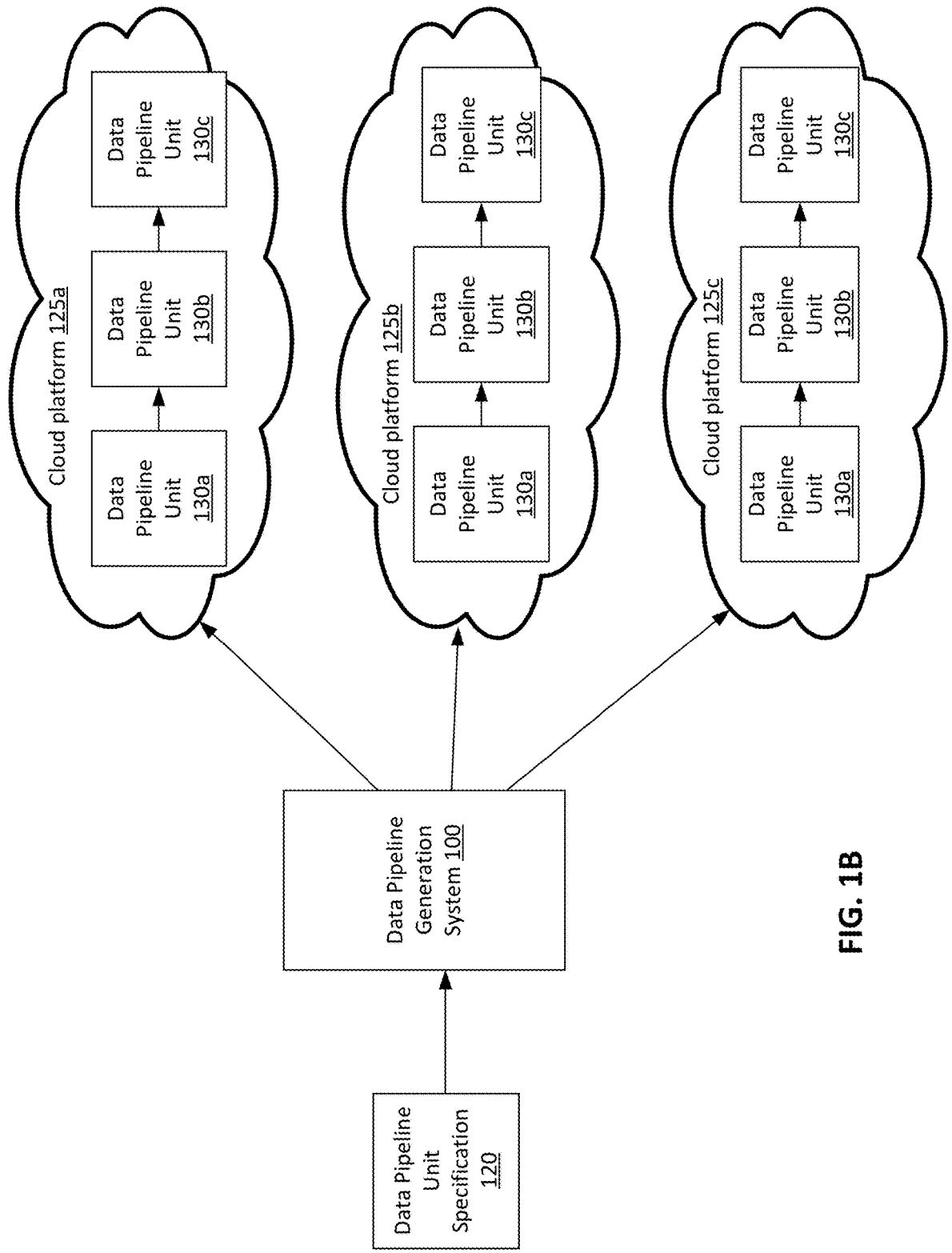
FIG. 1B shows the system environment of a system configured to create and deploy data pipelines across multiple cloud platforms from the same data pipeline unit specification, according to an embodiment.
Figure 1C:
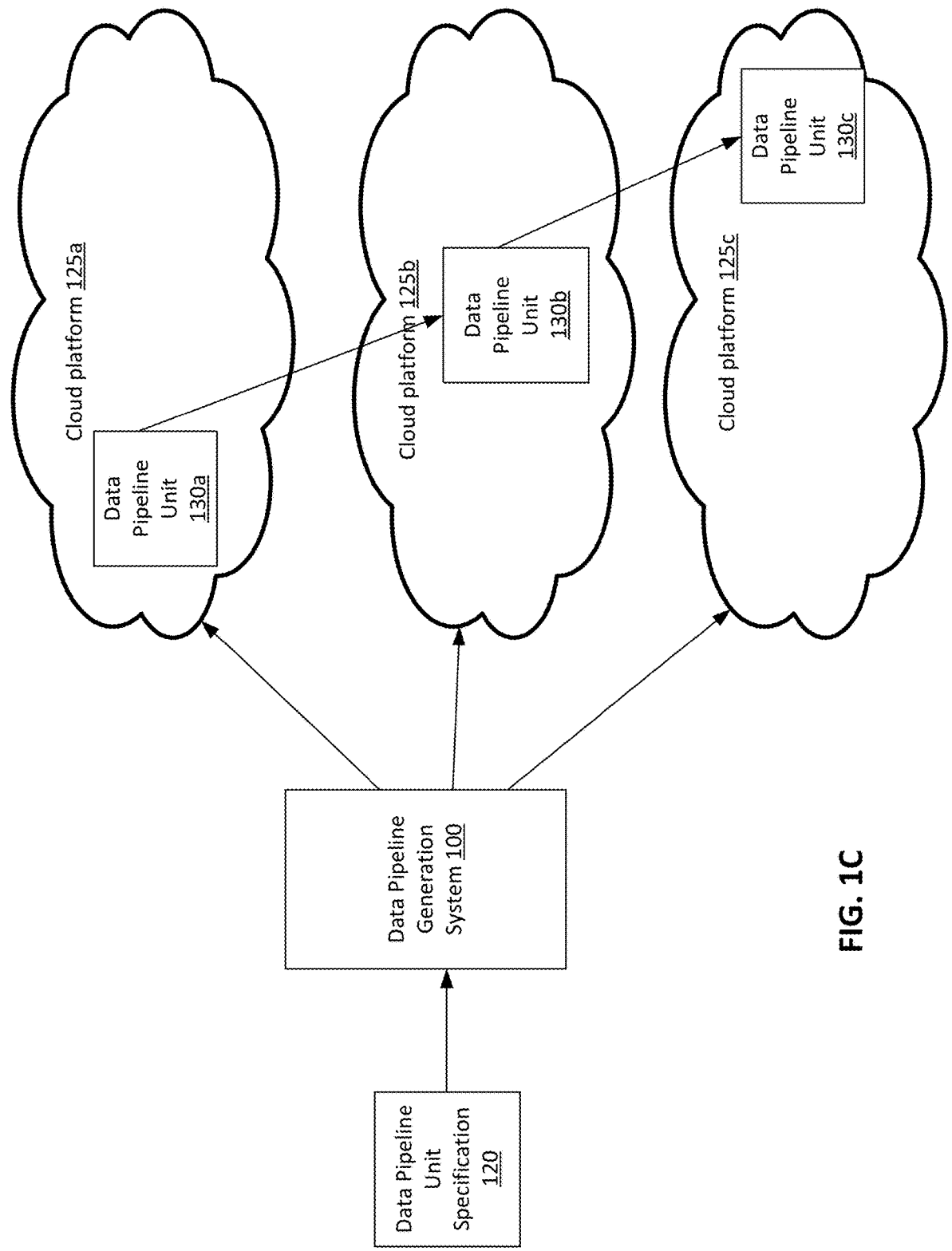
FIG. 1C shows the system environment of a system configured to create and execute data pipeline distributed across multiple cloud platforms, according to an embodiment.

FIG. 1B shows the system environment of a system configured to create and reuse data pipeline unit specification across multiple cloud platforms, according to an embodiment. As illustrated in FIG. 1B, the data pipeline unit specification 120 is cloud platform independent. Accordingly, the same data pipeline unit specification can be used to deploy and execute the data pipeline units, for example, 130a, 130b, 130c on different cloud platforms 125a, 125b, and 125c. For example, cloud platform 125a may be MICROSOFT AZURE, cloud platform 125b may be GOOGLE CLOUD PLATFORM (GCP), and cloud platform 125c may be AMAZON WEB SERVICES (AWS). Since the data pipeline unit specification 120 is cloud platform independent, the data pipeline specified using data pipeline unit specification 120 may be executed using multiple cloud platforms. FIG. 1C shows the system environment of a system configured to create and execute a data pipeline distributed across multiple cloud platforms, according to an embodiment. Accordingly, the data pipeline unit 130a is deployed and executed on cloud platform 125a, the data pipeline unit 130b is deployed and executed on cloud platform 125b, and the data pipeline unit 130c is deployed and executed on cloud platform 125c. APIs of specific cloud platforms may be used for communicating output of a data pipeline unit executing on one cloud platform to a data pipeline unit executing on another cloud platform.

Figure 1D:
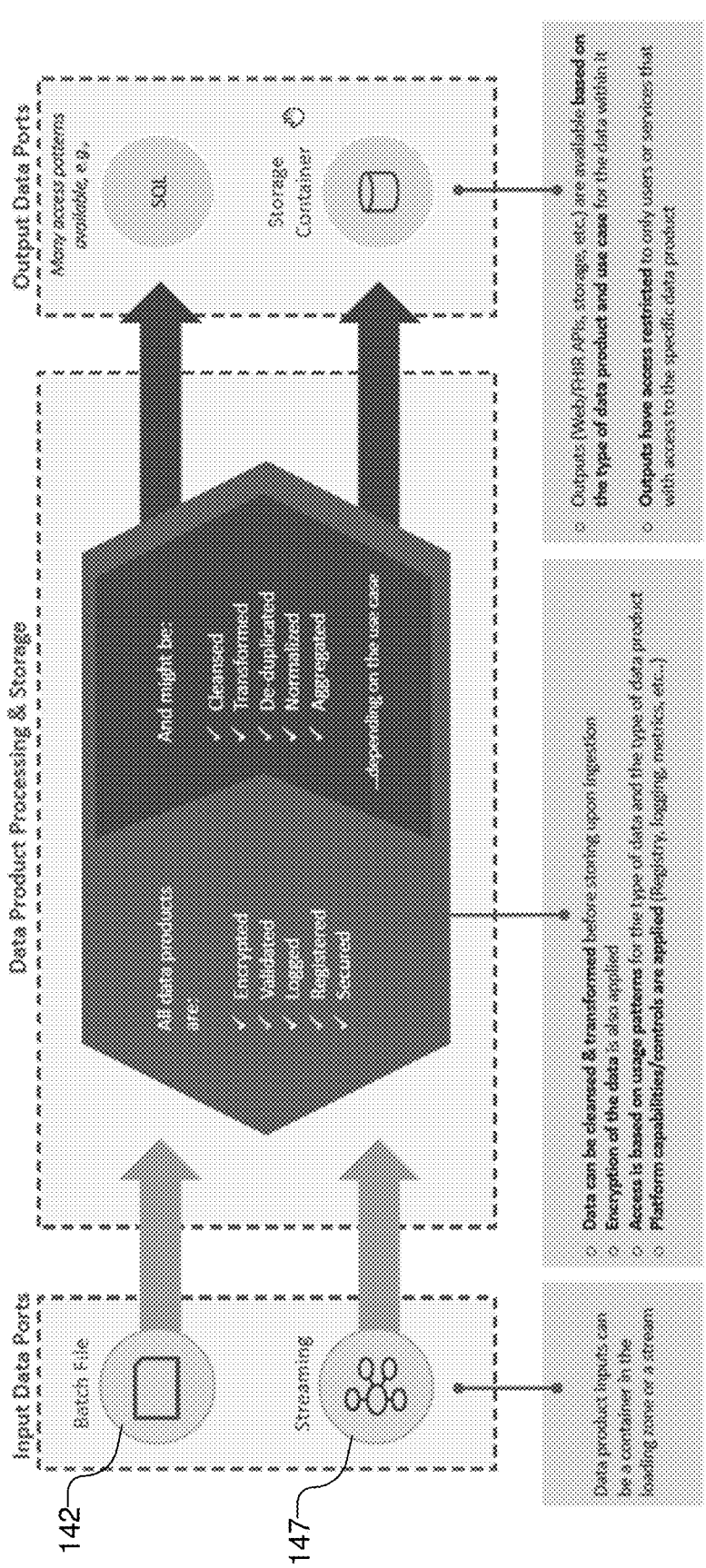
FIG. 1D shows an example data pipeline unit configuration and features, according to an embodiment.

FIG. 1D shows an example data pipeline unit configuration and features, according to an embodiment. The data pipeline unit has input data ports and output data ports. An input data port provides input data to the data port and may be a batch file 142 or a data stream 147. The input data may be a data set comprising a plurality of data elements or records. The data stream 147 provides data elements of the data set at different time points, for example, as a time series. The batch file provides all the data elements a data set at the same time as input such that the entire data set can be processed by the data pipeline unit at the same time.

The outputs may be provided as Web APIs or stored in a file. The APIs used for the output may depend on the domain for which the data pipeline units are being used. For example, for healthcare purposes, FHIR (Fast Healthcare Interoperability Resources 1) APIs may be used. The outputs are available based on the type of data pipeline unit and use case for the data within it. The system provides access to outputs of the data pipeline units to only users or services that have access to the specific data pipeline units.

Data pipeline units allow a complex process for data to be split into small manageable units that may be managed by specific groups of users or teams. The complex process is represented as a data pipeline comprising multiple data pipeline units that implement individual staged of the data pipeline. The use of data pipeline units allows fine grained management of access control of data within the complex data pipeline that allows for decentralized team ownership by managing user access control and service accounts. Data pipeline units are composable units such that sets of data pipeline units may be composed to achieve different results. Data pipeline units are composed by providing the outputs of a data pipeline unit as input to another data pipeline unit and repeating the process as necessary. Data pipeline units are also reusable units that allow the set of operations to be reused across multiple projects of teams. Data pipeline units allow the computation to be reused by mapping the data model to different sets of outputs that represent variations of the same data.

An individual data pipeline unit may perform different types of data processing including cleansing and transforming the data before storing upon ingestion and performing encryption of the data. For example, a transformation may modify the format of a field, a transformation may perform deduplication of data in a field, a transformation may mask the data of a field, a transformation may split a field into multiple fields, a transformation may combine multiple fields to generate a new field, a transformation may replace null values with a default values, and so on. A field may also be referred to as an attribute or a column. The data pipeline unit applies data access based on usage patterns for the type of data and the type of data pipeline unit. The data pipeline unit performs various activities based on the platform capabilities/controls, for example, registry, logging, metrics, etc.

A system can have many instances of data pipeline units. Various data pipeline units may interact with each other. For example, the output generated by a data pipeline unit may be provided as input to another data pipeline unit which may further process it and provide it as the output of the overall system or as input to another data pipeline unit. Different instances of data pipeline units can run in parallel, provided they have the input data available for processing. For example, if a data pipeline unit DP1 receives as input, data generated by another data pipeline unit DP2, there is a data dependency between DP2 and DP1 causing DP1 to wait for DP2 to provide the data. However as soon as the input data is available to DP1, the data pipeline unit DP1 can start execution. Accordingly, if there is no dependency between two data pipeline units that can run in parallel. Even data pipeline units that have dependencies can run in pipelined mode, for example, if the output of a data pipeline unit DP2 is provided as input to the data pipeline unit DP1 as a data stream.

Figure 1E:
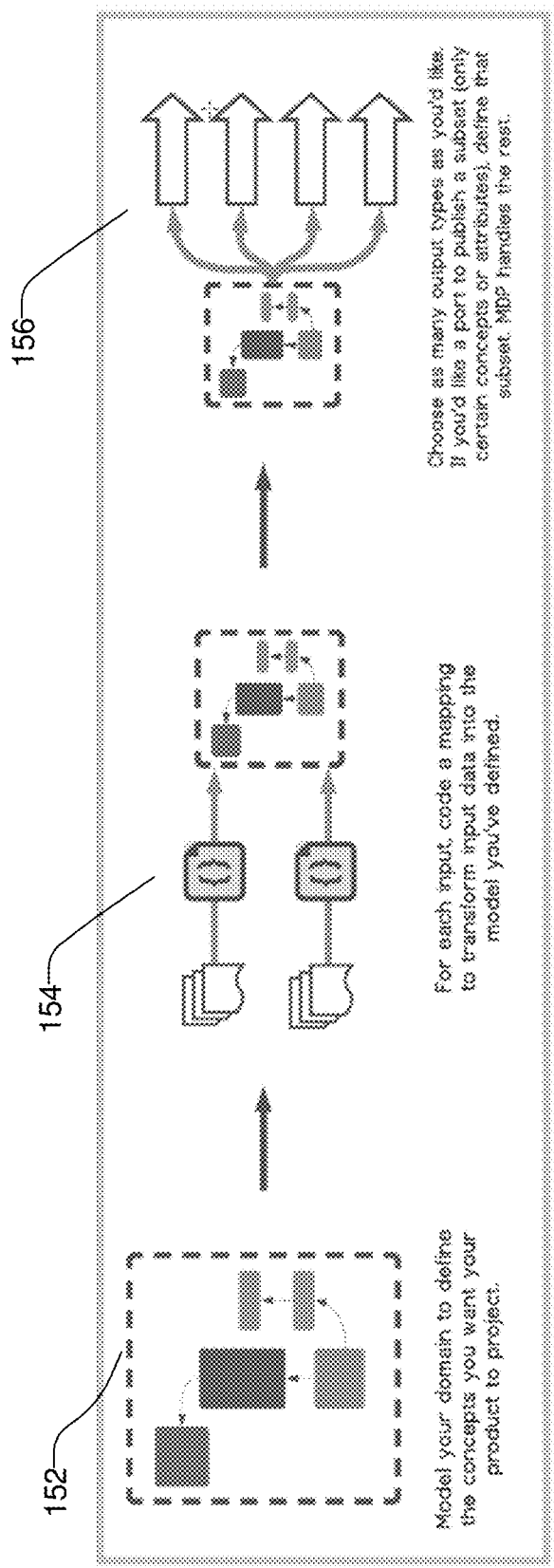
FIG. 1E shows an exemplary process for defining a data pipeline unit, according to an embodiment.

FIG. 1E shows an exemplary process for defining a data pipeline unit, according to an embodiment. A data pipeline unit is based on a common data model 152 that is based on a domain for which the data pipeline unit is being used. The users specify the inputs and provide mappings 154 to populate the common data model for the data pipeline unit. The users can specify one or more outputs 156 based on the common data model. The outputs project the data model in different ways using different transformations. For example, the projection may mask sensitive data, transform certain fields, and so on. These details are specified using a declarative specification of the data pipeline unit. Given the declarative specification, the system automatically implements the data pipeline unit.

Following is an example declarative specification for a data pipeline unit. As shown below, the declarative specification of a data pipeline unit may be provided using a text format such as a YAML file or using other formats such as XML, JSON, or using a proprietary syntax. The data pipeline unit specification includes various attributes such as name, type, meta-data, input ports, output ports, transformations, and so on.

```
data-pipeline-unit-name: user-coverage
data-pipeline-unit-type: native
meta-data:
metal:
   type: push
   endpoint: https://endpoint-url
input-ports:
input-port 1:
   name: CDF
   type: stream
   schema: schema1
   source_info: info 1
output-ports:
output-port1:
   name: output1
   type: stream
   schema: schema1
```

```
output-port2:
    name: output2
    type: blob
    schema: schema2
data-pipeline:
name: pipeline1
transformation:
type: batch
artifact: transformation_library.jar
```

The various sections of the declarative specification are described in further detail below.

Following is the portion of the specification of a data pipeline unit that specifies the inputs of the data pipeline unit. The input specifies a type of input, for example, stream or batch input, a contributor specifying a data source, and one or more datasets.

```
"inputs": [
    {
        "type": "type 1",
        "contributor": "c1"
        "dataset": "d1, d2"
    }
]
```

Following is the portion of the specification of a data pipeline unit that specifies the storage used by the data pipeline unit. The internal storage specifies a storage type, for example, a blob, and one or more datasets.

```
"internal_storage": [
    {
        "storage_type": "blob",
        "dataset": "d1, d2"
    }
]
```

Following is the portion of the specification of a data pipeline unit that specifies the transformations used by the data pipeline unit. In an embodiment, the transformations are specified as a pipeline comprising a sequence of operations, each operation performing a portion of the transformation. Each operation of the pipeline is represented using a set of attributes comprising (1) a transformation type, for example, a simple operation such as a copy operation, an operation invoking a library, and so on; (2) a trigger type (attribute:trigger_type") specifying a criteria that causes the operation to be performed, for example, an occurrence of an event that triggers the data pipeline unit to start processing the input; the trigger type may be based on availability of data at the input, for example, for stream data or based on a predefined time-based schedule; (3) a source (attribute "from") of the input for the operation, for example a data set defined in the output field of the data pipeline unit; and (4) a target (attribute "to") of the operation that specifies where the output of the operation is provided or stored, for example, a data set defined in the output field of the data pipeline unit.

```
"pipeline": [
    "input to raw": {
        "transform_type": "copy",
        "trigger_type": "event",
        "from": "dataset-a"
        "to": "raw-dataset-a"
    }
```

```
    "raw_to_native": {
        "transform_type": "application1",
        "trigger_type": "event",
        "transformation": "library1"
        "from": "raw-dataset-a"
        "to": "native-dataset-a"
    },
]
```

Following is the portion of the specification of a data pipeline unit that specifies the outputs of the data pipeline unit. The specification maps a dataset used by the data pipeline unit to output data sets using projections. The specification specifies a type of classification that indicates whether the output port should treat the data as sensitive. If the classification is specified for a port as sensitive, the system may perform transformations, for example, pseudonymization of specific fields or masking of specific fields.

```
"outputs": {
    "output-dataset-a": {
        "projections": {
            "native-dataset-a": {
                "port_type": "blob",
                "classification": "sensitive"
            }
        }
    },
    "output-dataset-b": {
        "projections": {
            "native-dataset-b": {
                "porttype": "blob",
                "classification": "sensitive"
            }
        }
    },
]
```

Although the declarative specification of the data pipeline unit is illustrated using the above syntax, the techniques disclosed are not limited to any particular syntax. Some embodiments support programmatic APIs (application programming interfaces) for specifying the various attributes of the data pipeline unit declarative specification. Some embodiments allow users to specify attributes of a declarative specification using a user interface, for example, a graphical user interface with widgets that allow users to specify values of various attributes of the declarative specification.

Figure 1F:
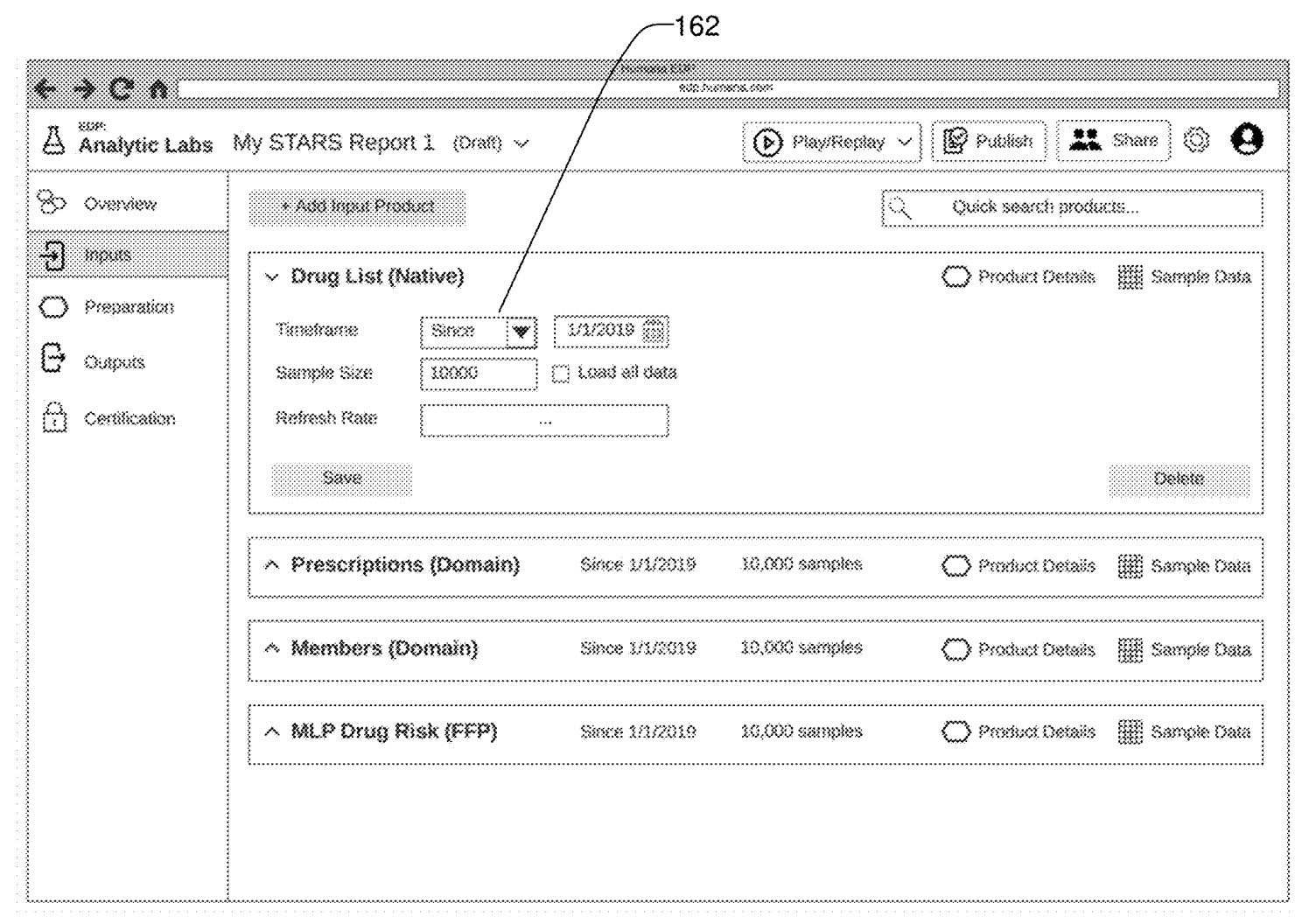
Figure 1H:
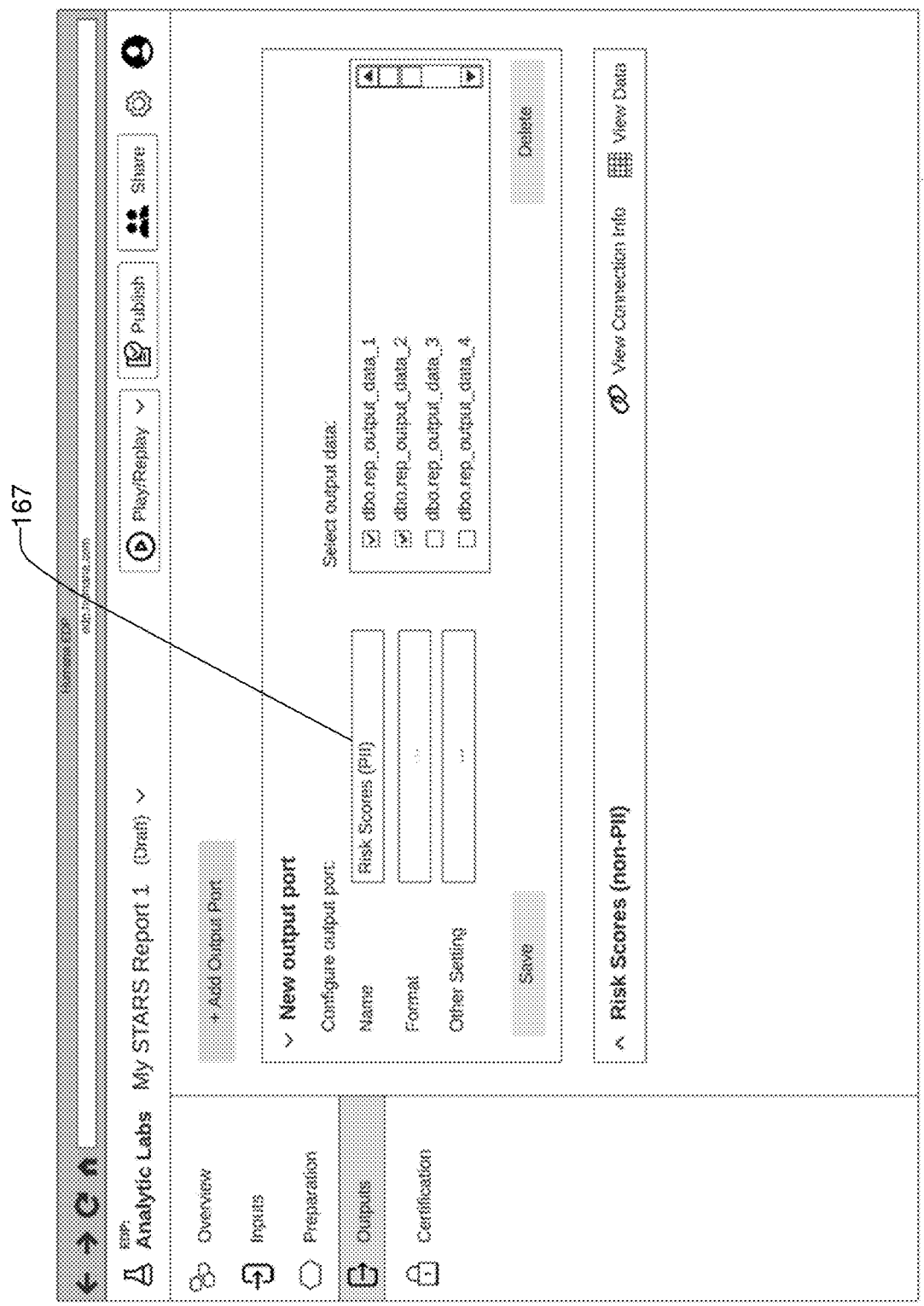

FIGS. 1F-H show screenshots of user interfaces for receiving user input for specifying attributes of a data pipeline unit according to an embodiment. FIG. 1F allows users to specify inputs for a data pipeline unit using widgets 162. FIG. 1G allows users to specify instructions for performing any transformations on the data, for example, instructions to generate the data model, an address 165 of the cloud platform to create a connection, and so on. FIG. 1H allows users to specify output ports of the data pipeline unit using widgets 167.

System Architecture

Figure 2:
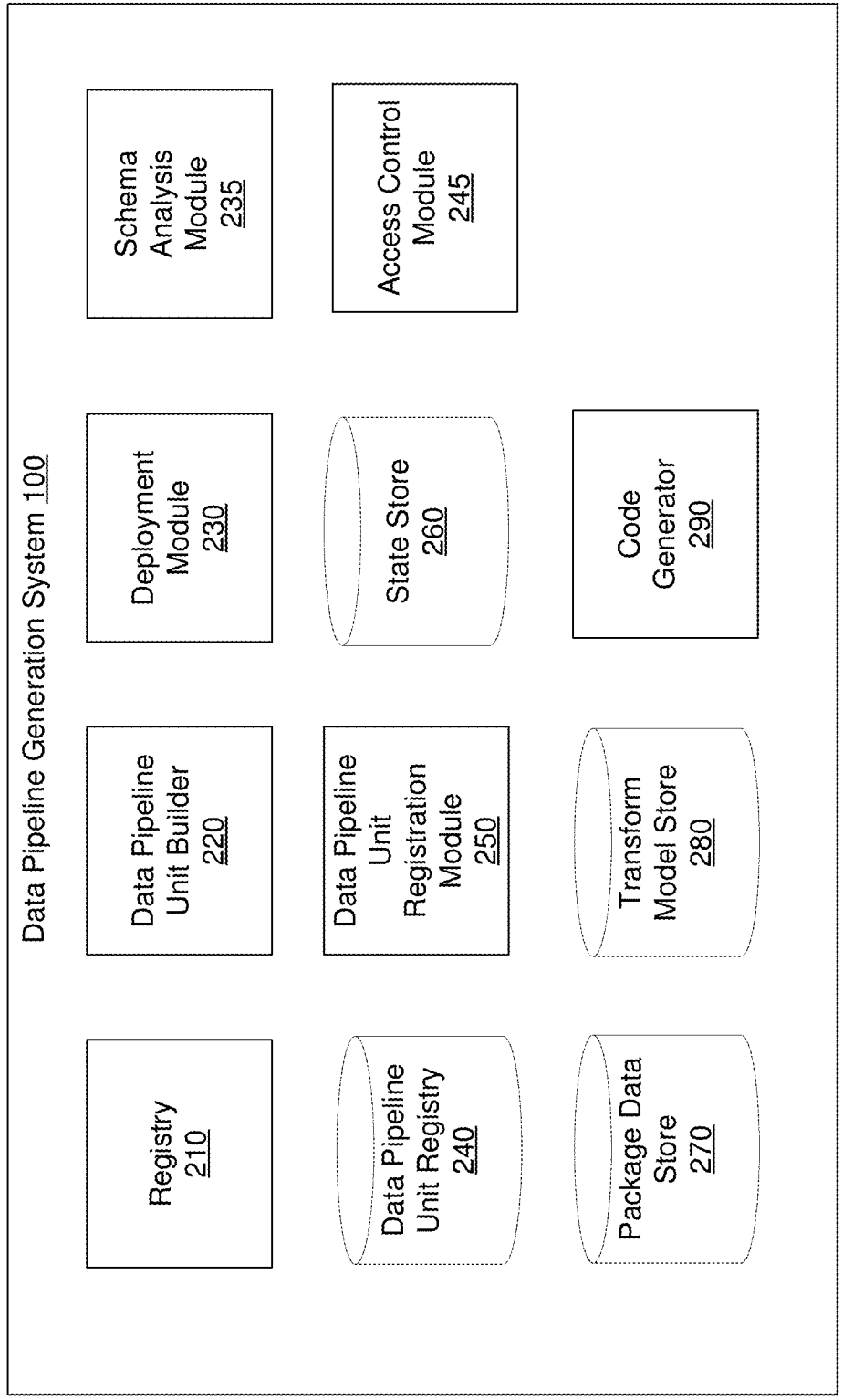
FIG. 2 shows the architecture of a data pipeline generation system, according to an embodiment.

FIG. 2 shows the architecture of a data pipeline generation system, according to an embodiment. The data pipeline generation system includes various modules as shown in FIG. 2 including a registry 210, a data pipeline builder 220, a deployment module 230, a schema analysis module 235, a data pipeline unit registry 240, an access control module 245, a data pipeline unit registration module 250, a state store 260, a package data store 270, a transform model, store 280, and a code generator 290. Other embodiments may include more or fewer or different modules. The various modules of the data pipeline generation system are described below.

The data pipeline unit builder 220 receives definitions of the data pipeline unit, accesses programs from the registry 210 that are needed based on the definitions/specs (i.e., transformation libraries) and generates packages of the required libraries for use in deployment. The data pipeline unit builder 220 parses the specification file, determines out what data input types to expect, what kind of outputs will be generated, what are the transformations needed, and pulls whatever code is needed to build the data pipeline unit from the registry 210.

The registry 210 stores code (source code, scripts, libraries, and so on) that may need to be pulled by the data pipeline unit builder 220 to support the transformations, deployment, etc. for building data pipeline units. The registry 210 maintains metadata describing the various data pipeline units as well as dynamically changing information describing the data pipeline units, for example, performance metrics of various data pipeline units, execution status of various pipeline units, access control information for various pipeline units, resource utilization of various data pipeline units, and so on. The metadata and the metrics of the various data pipeline units allow various workflows based on the data mesh architecture. For example, the system is able to support performance debugging by identifying data pipeline units that may create a bottle neck in the data pipeline, thereby making recommendations for reallocating computing resources or automatically adjusting computing resources to maximize system utilization.

The package data store 270 stores deployment packages for data pipeline units generated by the builder and awaiting deployment. The deployment module 230 accesses a package here to begin deployment process.

The deployment module 230 generates/sets up cloud infrastructure for data pipeline unit according to packages. The deployment module 230 provisions the infrastructure to support the input/output/transformations specified in the data pipeline unit builder generated package. The deployment module 230 deploys data pipeline units to the cloud. The deployment module 230 also provides feedback deployment information to the state store 260.

The schema analysis module 235 performs analysis of schemas to determine changes to a data pipeline. The schema analysis module 235 may receive an interoperability schema representing a data model and configures one or more data pipeline units to output the data model. The schema analysis module 235 may receive a differential interoperability schema representing changes to an existing data model and generates instructions to reconfigure one or more data pipeline units or restructure the data pipeline by adding new data pipeline units to output the modified data model.

The access control module 245 manage access control for a data pipeline. The access control module generates user accounts and system accounts and manages the amount of data accessed by each account to ensure that an account does not have access to data that the account does not need to process. The details of the access control module 245 are further described in FIG. 22.

The state store 260 stores information describing instances of data pipeline units including where a data pipeline unit is deployed, which IP address is being using by the data pipeline unit, what storage account/folder is storing the data. Accordingly, the state store 260 keeps track of state of data pipeline units in the cloud.

The data pipeline unit registration module 250 processes information about deployed data pipeline units and publishes/stores the information to the data pipeline unit registry The data pipeline unit registry 240 stores the information about deployed data pipeline units so other users can find and access them if they are authorized. The data pipeline unit registry 240 may also store access control information allowing other modules to enforce authorization based on the access control information.

The transform model store 280 stores transform models used by data pipeline units. The data pipeline units are model driven.

The code generator 290 generates code for deployment of a data pipeline unit and also the code that is executed during runtime of the data pipeline unit for implementing the data pipeline specified by the data pipeline unit.

The data pipeline generation system decouples the business logic of data pipeline units from details of cloud or other hosting infrastructure. This allows the users to focus on the business logic and various data transformations. The system makes data pipeline unit specifications portable across cloud platforms. Furthermore, the system supports a common language across data pipeline unit developers, platform support engineers and platform developers. The system uses a canonical model that represents a domain. The canonical model allows data pipeline unit developers to focus on the data and the model. Users can easily specify projections between models without specifying code for describing how the projections should be implemented.

Data Pipeline Creation and Update

Figure 3A:
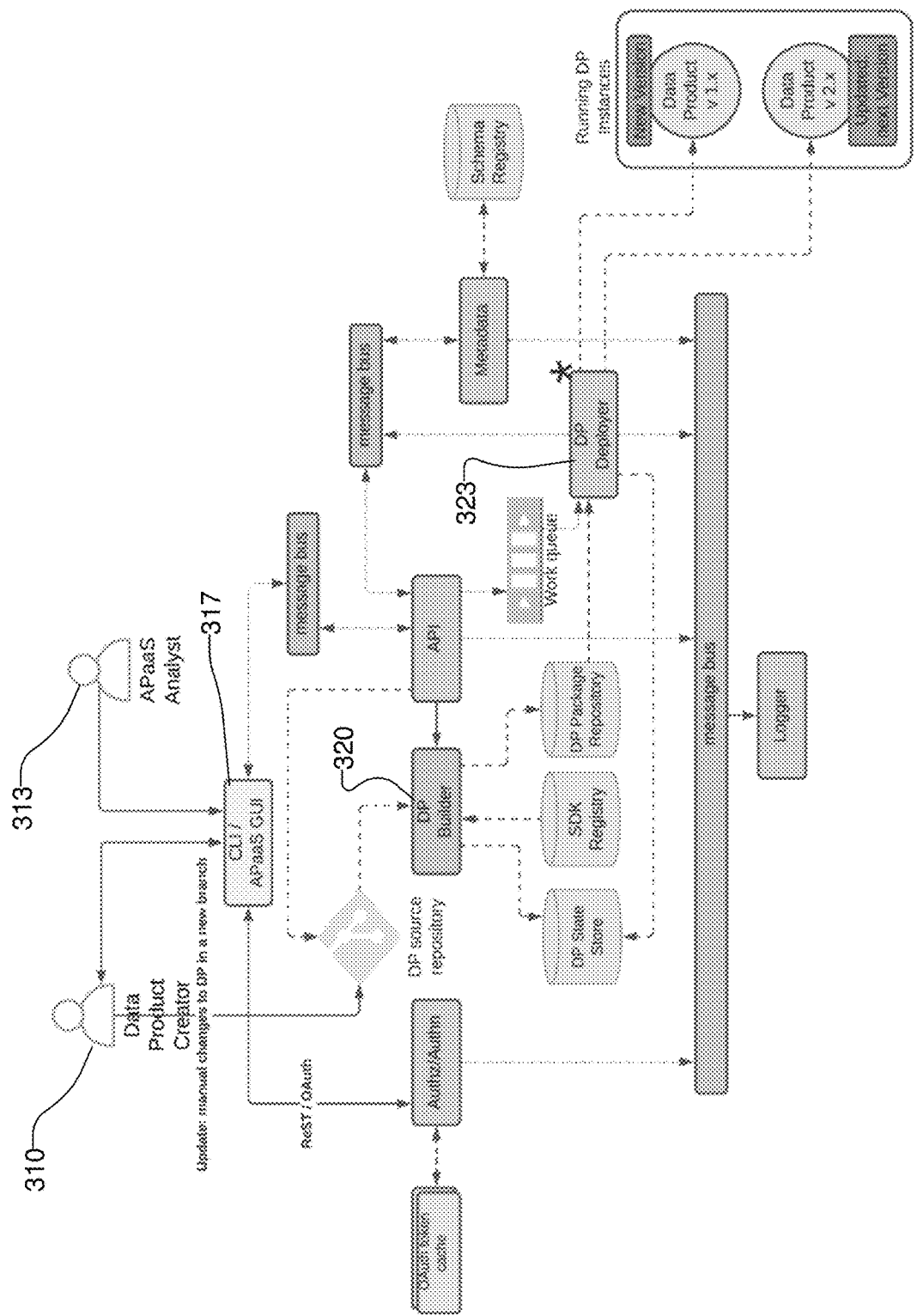
FIG. 3A illustrates creation and update of data pipeline units, according to an embodiment.

FIG. 3A illustrates creation and update of data pipeline units, according to an embodiment. A user of data pipeline units may be a developer 310 (creator or advanced user who is familiar with coding and development) or an analyst 313 (who is a business expert). The system provides a graphical user interface 317 for users, for example, analysts. The developer 310 provides a declarative specification of a data pipeline unit and checks it in to a centralized repository. The declarative specification may be reviewed, for example, by other experienced developers. Once the data pipeline unit specification is approved, the data pipeline generation system generates a data pipeline unit implementation from the specification.

The data pipeline generation system creates a user account with access to necessary computing resources (a user account may also be referred to as a runtime service account or a service principal) on the cloud platform for the data pipeline unit. The data pipeline generation system uses the user account to grant permissions and create resources necessary for the data pipeline unit. The identity for the data pipeline unit (service account metadata) is stored in the key vault. The data pipeline generation system provisions in the cloud platform all the infrastructure needed by the data pipeline unit, for example, storage account folder, a software module for moving data and applying transformations and orchestrating execution of workflow (also referred to as a data factory), a data transformation module (e.g., Databricks or Apache SPARK), data tables in a data warehouse or analytics framework. The data pipeline generation system next generates data pipelines, schema migration scripts, configuration for transformations or harmonization. The data pipeline generation system updates the data pipelines registry. The data pipeline generation system may also generate sample data. The data pipeline unit builder 320 accesses various transformation libraries and executable files and packages the required executable files to build a deployment package for deployment. The deployment package is provided to the deployer 323 for deploying in the cloud platform. The deployer executes deployment package to create the data pipeline units. The deployment package stages the creation of various components for the data pipeline units in the right order.

A data pipeline unit may have to be upgraded over time, for example, to use different transformations, data structures, or scripts. This may affect other data pipeline units down streams that use the output of the data pipeline unit being upgraded, esp. if the data representation is modified. The data pipeline unit stores the data in the original format, i.e., pre upgrade format. Accordingly, the data pipeline unit provides a migration path for data pipeline units downstream. Teams working on data pipeline unit downstream need to modify their data pipeline units to use the upgraded data pipeline unit. The data representation in the pre-upgraded format may be maintained for a fixed period of time, for example, for a year, thereby providing downstream data pipeline units with time to upgrade their data pipeline units. In an embodiment, dependency analysis is performed to identify the data pipeline units downstream that are affected and inform them re the changes to the data pipeline unit being upgraded.

Figure 3B:
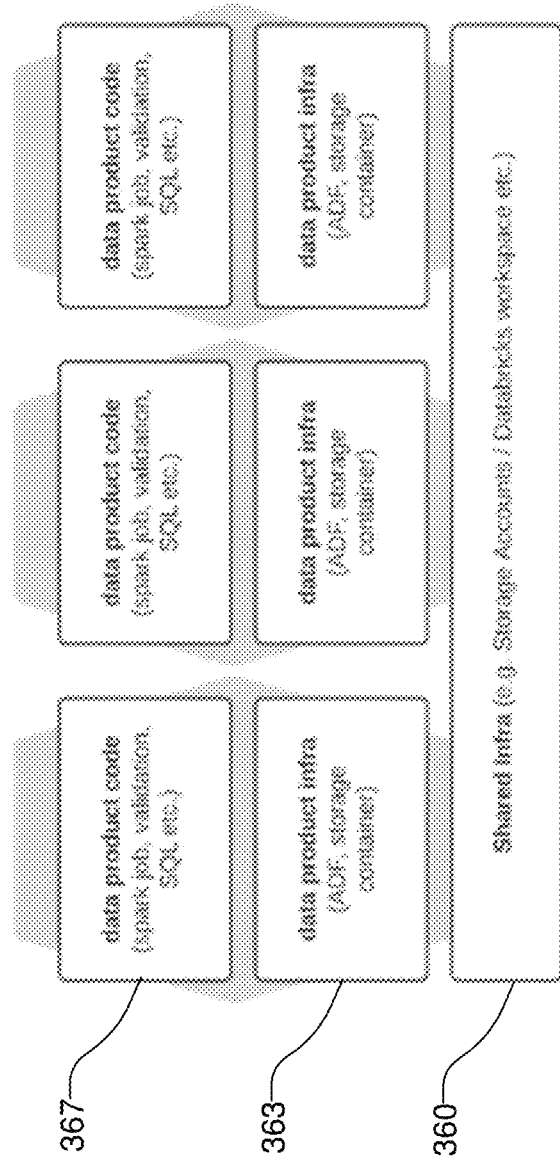
FIG. 3B shows the components of a data pipeline unit that is provisioned according to an embodiment.

FIG. 3B shows the components of a data pipeline unit that is provisioned according to an embodiment. The data pipeline units include (1) shared infra structure 360, for example, storage accounts; (2) data pipeline unit specific infrastructure 363 (e.g., a data factory (ADF) and storage container; and (3) data pipeline unit's code 367, for example, database commands (SQL commands), validation code, and so on.

Data Pipeline Unit Architecture

Figure 4:
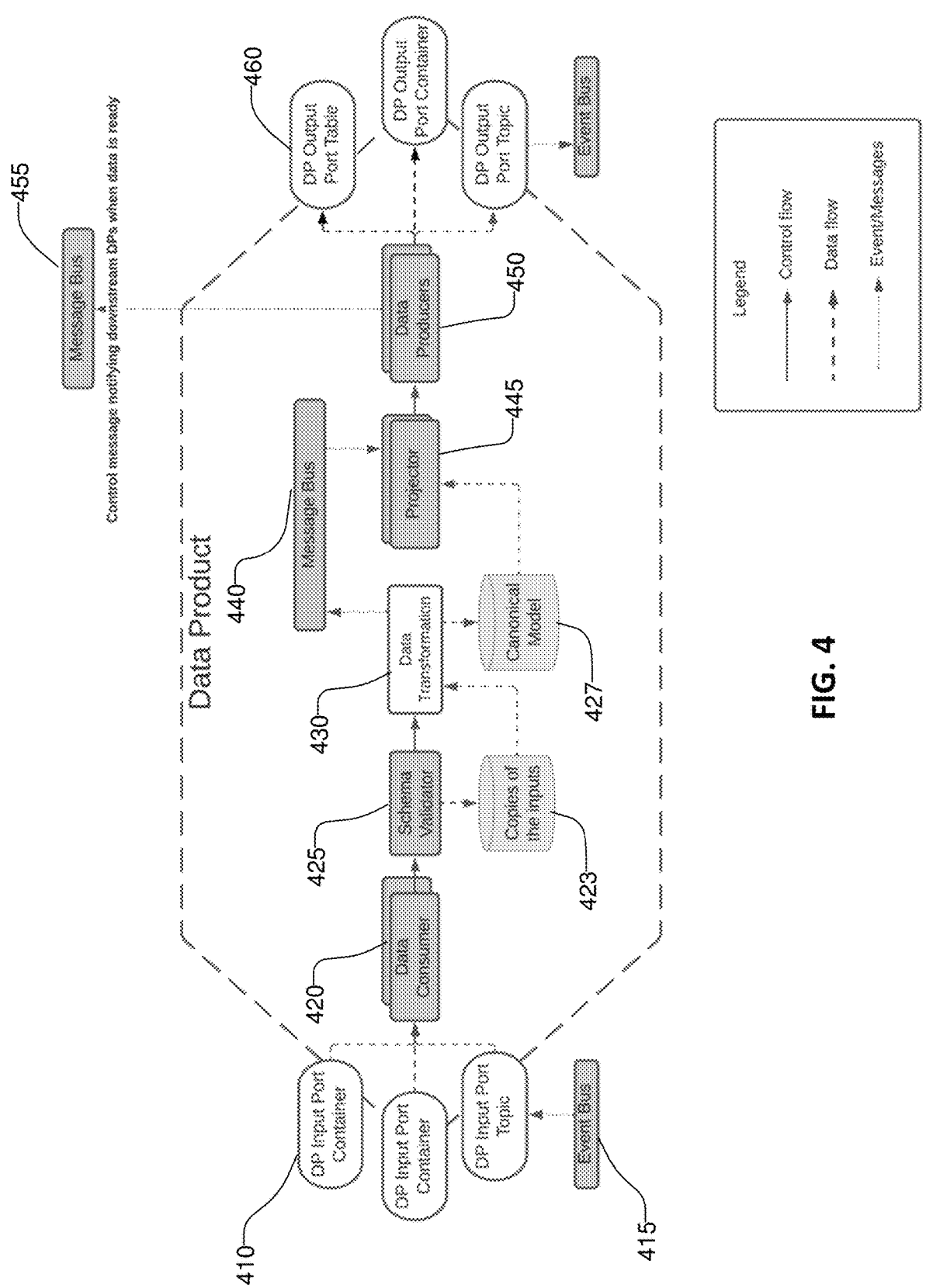
FIG. 4 shows an exemplary architecture of a data pipeline unit, according to an embodiment.

FIG. 4 shows an exemplary architecture of a data pipeline unit, according to an embodiment. The data input port containers 410 (or input ports) provide input data for the data pipeline unit. Data input may be provided via batch files, data streams, or other mechanisms. The event bus 415 handles streaming data input to the data pipeline unit. The data consumer 420 includes the instructions for processing the input data, for example, to performs data cleansing. The schema validator 425 performs any validation of the data. Copies of the data 423 are saved as is before any transformations are performed. The data transformation 430 is performed to map the input data to the canonical model 427. If data is processed as a stream, the data is provided to other components using the message bus 440. The projectors 445 convert the data to any other format or model for providing to the data producers 450 that output the results via the outputs 460. The output 460 may be provided as a batch file or as data stream. The output may be provided to other data pipeline units or to an application for further processing or for providing to the user. The projector may be used to extract a subset of the canonical model, to mask specified fields, transform data, and so on. The message bus 455 is used to inform downstream data pipeline units when data is available for them to process further, for example, when a batch file is ready to use by an application or data pipeline unit downstream. For example, the output may be available based on a predefined schedule.

Code Generation

The code generator 290 receives the declarative specification of a data pipeline unit and performs code generation to generate necessary software artifacts for deploying the data pipeline unit on a cloud platform and for execution of the data pipeline unit at runtime. The code generator 290 parses the declarative specification of a data pipeline unit to build a data structure representing the data pipeline unit. The code generator 290 traverses the data structure to generate code.

Figure 5:
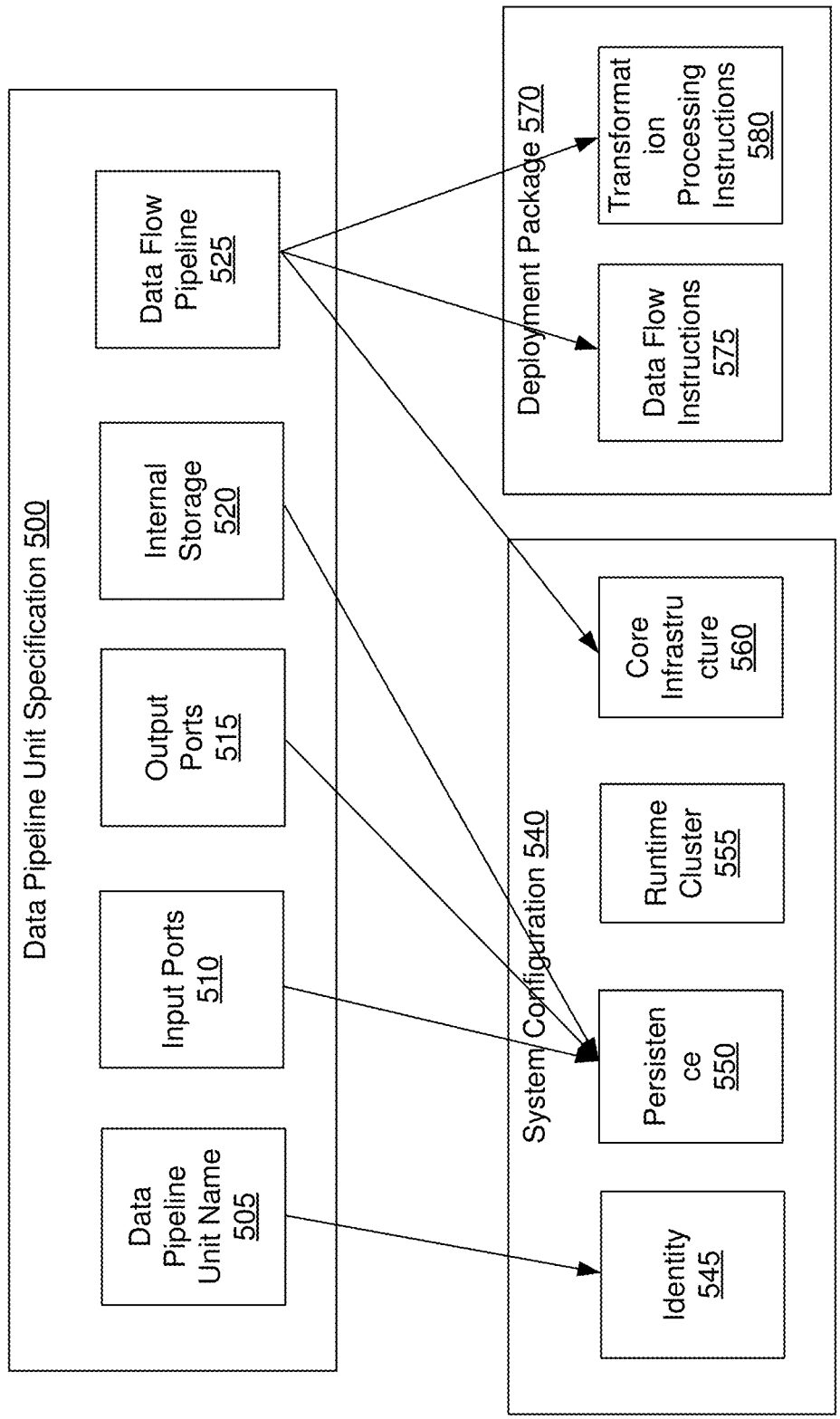
FIG. 5 shows mapping from the specification of the data pipeline unit to various components of a system configuration and a deployment package, according to an embodiment.

FIG. 5 shows as mapping from the specification of the data pipeline unit to various components of a system configuration and a deployment package, according to an embodiment. As shown in FIG. 5, and illustrated using an example above, the data pipeline unit specification 500 includes various elements including a data pipeline unit name 505, input ports 510, output ports 515, internal storage 520, and a data flow pipeline 525. The code generator uses the data pipeline unit specification 500 to generate (1) a system configuration 540 that configures the cloud infrastructure needed for the data pipeline unit and (2) a deployment package 570 that includes data pipeline unit execution logic comprising instructions executed during execution of the data pipeline according to the data pipeline unit specification 500. The system configuration 540 may also be referred to as a data pipeline unit manifest or a data pipeline unit manifest. The system configuration 540 includes various sections including identity 545, persistence 550, runtime cluster 555, and core infrastructure 560.

Figure 6:
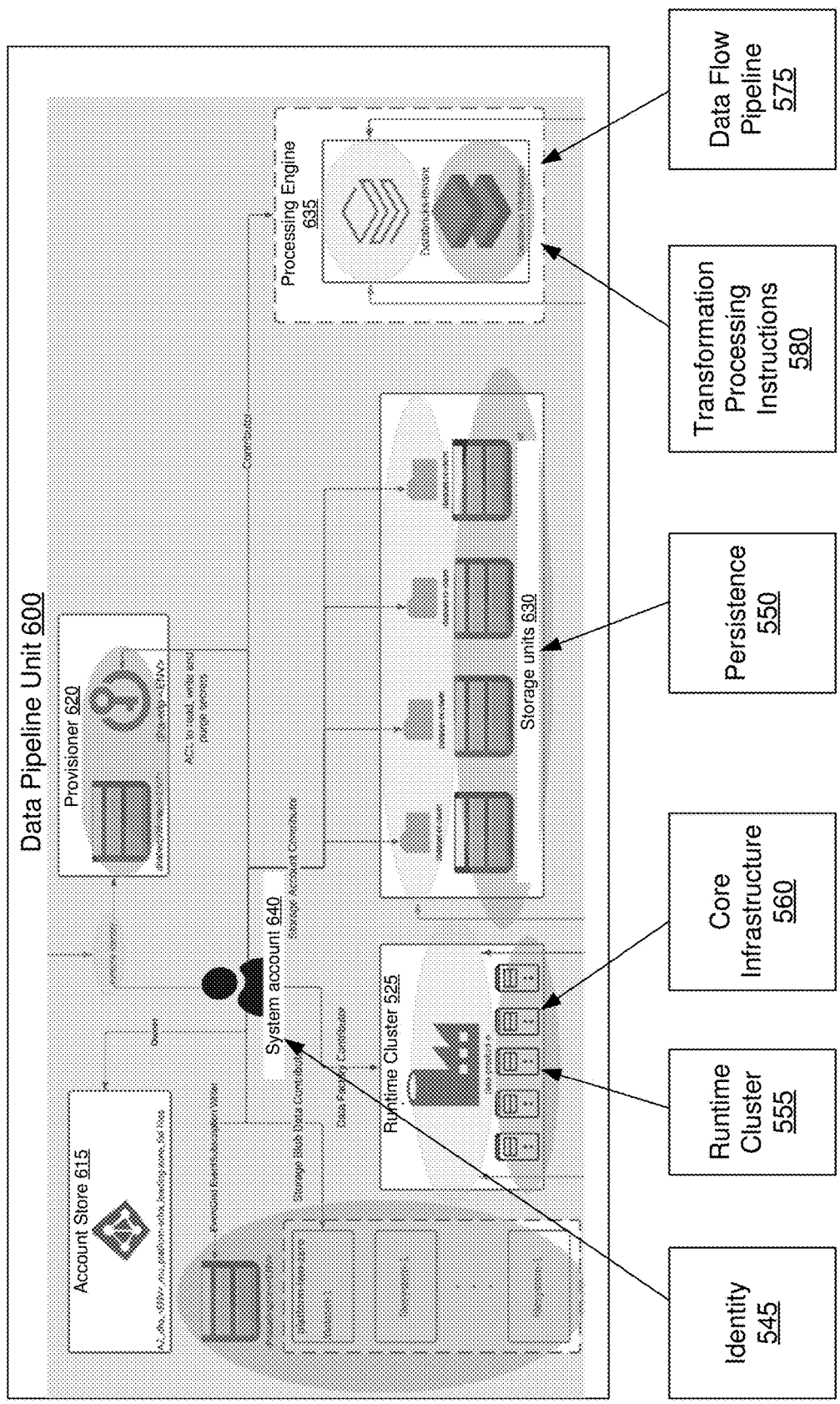
FIG. 6 shows the associations between components of the system configuration and the deployment package with the components of the data pipeline unit, according to an embodiment.

FIG. 6 shows the associations between components of the system configuration 540 and the deployment package 570 with the components of the data pipeline unit 600. The identity 545 section of the system configuration 540 includes details of one or more system accounts that are created for managing the resources and processing associated with the data pipeline units. The system account 640 may be referred to as a service principal for the data pipeline unit. These system accounts have the necessary permissions to process the data processed by the data pipeline units but do not have access to any information that is not processed by the data pipeline unit. This allows the system to minimize the amount of data that is accessed by any user or automatic process.

The ability to split the data pipeline for a large complex data processing task into small manageable chunks each represented by a data pipeline unit. Accordingly, each user/process is able to access a subset of data that is processed, thereby minimizing the blast radius of any security leak, for example, if a system account is compromised and accessed by unauthorized users. Furthermore, if a bug or a defect in an automatic process causes the process to corrupt the data being processed, the scope of the data corruption is limited to the data that is accessible to the process. Furthermore, since each data pipeline unit maintains snapshots representing older versions of the data being processed, the data pipeline unit is able to rollback to a previous version. The modular architecture of data pipeline units simplifies the process of fixing such data corruption since the developers/privileged users analyzing/debugging the data corruption need to focus on the data that is accessible to the system account of the data pipeline unit to analyze and fix any issues. This data is much limited in scope compared to the entire data that is processed by the data pipeline, thereby focusing the scope of the analysis. The system accounts are created in an account store 615. An example of an account store is an active directory.

The persistence 550 layer of the system configuration 540 configures the storage used by the data pipeline unit in the cloud platform. These may include various storage units or storage containers for storing data that is processed by the data pipeline unit. For example, data received via an input port may be copied and stored in a storage container. The copy of the data may be processed and transformed into different data that is stored in another storage container.

A storage container of the data pipeline unit may be a folder, a database table, a file, and so on. The data pipeline unit may include specialized containers to store sensitive information, for example, pseudonymized data. In an embodiment, a tenant space is created for each data pipeline unit. This allows data of a data pipeline unit to be isolated from other data pipeline units, thereby preventing accidental access or overwriting of data. In this embodiment, the system is a multi-tenant system that allows isolation of data and processes for different tenants.

The runtime cluster 555 portion the system configuration configures the runtime cluster of servers or processors used by the data pipeline unit. The cluster configures a parallel/distributed processing system with multiple processors for a particular data pipeline unit, thereby allowing the processing of the data pipeline unit to be handled in a parallel distributed fashion. In an embodiment, a default configuration of the cluster is used without any specification from the user. However, in other embodiments, the data pipeline unit specification includes attributes describing the cluster configuration, for example, the size of the cluster, the type of cluster (selected from various clusters provided by different vendors), and so on.

The core infrastructure 560 includes the software resources that are needed for executing the data pipeline unit including data factories, tables, logs, and so on. The code generator 290 generates the instructions for provisioning the software resources in the core infrastructure 560. These resources are provisioned by the provisioner 620 module.

The code generator 290 processes the data flow pipeline 525 specified in the data pipeline unit specification to generate a deployment package 570 that includes (1) data flow instructions 575 that orchestrate the movement of data across various data sources and (2) transformation processing instructions that package the underlying code for the various transformations, for example, into a jar file. The deployment package 570 is deployed on a system within cloud platform that executes a processing engine 635 configured to execute the data flow instructions 575 and the transformation processing instructions 580.

When data is received by the data pipeline unit via a stream input or a batch input, the processing engine 635 executes to transform the input data using the data flow instructions 575 and moves the data across various storage units 630 according to the deployment package 570.

Figure 7:
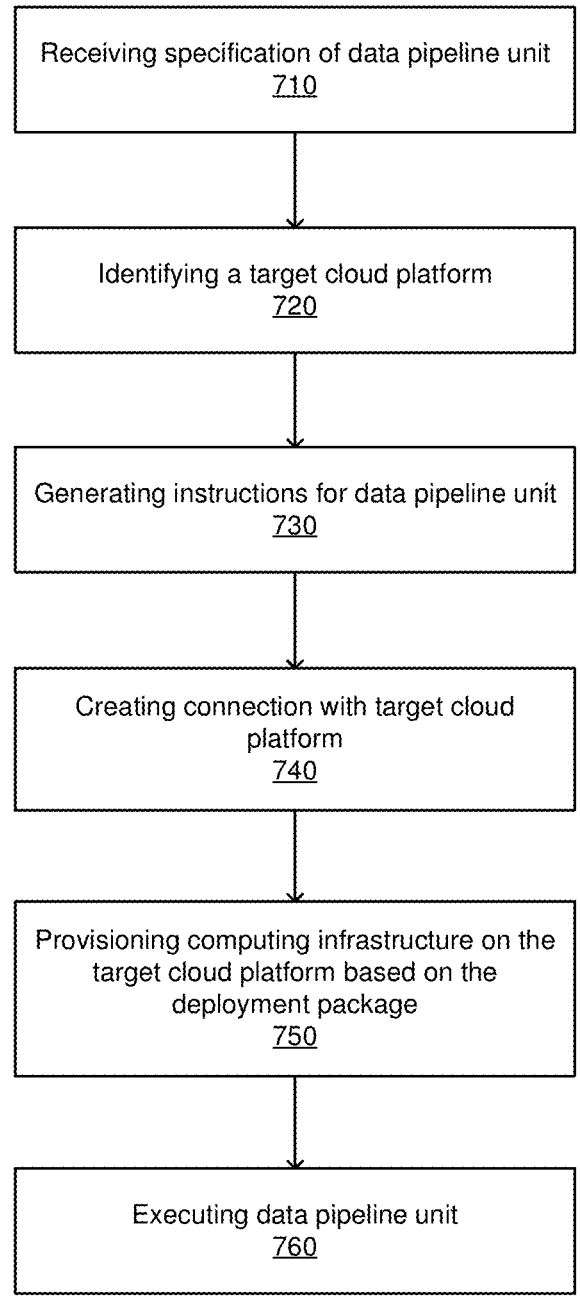
FIG. 7 shows a flowchart illustrating the process of continuous delivery of a data pipeline on a cloud platform according to an embodiment.

FIG. 7 shows a flowchart illustrating the process of continuous delivery of a data pipeline on a cloud platform according to an embodiment. The process may be executed by a system, for example, the data pipeline generation system 100 in conjunction with other systems, for example, cloud platform 125. Steps indicated herein as being executed by a particular module or a system may be executed by another module or system.

The system receives 710 a specification of the data pipeline. The specification describes a plurality of data pipeline units. The specification of a particular data pipeline unit includes various components including, inputs of the data pipeline unit, outputs of the data pipeline unit, one or more storage units used by the data pipeline unit, and one or more data transformations performed by the data pipeline unit.

The system identifies 720 a target cloud platform for deployment and execution of the data pipeline. A system may be configured to work with a particular target cloud platform (e.g., MICROSOFT AZURE). Accordingly, that particular cloud platform may be specified as default. However, the specification of the data pipeline is cloud platform independent and can be used for deployment and execution on any other target cloud platform (e.g., GOOGLE CLOUD PLATFORM or AMAZON WEB SERVICE).

The system generates 730 instructions for deployment and execution of a data pipeline unit from the specification of the data pipeline unit for the target cloud platform. The generation 730 may be performed for each data pipeline unit. The generated instructions include (1) a system configuration for the data pipeline unit and (2) a deployment package for the data pipeline unit. The system configuration includes instructions for configuring (1) one or more storage units on the cloud platform, (2) a cluster of servers for execution of the data pipeline unit on the cloud platform, and (3) one or more processing engines for executing instructions of the data pipeline unit. The deployment package includes (1) data flow instructions for orchestrating the flow of data across resources of the data pipeline unit, and (2) a transformation processing instructions package for performing the one or more data transformations of the data pipeline unit.

The system creates 740 a connection with the target cloud platform. The system provisions 750 computing infrastructure on the target cloud platform for the data pipeline unit according to the system configuration of the deployment package of the data pipeline unit. The system subsequently receives input data for the data pipeline unit and executes 760 the data flow instructions stored in the deployment package of the data pipeline unit.

In an embodiment, the data pipeline forms a data mesh of data pipeline units and the inputs of the data pipeline unit are received from outputs generated by another data pipeline unit of the data pipeline. Similarly, the outputs of a data pipeline unit may be provided as inputs to another data pipeline unit of the data pipeline.

The ability to split the data pipeline into manageable chunks represented by data pipeline units allows different policies to be enforced for different data pipeline units independent of the other data pipeline units. For example, a storage unit of the data pipeline unit may be configured to store snapshots of the data stored in the storage unit. The rate at which the snapshots are stored for a storage unit of a first data pipeline unit may be different from the rate at which the snapshots are stored for a storage unit of another data pipeline unit.

Similarly, each data pipeline unit may enforce a different data retention policy depending on the characteristics of the data pipeline unit. In an embodiment, the data retention policy is determined based on the type of data (or fields of the input data) processed by the data pipeline unit. In an embodiment, the data retention policy of the data pipeline unit is determined based on the other data pipeline units that received the outputs generated by the data pipeline unit. For example, if multiple data pipeline units receive and process data generated by a particular data pipeline unit, the data retention policy of that data pipeline unit may cause the data to be kept longer than another data pipeline unit that has few consumers of the output data of the data pipeline unit.

Figure 8:
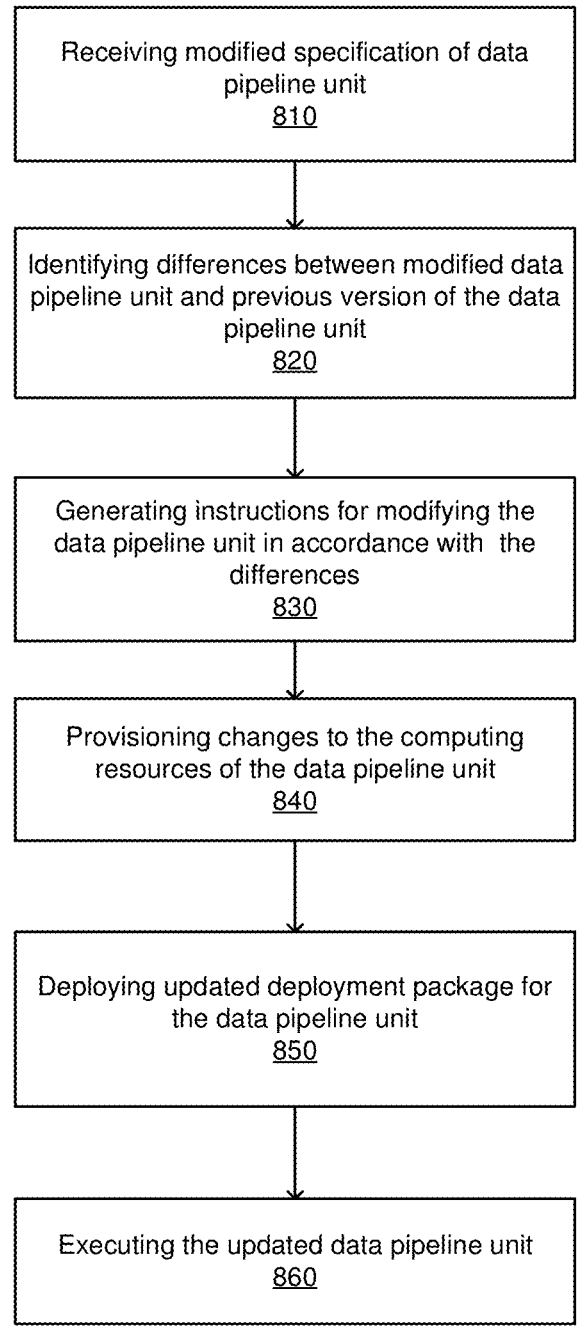
FIG. 8 shows a flowchart illustrating the process of upgrading a data pipeline on a cloud platform according to an embodiment.

FIG. 8 shows a flowchart illustrating the process of upgrading a data pipeline on a cloud platform according to an embodiment.

The system receives 810 a modified specification of a data pipeline unit. The modification may be performed in view of an upgrade of the data pipeline. The ability to split the data pipeline into multiple data pipeline units allows a data pipeline unit to be upgraded independent of other data pipeline units so long as the interface (e.g., inputs and outputs of the data pipeline unit) between the data pipeline unit and a neighboring data pipeline unit in the data mesh is not modified. If the inputs or outputs of the data pipeline unit are modified, the remaining data pipeline units that either provide input to the data pipeline unit or receive output of the data pipeline unit need to be modified accordingly to make sure that the interfaces are used consistently.

The system compares the modified specification with the original specification (e.g., the previous version of the data pipeline unit specification) to identify 820 the differences between the modified specification and the original specification. In an embodiment, the system generates a data structure that represents the modified specification and the original specification and compares the two data structures to determine which attributes of various components of the specifications have changed. The system generates 830 instructions for modifying the data pipeline unit based on the differences between the modified specification and the original specification.

The system modifies the system configuration of the data pipeline unit based on the differences between the modified specification and the original specification. For example, assume that the system identifies differences in the storage units of the data pipeline unit such that the modified specification includes at least an additional storage unit compared to the original specification. The system generates instructions for provisioning the additional storage unit to the data pipeline unit configured on the target cloud platform. The system executes the instructions for provisioning the additional storage unit to modify the computing resources of the data pipeline unit configured on the target cloud platform. As a result, the additional storage unit is added to the data pipeline unit for subsequent executions. This allows different users and different teams to manage the resources of each data pipeline unit independent of other teams working on other data pipeline units.

Similarly, assume that the identified differences comprise differences in an application used for performing a transformation. Accordingly, the modified specification includes at least an additional application compared to the original specification. The system packages instructions for the additional application in the deployment package to generate a modified deployment package and sends the new deployment package to the target cloud platform for deployment on the data processing unit. Subsequently if new input data is received for the data pipeline unit, the system executes the data flow instructions stored in the modified deployment package of the data pipeline unit.

The system uses the instructions for modifying the data pipeline unit to provision 840 changes to the computing resources of the data pipeline unit. The system deploys 850 the updated deployment package for the data pipeline units. For subsequent inputs received by the data pipeline, the upgraded data pipeline unit is executed 860 by the cloud platform. This disclosed techniques continuous integration/continuous delivery of upgrades to data pipelines in an incremental fashion. Furthermore, this allows collaboration between different teams that can work independently on different data pipeline units of the data pipeline.

Data Mesh Based Modular Architecture for Data Pipeline

The system receives a cloud platform independent specification of a data pipeline configured as a data mesh. The data mesh may be represented as graph of nodes connected by edges, for example, a directed acyclic graph. In some embodiments, the output of a node is fed back as input to another node and the graph represented by the data mesh is not an acyclic graph since the feedback loop creates an effective cycle in the graph.

A node represents a data pipeline unit that performs a portion of computation of the data pipeline. The node is specified using (a) inputs of the data pipeline unit, (b) outputs of the data pipeline unit, (c) one or more storage units used by the data pipeline unit, and (d) one or more data transformations performed by the data pipeline unit. An edge of the data mesh represents a relation between a first node and a second node, such that an output generated by the first node is provided as an input to the second node.

The system identifies a target cloud platform for deploying and executing the data pipeline represented as the data mesh. The system generates instructions for configuring each node of the data mesh on the target cloud platform. According to an embodiment, the generated instructions for a node include (1) a system configuration comprising instructions for configuring: one or more storage units on the cloud platform, a cluster of servers for execution of the data pipeline unit on the cloud platform, and one or more processing engines for executing instructions of the data pipeline unit, and (2) a deployment package comprising: data flow instructions for orchestrating the flow of data across resources of the data pipeline unit, and a transformation processing instructions package for performing the one or more data transformations of the data pipeline unit.

The system creates a connection with the target cloud platform. For each node of the data mesh, the system provisions computing infrastructure on the target cloud platform according to the generated instructions. The data mesh receives input data and executes the generated instructions. The data generated by each node is propagated according to the connections specified by the directed acyclic graph of the data mesh.

The nodes of the data mesh may be classified as (1) a set of input nodes configured to receive input data processed by the data mesh from one or more data sources, (2) a set of output nodes configured to provide output data processed by the data mesh to one or more consumer systems, and (3) and a set of internal nodes, such that each internal node receives data output by a previous node of the data mesh and provides output as an input to a next node of the data mesh.

According to an embodiment, the input data comprises a set of input fields and the output data comprises a set of output fields. The system generates lineage information describing a field. If the field is an input field, the lineage information represents a set of nodes determining values derived from the input field. If the fields is an output field, the lineage information represents a set of nodes determining values used to compute the output field.

The system uses the data mesh architecture to selectively update portions of the data mesh without affecting the rest of the data mesh. According to an embodiment, the system receives a change in specification describing a field. The system identifies a set of nodes of the data mesh based on lineage information of the field. The system recommends the set of nodes of the data mesh as data pipeline units that need to be modified in connection with the change in the specification of the field.

Subsequently, the system may receive a modified specification of one or more nodes selected from the recommended set of nodes of the data mesh. The system generates instructions for each of the one or more nodes of the data mesh. For each of the one or more nodes, the generated instructions are executed to reconfigure the node according to the modified specification.

According to an embodiment, the system re-computes the data associated with a portion of the data mesh. Each node of the data mesh stores snapshots of partially computed data in one or more storage units of the node. Each snapshot is associated with a timestamp. The system receives a timestamp value and a set of nodes of the data mesh. For each node, the instructions of the node are executed to process data stored on the node obtained from a snapshot corresponding to the timestamp.

The specification of the data mesh is cloud platform independent. Accordingly, the specification can be used to generate instructions for a second cloud platform. The generated instructions are deployed on the second cloud platform. The data pipeline is executed on the second platform.

According to an embodiment, the data mesh may be distributed across multiple cloud platforms. For example, some of the nodes of the data mesh may be executed on a first cloud platform and some nodes executed on a second cloud platform. Accordingly, an edge of the data mesh may span across cloud platforms.

The data pipeline units of a data pipeline may be configured as a data mesh that represents a modular architecture for implementing the data pipeline. The data mesh architecture allows for incremental modifications to portions of the data pipeline without affecting the remaining data pipeline. Accordingly, the data mesh architecture supports efficient continuous integration/continuous delivery of updates or upgrades of the data pipeline. Such updates may be required, for example, if there is a change in the requirements from consumer systems or a change in the input data that is processed by the data pipeline.

Figure 9:
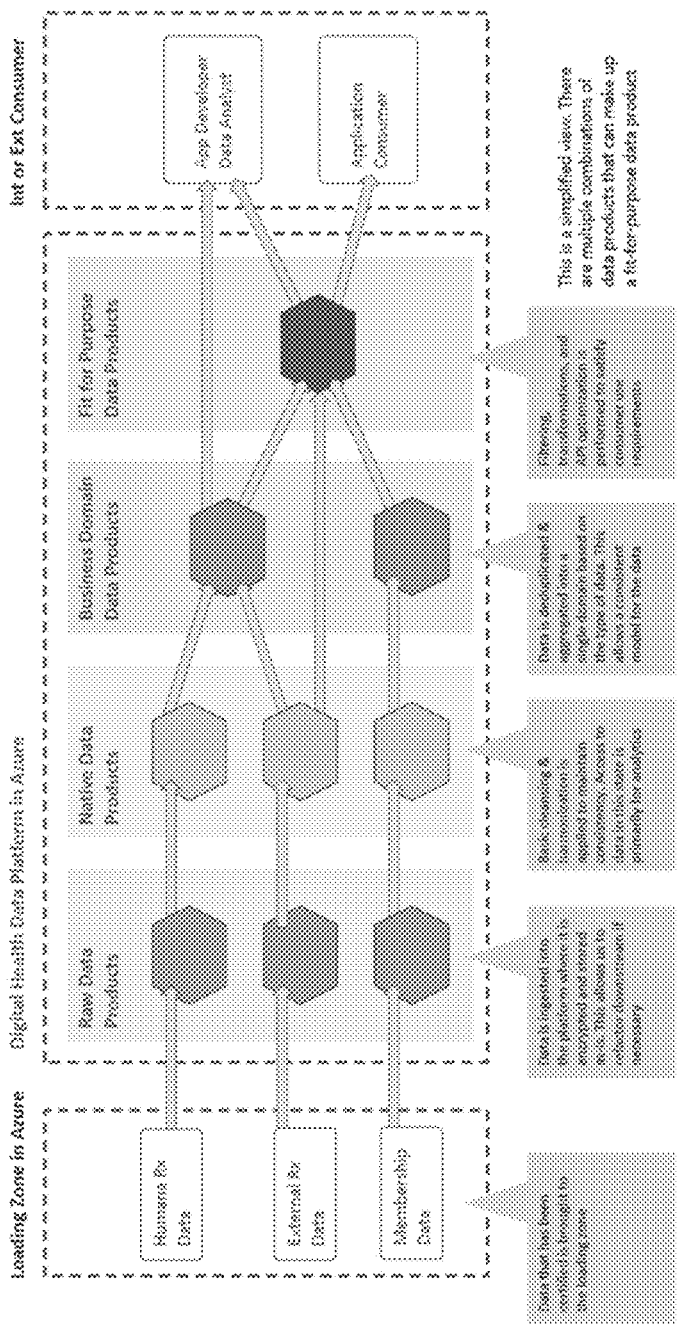
FIG. 9 shows an exemplary data mesh obtained by composing data pipeline units, according to an embodiment.

FIG. 9 shows an exemplary data mesh obtained by composing data pipeline units, according to an embodiment. The data mesh illustrates different types of data pipeline units. (1) Raw data pipeline units that ingest data into the analytics platform. The raw data pipeline units may encrypt data and store the data as it is. The stored data may be refactored later. If a better way to process the data is determined later on, the stored data can be accessed and processed using the new techniques. (2) Native data pipeline units that perform basic cleansing of input data and harmonization of the data to maintain consistency. For example, the data harmonization may rename columns, fix data types, and so on. (3) Business domain data pipeline units that perform deduplication and aggregation of data into a single domain. This provides a consistent model for the data. For example, the data model may be specific to the health care domain. Accordingly, the data model may have a representation for members of a health care system. The input data is describing users in various formats may be processed to populate the fields or attributes of member objects. (4) Fit for purpose data pipeline units that perform filtering, transformations, and optimizations for specific APIs to satisfy end user requirements. Fit for purpose data pipeline units are specific to use cases for which the data is being processed as compared to raw data pipeline units and native data pipeline units that provide low level processing that can be reused across different use cases. The output of fit for purpose data pipeline units is provided to an application or to a data analyst via a user interface. Accordingly, the data mesh includes layers of data pipeline units. The early layers that are closer to input perform lower level data processing and subsequent layers perform higher level data processing. Data pipeline units may be customized by users for specific use cases.

According to an embodiment, a data mesh is represented as a directed acyclic graph of a plurality of nodes connected by edges. A node represents a data pipeline unit as described herein. An edge represents a relation between a first node and a second node, such that an output generated by the first node is provided as an input to the second node. The data mesh includes a set of input nodes, a set of output nodes, and a set of internal nodes. The data mesh may comprise multiple layers of nodes including an input layer formed by the set of input nodes, an output layer formed by the set of output nodes and one or more internal layers comprising internal nodes. The data mesh performs computation starting from the input layer such that each layer feeds data to a subsequent layer until the data is available at the output layer.

Process of Configuring a Data Mesh

Figure 10:
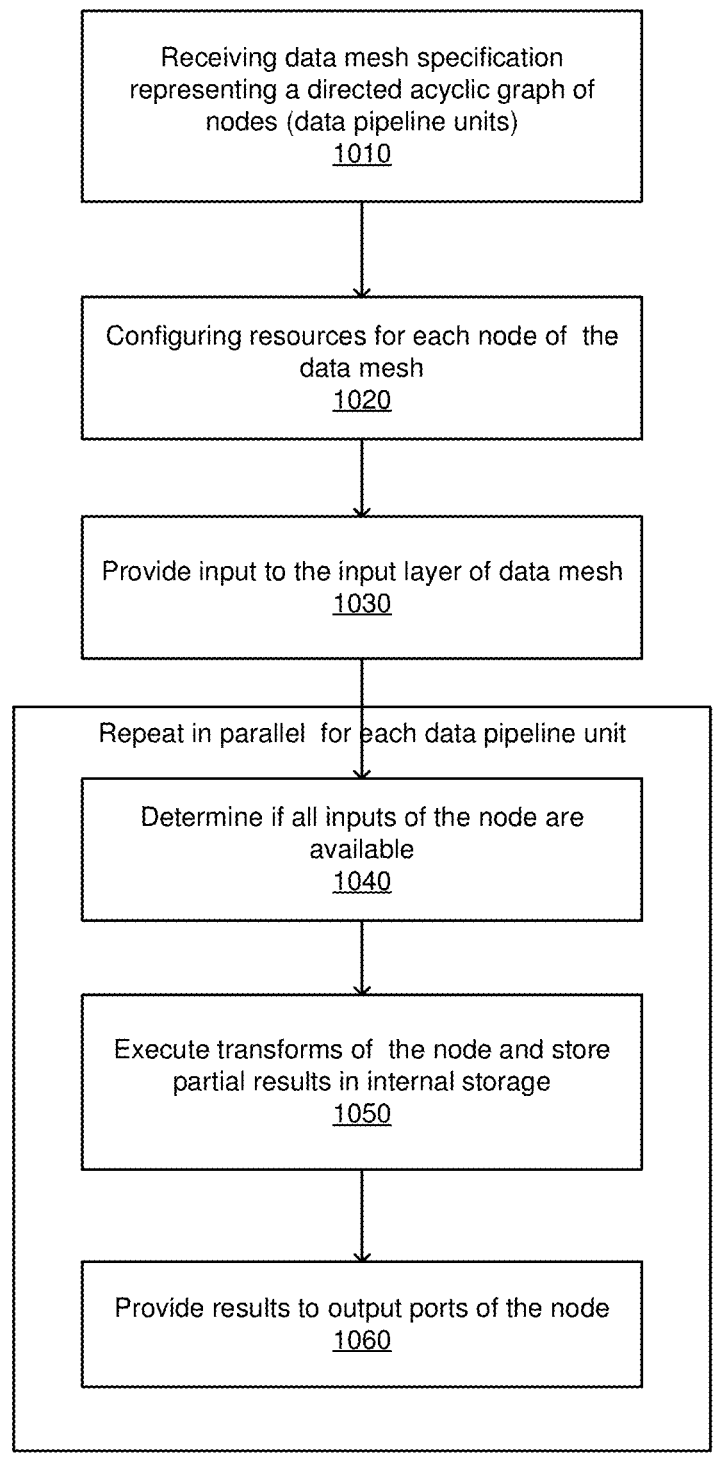
FIG. 10 shows a flowchart illustrating the process of configuring a data mesh on a cloud platform according to an embodiment.

FIG. 10 shows a flowchart illustrating the process of configuring a data mesh on a cloud platform according to an embodiment. FIG. 10 is described in connection with FIG. 11 that shows an exemplary configuration of a data mesh represented as a graph, according to an embodiment. The steps of the process are described as being executed by a system. The system refers to modules of the data pipeline generation system 100 although some steps may be executed by other systems, for example, computing systems within a cloud platform 125.

Figure 11:
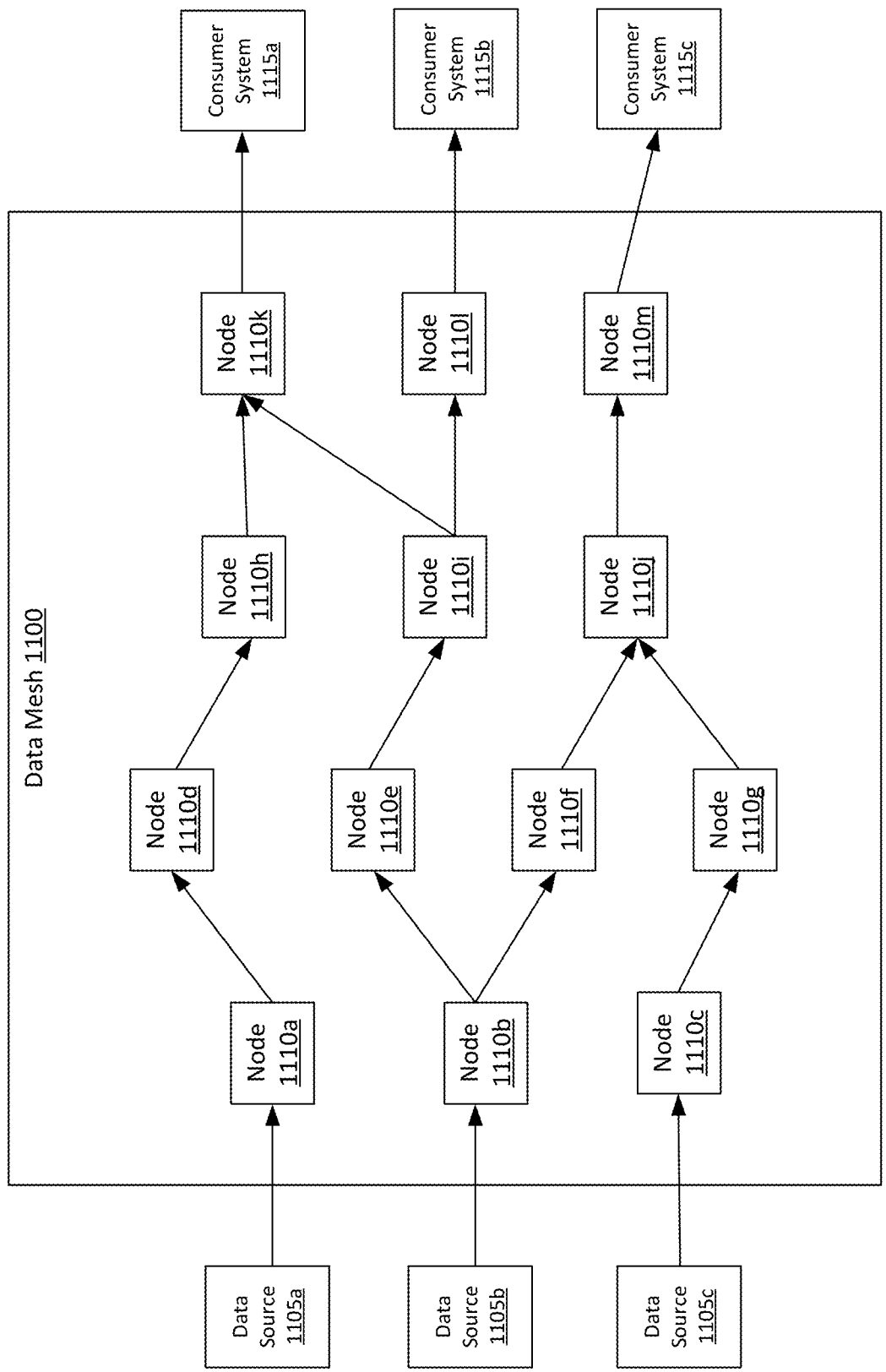
FIG. 11 shows an exemplary configuration of a data mesh represented as a graph, according to an embodiment.

As shown in FIG. 11, the nodes 1110a, 1110b, and 1110c form the set of input nodes or the input layer of the data mesh; the nodes 1110k, 1110l, and 1110m form the set of output nodes or the output layer and the nodes 1110d, 1110e, 1110f, 1110g, 1110h, 1110i, 1110j for the internal nodes. The input nodes received data from the data sources 1105a, 1105b, 1105c. The output nodes provide the result of computation of the data mesh to the consumer systems 1115a, 1115b, 1115c.

The system receives 1010 a data mesh specification that includes the specification of each node of the directed acyclic graph represented as data pipeline units. The data pipeline units' specification includes the input/output port specification that form the edges of the directed acyclic graph. The system generates instructions for each node of the data mesh as described in FIGS. 5 and 7. These instructions include the system configuration 540 and the deployment package 570 for each data pipeline unit. The system configures 1020 the resources for each node of the data mesh on the cloud platform according to the generated system configuration 540 of each node. The system also deploys the deployment package 570 for each node to the cloud platform. The data mesh is ready for execution.

The system provides 1030 input to the input layer of the data mesh. The input may be provided by informing the nodes of the input layers of availability of a set of data in batch mode or availability of each data element in stream mode. The execution of various nodes of the data mesh may be performed in parallel to the extent that all the input data of any given node is available and ready for execution. The computing resources of a node continue to wait until the input data is available at the input ports of the node.

For each node of the data mesh, the following steps 1040, 1050, and 1060 are performed. The node determines 1040 whether all inputs of the node are available and ready for execution. The node executes 1050 the transforms of the node if the input data is available. The node stores partially computed results in the internal storage of the node. The node provides 1060 the results computed to the output ports of the node. These steps are performed for each node. These steps cause the data being processed to traverse across the directed acyclic graph in a pipeline fashion. The data is processed by the nodes close to the input nodes of the data mesh initially providing inputs for the subsequent layers of nodes. The subsequent layer performs computations that provides data for following layers of nodes and so on, until the data is available for the output set of nodes.

Figure 12:
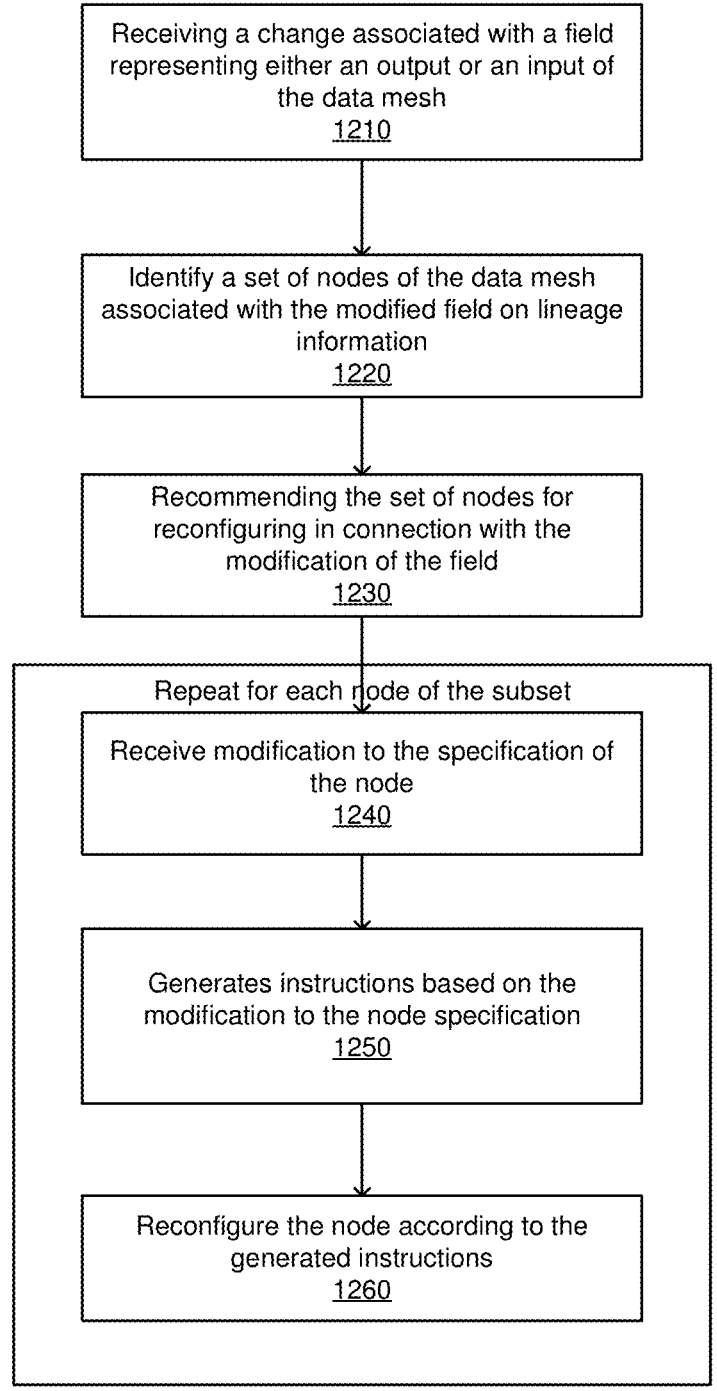
FIG. 12 shows a flowchart illustrating the process of modifying the configuration of a data mesh on a cloud platform according to an embodiment.

FIG. 12 shows a flowchart illustrating the process of modifying the configuration of a data mesh on a cloud platform according to an embodiment. FIG. 12 is described in connection with FIG. 13 that illustrates a modification of an exemplary configuration of a data mesh represented as a graph, according to an embodiment.

The system receives a modification to a field from the interface of the data mesh. The interface of the data mesh represents the inputs and the outputs of the data mesh. Accordingly, the input layer of the data mesh receives the input fields of the data mesh and the output layer of the data mesh generates the output fields of the data mesh. The input and output fields of the data mesh determine how the data mesh interfaces (or interacts) with systems external to the data mesh such as the data sources 1105 and the consumer systems 1115.

Sometimes the interface of the data mesh needs to be modified. For example, the requirements of a consumer system may change thereby requiring a modification to the data that is generated by the data mesh. Similarly, there may be changes to a data source, for example, format of the data that is received as input by the data mesh. Alternatively, a new input field may be available or an existing input field deprecated, thereby affecting the computation of the data mesh.

The modular architecture of a data mesh allows updates to be made to a subset of nodes of the data mesh without affecting the remaining nodes. Furthermore, the data mesh architecture allows the system to easily identify and isolate the changes that are made to the nodes of the data mesh. Different teams may work on different nodes of the data mesh with specific developers assigned to each node. As a result, identifying the nodes that are affected by a change to an interface of the data mesh allows automatic and efficient identification of the teams or developers that need to make changes to their corresponding data pipeline units in order to modify the data mesh for meeting the interface change. Such changes are significantly more difficult to identify and assign to developers in a monolithic architecture of a data pipeline.

The system determines lineage information for each input/output field of the data mesh. The system may perform data flow analysis across the data mesh architecture to determine the lineage information. The data flow analysis may be performed by analyzing the various data transformations performed by each data pipeline unit to identify data dependency relations between input ports and output ports. The data dependency relations of various data pipeline units are combined across the data mesh to determine lineage information across data pipeline units.

For input fields, the lineage information is determined a set of nodes of the data mesh that are affected by the input field. Accordingly, these nodes receive values that are derived from the input field. The system may identify lineage information for an input field by identifying specific inputs/outputs and fields of internal storage of the of the node that are derived from the input field.

Similarly, for output fields, the lineage information determines a set of nodes of the data mesh that compute values that are used to determine the output field. Accordingly, these nodes output values that are used subsequently by other nodes, ultimately to determine the values of the output field. The system may identify lineage information for the output field by identifying specific inputs/outputs and fields of internal storage of the of nodes that compute values used to determine the output field.

The lineage information associated with an input or output field may be precomputed and stored in a metadata store. The lineage information for a field may be represented as a directed acyclic graph referred to as a lineage graph. The nodes of the lineage graph may be nodes of the data mesh. Alternatively, the nodes of the lineage graph may represent components of the nodes of the data mesh such as input ports, fields of internal storage, or output ports.

Incremental Upgrade of a Data Mesh

As shown in FIG. 12, the system receives 1210 a change associated with a field representing either an input or an output of the data mesh. If the field represents an output of the data mesh, the change may represent a change in the format of the output field, a change in the way the output field is computed, and so on.

Figure 13:
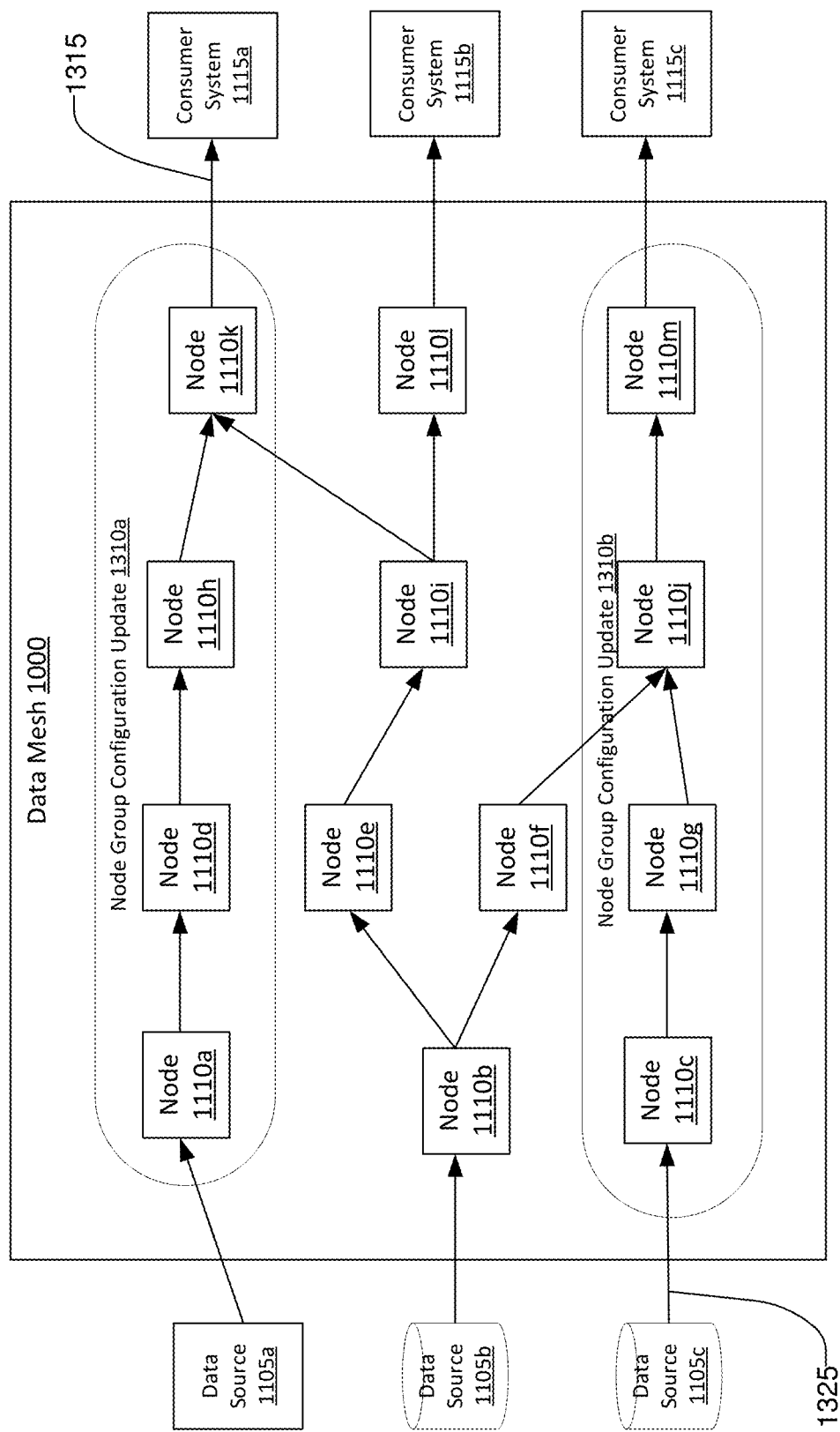
FIG. 13 that illustrates a modification of an exemplary configuration of a data mesh represented as a graph, according to an embodiment.

The system identifies 1220 a set of nodes of the data mesh associated with the field based on the lineage information of the field. The set of nodes may also be referred to as a node group. Accordingly, if the field is an output field of the data mesh, the subset of nodes represent nodes that compute values used to determine the value of the output field. For example, assume that the output field 1315 as shown in FIG. 13 is modified.

The system may determine based on the lineage information of field 1315, the node group comprising the nodes 1110a, 1110d, 1110h, and 1110k as the set of nodes that process values used to determine the value of the output field 1315. Similarly, assume that the change concerns the input field 1325. The system may determine based on the lineage information of field 1325, the node group comprising the nodes 1110c, 1110g, 1110j, and 1110m as the set of nodes that process the values received from the input field 1315.

The system may recommend 1230 the set of nodes as the nodes that need to be reconfigured to implement the change to the field. The system may recommend the set of nodes to be reconfigured via a user interface, for example, a dashboard that displays the configuration of the data mesh. The system may identify the teams or users that need to modify each of the nodes from the set of nodes and send messages to the teams or users.

The following steps 1240, 1250, and 1260 are repeated for each of the nodes from the set of nodes. The system receives a modification to the specification of the node. The specification may modify an input, an output, or a transformation of the node. The modifications to the set of nodes together implement the change to the field. The system generates 1250 instructions based on the modification received for each node of the set. The system reconfigures 1260 the node of the set of the nodes according to the generated instructions. Once the set of nodes is reconfigured and the modified deployment packages for each node of the set are deployed, the data mesh is reconfigured to generate or process the change in the field.

Accordingly, the modular architecture of the data mesh allows the system to implement the changes to fields by identifying the subset of the data mesh architecture that needs to be changed. The system also automatically identifies the teams/users that need to implement the change. The system may identify a different subset of nodes to be reconfigured for each specific field that is changed. Accordingly, the disclosed techniques provide an improvement over monolithic architecture that may require reconfiguration of the entire architecture to implement any change.

The disclosed techniques minimize the changes that are performed to the data pipeline to implement each specific change. Furthermore, the changes to the data pipeline can be implemented in incremental fashion. Accordingly, the processes disclosed allow efficient continuous integration/continuous deployment (CI/CD) of changes that are performed to a data pipeline.

Incremental Re-Computation of Data Pipeline Using Data Mesh

Figure 14:
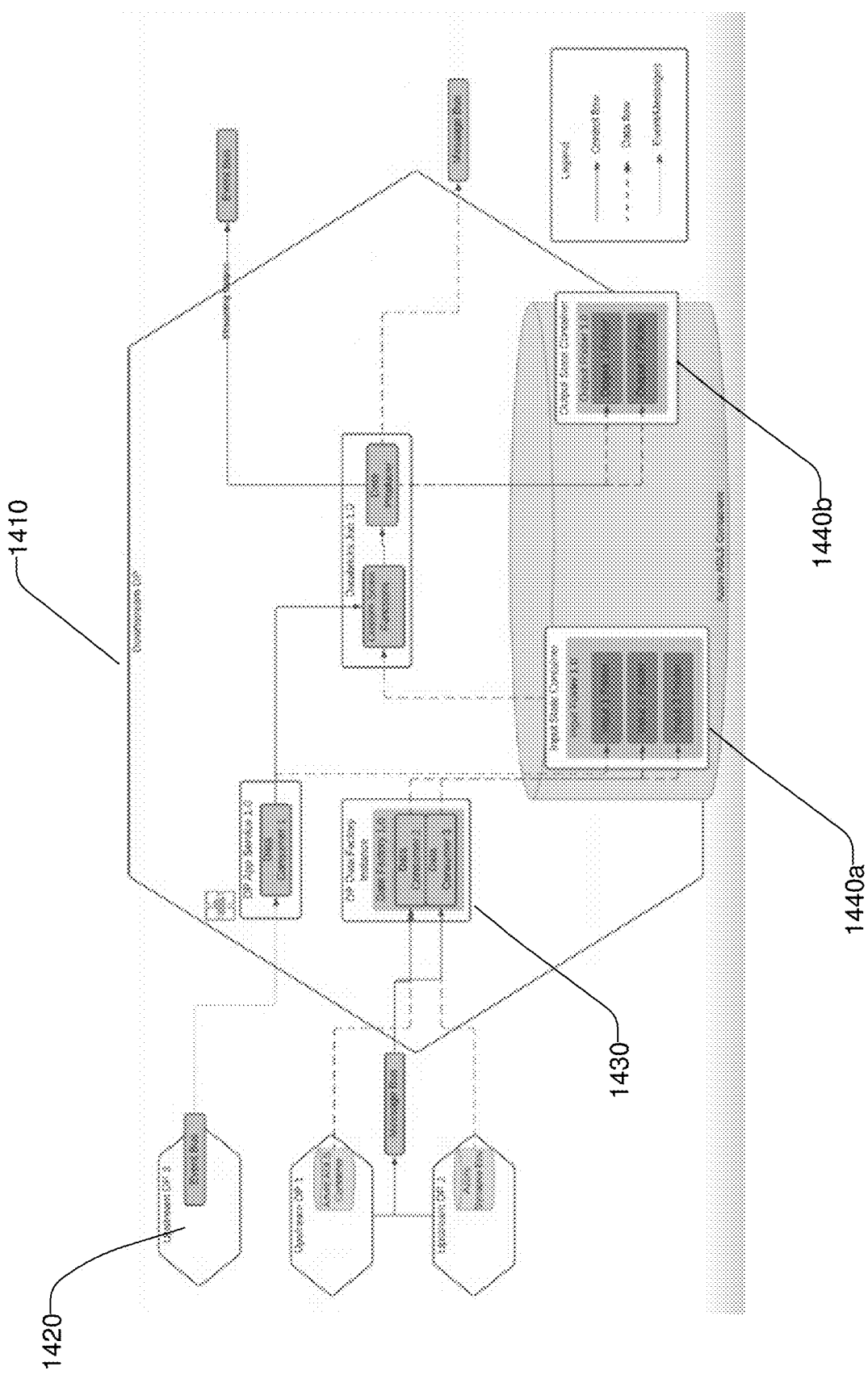
FIG. 14 shows an example architecture of a node of a data mesh illustrating the internal storage of the node, according to an embodiment.

In an embodiment, the system allows re-computation of a portion of the partial results stored by the nodes of the mesh. FIG. 14 shows an example architecture of a node of a data mesh illustrating the internal storage of the node, according to an embodiment. As illustrated in FIG. 14, the node 1410 represents a data pipeline unit that receives input from one or more upstream nodes 1420 representing other data pipeline units of the data mesh. The node 1410 includes a data factory 1430 representing a module comprising instructions for performing transformations of the data received by the node. The data processed by the node 1410 is stored in storage units 1440a, 1440b.

In an embodiment, the node 1410 creates snapshots of the data that is processed. Each snapshot is associated with a time point that corresponds to the time when the snapshot was taken. The rate at which the snapshots are taken may be different for different nodes of the data mesh. This allows each node to store the partially computed results of the node independent of other nodes. In an embodiment, the nodes are configured such that nodes that perform computation intensive transformations (or tasks that consume high system resources) take more frequent snapshots compared to nodes that perform transformations that are less computation intensive (or tasks that consume less system resources). The system may request a subset of the data computed by the nodes of the data mesh to be re-computed, for example, if a change to the data mesh is made. For example, the change in requirements of a consumer may modify the computation that is performed for a particular data field.

Certain computations may use previously stored data, for example, for determining a moving aggregate value such as a moving average value determined over a set of previous values. Previously stored data may have to be recomputed to generate reports over a range of time that involves previous time periods. Since each node stores snapshots of data, each node can recompute the data stored in its internal storage for any previous time point for which the node stored a snapshot. Furthermore, since different nodes may compute their data independent of other nodes, a re-computation of a set of nodes S1 may be performed independent of another set of nodes S2 of the data mesh if there are no data dependencies between the nodes of the two sets. The system tracks the data dependencies across various nodes of the data mesh based on the directed acyclic graph structure of the data mesh to determine whether partial results of a set of nodes can be computed independent of other nodes of the data mesh.

Figure 15:
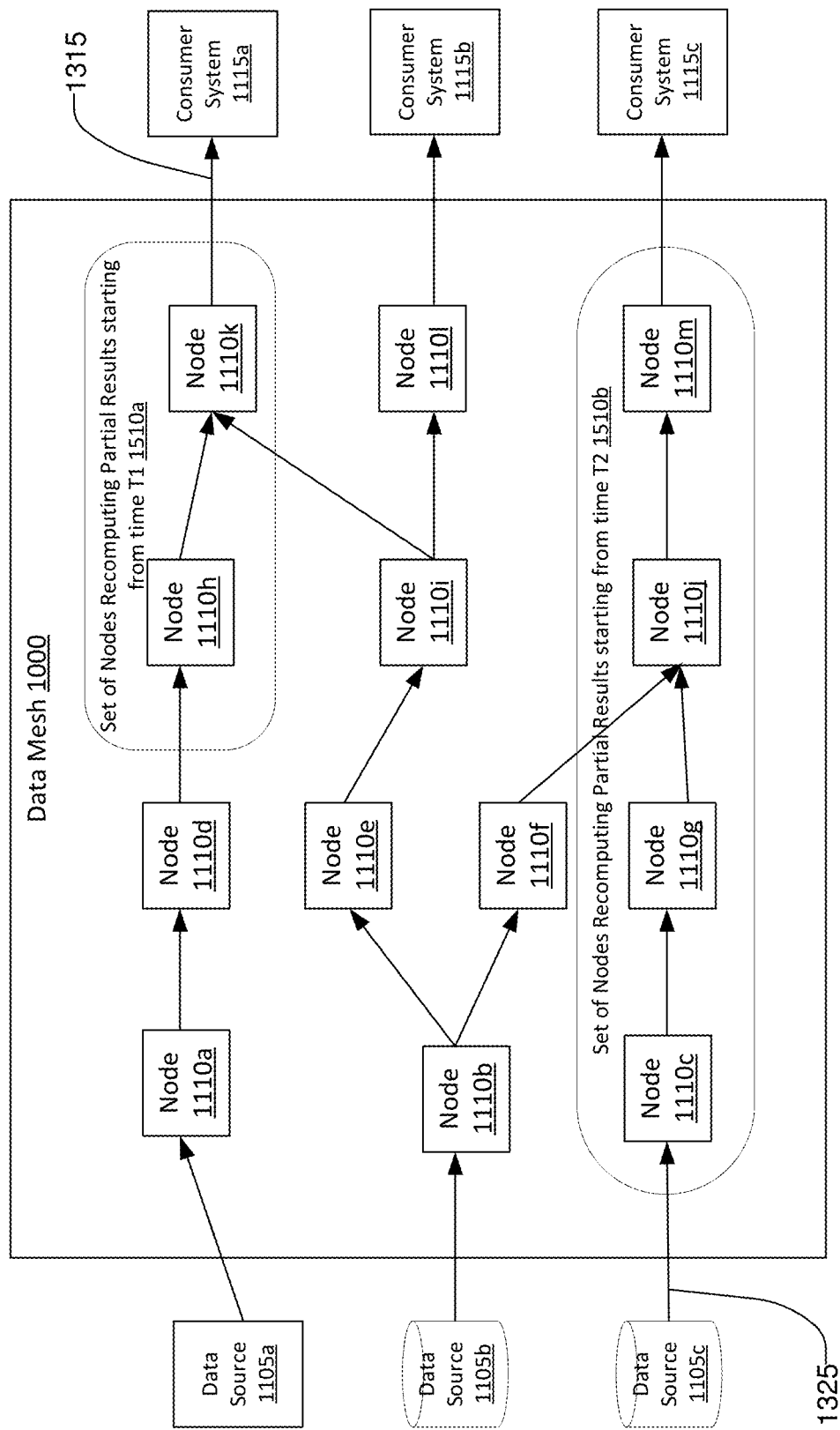
FIG. 15 illustrates re-computation of partial results of different portions of the data mesh starting from a time point, according to an embodiment.

FIG. 15 illustrates re-computation of partial results of different portions of the data mesh starting from a time point, according to an embodiment. The data mesh receives input data from data sources 1105a, 1105b, 1105c and provides output to consumer systems 1115a, 1115b, 1115c. As shown in FIG. 15, a set 1510a of nodes including nodes 1110h and 1110k recomputes the partial results stored in the nodes starting from time point T1 whereas the set of nodes 1510b comprising nodes 1110c, 1110gh, 1110j, and 1110m recomputes the partial results stored in the nodes of the set 1510b starting from point in time T2. The set of nodes 1510a may represent nodes that are selected based on lineage information of an output field that may be changed responsive to a change of requirements by consumer system 1115a. The set of nodes 1510b may represent nodes that are selected based on lineage information of an input field that may be changed responsive to a change in data source 1105c.

Note that a data mesh configured for a cloud platform 125a may be created on another cloud platform 125b using the declarative specification of the nodes of the data mesh, for example, as illustrated in FIG. 1B. Furthermore, similar to the configuration illustrated in FIG. 1C, a data mesh may be executed using nodes configured across multiple cloud platforms. For example, a set of nodes of the data mesh may be configured on cloud platform 125a and another set of nodes may be configured on cloud platform 125b.

Any input field or an output field of a data mesh may be one of (1) a data stream that provides data elements ate various time intervals or (2) a batch input that provides a data set comprising a plurality of data elements at one point in time.

Data Model Driven Design of Data Pipelines

The system receives a specification of a data pipeline comprising a plurality of data pipeline units. The data pipeline generates output representing a data model associated with an application. A data model constrains the data that is processed by a data pipeline unit. The interoperability schema is received and used to define the data model. Accordingly, the data model is designed so that it conforms to the interoperability schema used for defining the data model, for example, an original interoperability schema. An interoperability schema defines format for exchanging data across computer systems independent of the format of storage of the data in the computer systems. An interoperability schema may also be referred to herein as an interoperable schema. For each data pipeline unit of the data pipeline, the system generates instructions for configuring the data pipeline unit on the cloud platform from the specification of the data pipeline unit. The system deploys the data pipeline on the cloud platform using the generated instructions.

In an embodiment, the generated instructions comprise: (1) a system configuration for the data pipeline unit, the system configuration comprising instructions for configuring: one or more storage units on the cloud platform, a cluster of servers for execution of the data pipeline unit on the cloud platform, and one or more processing engines for executing instructions of the data pipeline unit, and (2) a deployment package comprising: data flow instructions for orchestrating the flow of data across resources of the data pipeline unit, and a transformation processing instructions package for performing the one or more data transformations of the data pipeline unit.

The system may modify an existing data pipeline unit to generate the modified data model. For example, the system may identify a data pipeline unit of the data pipeline that generates all elements of the modified interoperability schema. If the data pipeline unit generates a set $S_i$ of outputs, the system modifies the data pipeline unit to generate a set $S_{i+1}$ of outputs representing the modified data model.

The system may modify the structure of the data pipeline by adding data pipeline units. For example, the system identifies a data pipeline unit $D_1$ that generates a subset $S_1$ of elements of the modified interoperability schema and a data pipeline unit $D_2$ that generates a subset $S_2$ of elements of the modified interoperability schema. The system generates a data pipeline unit $D_3$ that receives inputs from the data pipeline unit $D_1$ and the data pipeline unit $D_2$ and generates a set of outputs representing the modified data model.

The system further receives a differential interoperability schema representing a modification to the data model associated with the application. The differential interoperability schema specifies differences compared to the original interoperability schema. The system generates a set of instructions to modify the data pipeline. The modified data pipeline generates outputs representing a modified data model conforming to a composition of the original interoperability schema and the differential interoperability schema. The system reconfigures the data pipeline on the cloud platform based on the generated instructions. The system executes the reconfigured data pipeline on the cloud platform to provide data conforming to the modified data model to the application.

Reconfiguring a Data Mesh Based on Incremental Schema Modification

A data mesh provides data to one or more consumers. Accordingly, the data mesh is structured so as to be able to provide the data that is requested by the consumers. The requirements of consumers may change over time. For example, new consumers may be added with new requirements. A consumer may change the requirements over time, for example, as the system of the consumer gets modified over time.

An example of a consumer is a system based on machine learning model that makes predictions that are used for an application. The requirements of the consumer may change if there are changes to the machine learning model, for example, if the machine learning model needs new features. The requirements of the consumer may change if the type of machine learning model used in a new release of the application is changed. The system restructures the data mesh based on changes to the requirements of the consumers of the output generated by the data mesh.

Figure 16A:
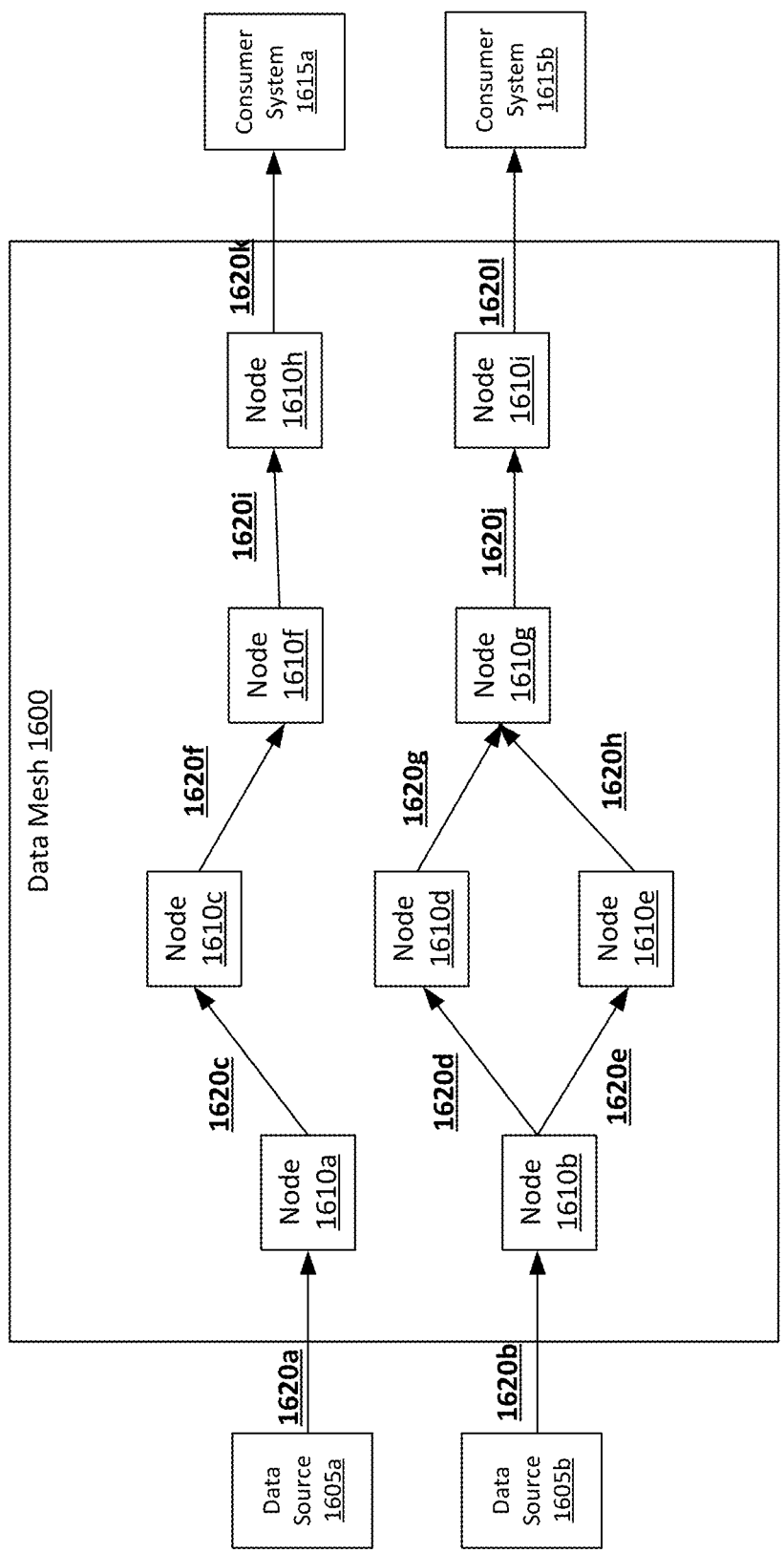
FIGS. 16A-C illustrates restructuring of a data mesh based on changes in the requirements of consumers, according to an embodiment.
Figure 16B:
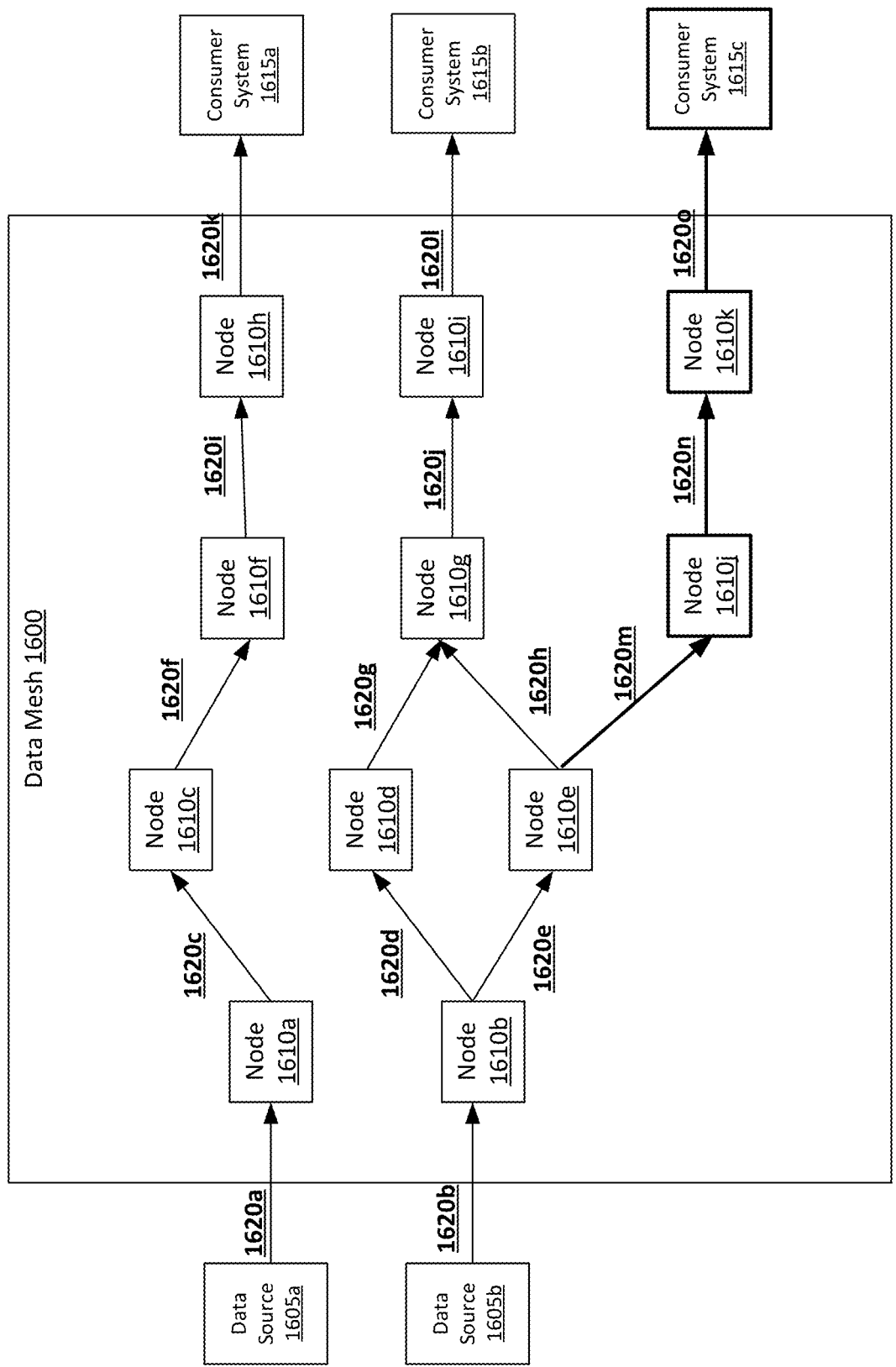
Figure 16C:
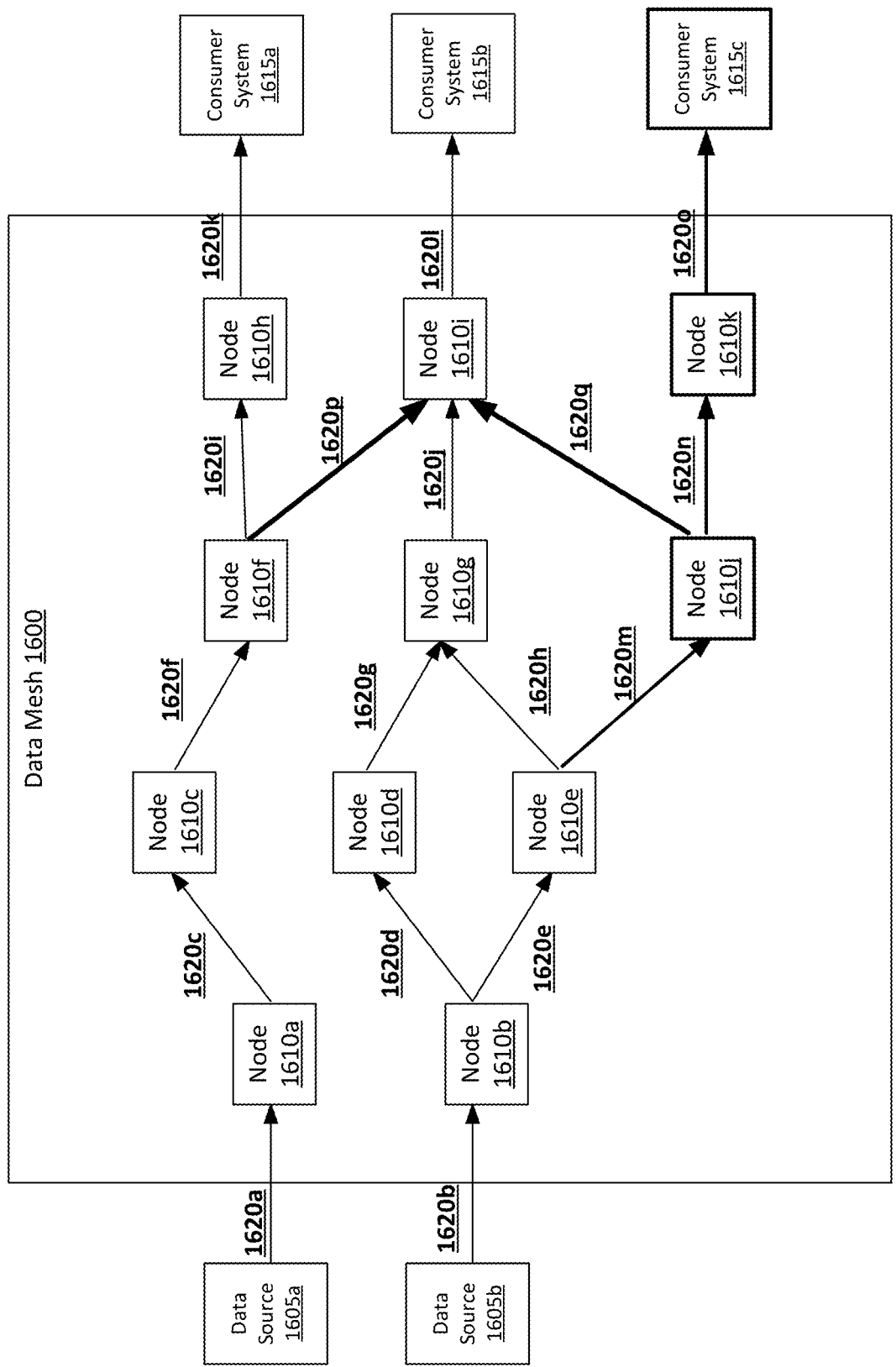

FIGS. 16A-C illustrates restructuring of a data mesh based on changes in the requirements of consumers, according to an embodiment. The data mesh in FIG. 16A shows two consumer systems 1615a and 1615b. The data mesh includes nodes 1610a, 1610b, 1610c, 1610d, 1610e, 1610f, 1610g, 1610h, 1610i, each node representing a data pipeline unit. Two nodes may be connected by an edge 1620 that indicates that the output of a node is provided as input to another node. For example, the output of the node 1610a is provided as input to node 1610c as indicated by edge 1620c, the output of the node 1610c is provided as input to node 1610f as indicated by edge 1620f, the output of the node 1610f is provided as input to node 1610h as indicated by edge 1620i, and so on. An edge may indicate an input received by a node from a data source 1605 or an output provided to a consumer system 1615, wherein the data sources 1605 and consumer systems 1615 are treated as nodes, for example, external nodes. In some embodiments, the outputs of the computer systems 1615a, 1615b, and 1615c may be fed back to a node of the data mesh.

FIG. 16B illustrates restructuring of the data mesh 1600 responsive to a new consumer being added. The new consumer 1615c provides the requirements of the data that the data mesh needs to generate, and the data mesh is modified to generate the new data. As shown in FIG. 16B, the nodes 1610j and 1610k are added to the data mesh to be able to generate the data requested by the consumer system 1615c. The edges 1620m, 1620n and 1620o provide the data flow necessary for generating the output for the consumer system 1615c.

A data mesh may have to be restructured responsive to changes of requirements of an existing consumer. For example, an existing consumer may request new fields or modification to existing fields that require additional or different data for processing. For example, FIG. 16C shows a data mesh that is restructured due to changes in the requirements of the consumer 1615b. Assuming the consumer 1615c requires additional fields, the system identifies the other data pipeline units that compute the required data and add edges 1620p and 1620q to direct the required data for processing by the node 1610i so that the new requirements of the consumer 1615b are met.

An output node, for example, node 1610h, 1610i, or 1610k generates the output and provides the generated output to a consumer system 1615. Accordingly, the output nodes generate a data model that conforms to the requirements of their corresponding consumer systems. The internal nodes such as nodes 1610f, 1610g, 1610j, etc. generate data models that represent partial data models that generate a subset of data that may be used by another node or by an output node for generating the output data model.

In an embodiment, the consumer systems 1615 specify their requirements of data using a schema. For example, the consumer systems 1615 specify their requirements of data using an interoperability schema that may be domain specific, depending on the type of application that is using the data. An example of an interoperability schema is the Fast Healthcare Interoperability Resources (FHIR) used in the healthcare domain. The FHIR schema allows users to define various entities used in the healthcare domain such as patients, practitioners, treatments, and so on. The techniques disclosed herein are not limited to any specific type of schema. A schema defines a set of elements, each element representing a value or a set of values. An element may represent fields of a record, for example, name of a user, age of a user, address of a user. An element may be a collection of fields such that each field itself is an element.

A data pipeline unit may generate data that may be useful for several different consumers, each consumer using a distinct subset of the data or a subset of data that is transformed in a specific way. Accordingly, a data pipeline unit may generate different data models, one for each potential use of the data.

According to an embodiment, the system receives requirements from a set of consumers and configures the data mesh that represents one or more data pipelines configured on a cloud platform or across multiple cloud platforms. The system further receives updates to the specifications of the consumers and determines the changes to the data mesh. The system generates instructions for making the necessary changes to the data mesh and deploys these changes. Accordingly, the system performs continuous integration/continuous delivery (CI/CD) of updates to the data mesh depending on the changes to the requirements that may be specified using interoperability schemas.

Figure 17:
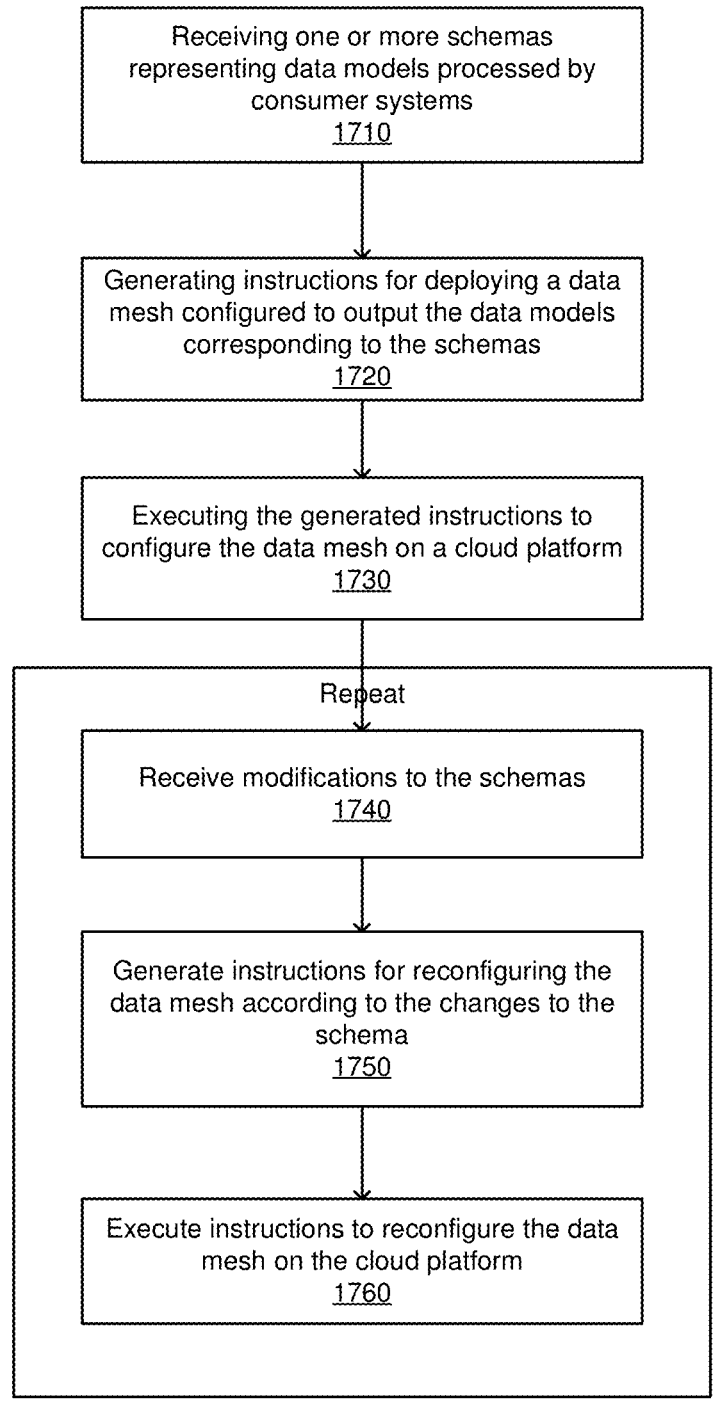
FIG. 17 shows a flowchart illustrating the process for modifying data pipelines deployed on a cloud platform according to an embodiment.

FIG. 17 shows a flowchart illustrating the process for modifying data pipelines deployed on a cloud platform according to an embodiment. The description below indicates the steps as being performed by a system, for example, the data pipeline generation system, for example, by the schema analysis module 235 in conjunction with other modules including the deployment module 230 and data pipeline unit builder 220.

The system receives 1710 one or more schemas that represent data models processed by the applications running on consumer systems. For example, an application running on a consumer system may execute a machine learning based model to predict certain actions and provides a schema representing the inputs of the machine learning model.

The system generates 1720 instructions for data pipeline units of a data mesh, for example, as illustrated in FIGS. 10-11. The data mesh is configured to generate the data corresponding to the data models represented by the received schemas. The data mesh may generate multiple data models, each data model corresponding to one or more consumer systems. The system executes 1730 the generated instructions to configure the data mesh on the cloud platform. The system may provision the resources needed by the data pipeline units of the data mesh. The system deploys any software artifacts representing the instructions of various transformations performed by the data pipeline units. Accordingly, the data pipeline is configured on the cloud platform and can be executed when input data is received.

Subsequently, the system may modify the data pipeline that is configured on the cloud platform by executing the steps 1740, 1750, 1760. These steps may be repeated multiple times, depending on the number of times the output of the data mesh is modified. For example, the requirements of a consumer systems may be modified iteratively to try different data models before finalizing on a specific data model. Alternatively, the requirements of a consumer system may be modified from one release to another when a new set of features is released for an application executing on the consumer system. Furthermore, the output of the data mesh may have to be modified if a new consumer system is added or an existing consumer system starts running a new application that requires inputs that were not previously generated by the data mesh.

For each iteration, during which the system makes a change to the data pipeline, the system performs following steps. The system receives 1740 changes to the schemas representing the changes in the data models that are generated by the data pipeline. The system generates 1750 instructions for reconfiguring the data mesh according to the changes to the schema. The instructions may include new data pipeline units or changes to existing data pipeline units, for example, changes to transformations to generate any new or modified values according to the changed data model that needs to be generated. The system executes 1760 the generated instructions to reconfigure the data mesh on the cloud platform. The reconfiguring of the data mesh includes deploying new instructions for the data pipeline units that are either completely new or are modified. The selective modification and generation of data pipeline units representing the minimal changes that need to be made to the data pipeline provide efficient updates of the data pipeline in a continuous integration/continuous delivery or deployment (CI/CD) of the data pipeline configured on a cloud platform.

Figure 18:
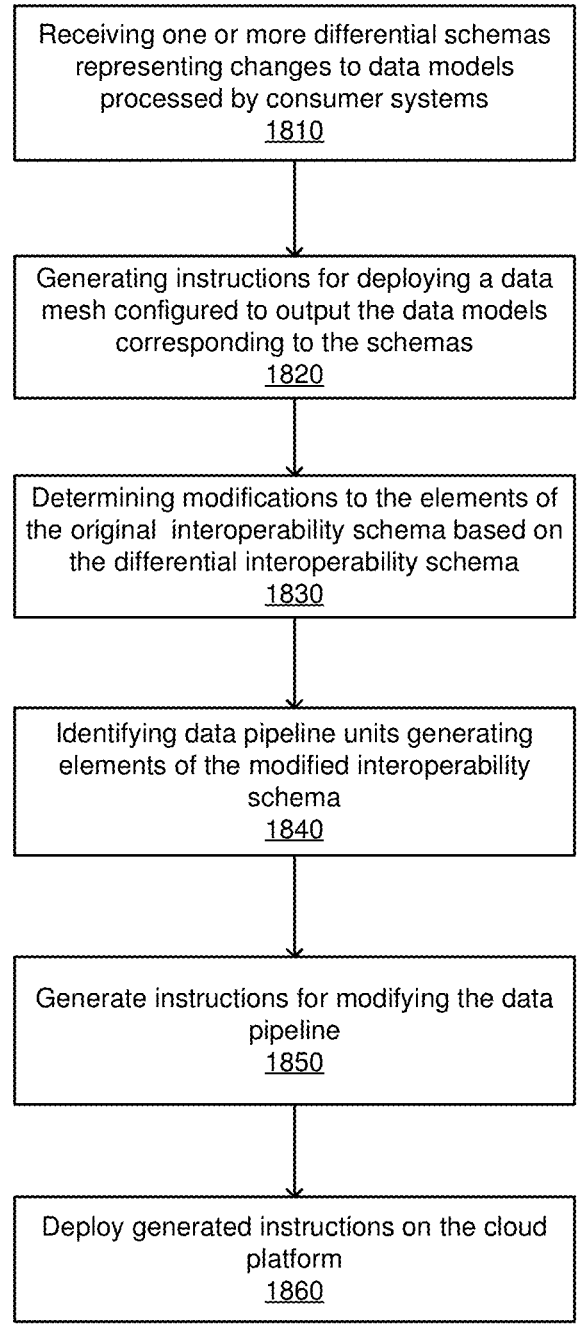
FIG. 18 shows a flowchart illustrating the process for modifying data pipeline units based on changes to a data model of a consumer system according to an embodiment.

According to an embodiment, the schema that specifies the data model for a consumer system is an interoperability schema that is domain specific, for example, a FHIR schema. FIG. 18 shows a flowchart illustrating the process for modifying data pipeline units based on changes to a data model of a consumer system according to an embodiment. The description below indicates the steps as being performed by a system, for example, the data pipeline generation system, for example, by the schema analysis module 235 in conjunction with other modules including the deployment module 230 and data pipeline unit builder 220.

The system receives 1810 a schema that represents a change in a target data model compared to an original data model. According to an embodiment, the schema is a differential interoperability schema that identifies an original interoperability schema and may provide specification of a subset of elements of the original interoperability schema. The specified subset of elements of the original interoperability schema defines the difference between the target data model compared to the original data model. For example, the differential interoperability schema may define an element that is also defined in the original interoperability schema but with a different set of attributes compared to the definition in the original interoperability schema. The differential interoperability schema may define the element with additional constraints, for example, size constraints, constraints on cardinality, type constraints, format constraints, value constraints, and so on.

The system identifies 1820 the original interoperability schema based on the differential interoperability schema. For example, the differential interoperability schema may store a link, for example, a uniform resource locator (URL) of the original interoperability schema. Alternatively, the system may store metadata describing relations between the schemas based on information that may be user specified.

The system determines 1830 modifications to the elements of the original interoperability schema based on the differential interoperability schema. The system, accordingly, builds a data model corresponding to a modified interoperability schema obtained by composing the original interoperability schema and the differential interoperability schema. The data model built represents a modified data model for the consumer system for which the generated output is being targeted. The differential interoperability schema may specify elimination of one or more elements existing in the original interoperability schema or addition of one or more new elements to the original interoperability schema. Accordingly, the modified interoperability schema may have different elements compared to the original interoperability schema.

The system further compares the specification of each element of the differential interoperability schema with the corresponding elements of the original interoperability schema to determine if the element is being modified in a particular way, for example, by adding specific constraints. The system generates transformations that add the corresponding constraints to the elements and generate the right element for the modified data model that conforms to the differential interoperability schema. Examples of the transformations performed for various constraints specified in a differential interoperability schema are further described herein.

The system identifies 1840 data pipeline units of the data pipeline that generate elements of the modified interoperability schema. In an embodiment, the system maintains a catalog that identifies fields that are computed by various data pipeline units, for example, as part of the registry 210. The system identifies the elements of the modified interoperability schema and checks the catalog to identify the data pipeline units that generate the identified elements.

The system generates 1850 instructions for modifying the data pipeline to generate output representing the modified data model conforming to the modified interoperability schema. For example, if the system identifies a single data pipeline unit that generates all the elements of the modified interoperability schema, the system may modify the data pipeline unit to generate a new output data model corresponding to the modified interoperability schema. If the system determines that the elements of the modified data model are spread across a set of data pipeline units, the system may generate a new data pipeline unit that receives inputs from the data pipeline units of the set of data pipeline units to collect all the necessary elements of the modified data model. The generated new data pipeline unit is configured to output data that represents the modified data model.

The system deploys 1860 the generated instructions to the cloud platform. The system may generate software artifacts for any modified data pipeline units or new data pipeline units. The system may determine if any resources of the modified data pipeline units need to be reconfigured. If the resources of a modified data pipeline unit need to be reconfigured, the system generates instructions for reconfiguring these data pipeline units. If the system generates a new data pipeline unit, the system generates instructions for configuring the new data pipeline units, for example, any storage units used by the data pipeline unit. The system executes the generated instructions to provision the resources for the new or modified data pipeline units and deploys the generated software artifacts to the corresponding data pipeline units.

The system modifies the data pipeline unit by generating and reconfiguring the minimum amount of the portion of the data pipeline unit necessary to generate the modified data model. Accordingly, the system improves the computational efficiency of the monolithic systems that may modify and regenerate the entire data pipeline of large portions of the data pipeline.

The specification based on interoperability schema can be used to generate different data models for the same underlying data, each data model differing from underlying data using constraints that are specified using the interoperability schema.

Figure 19:
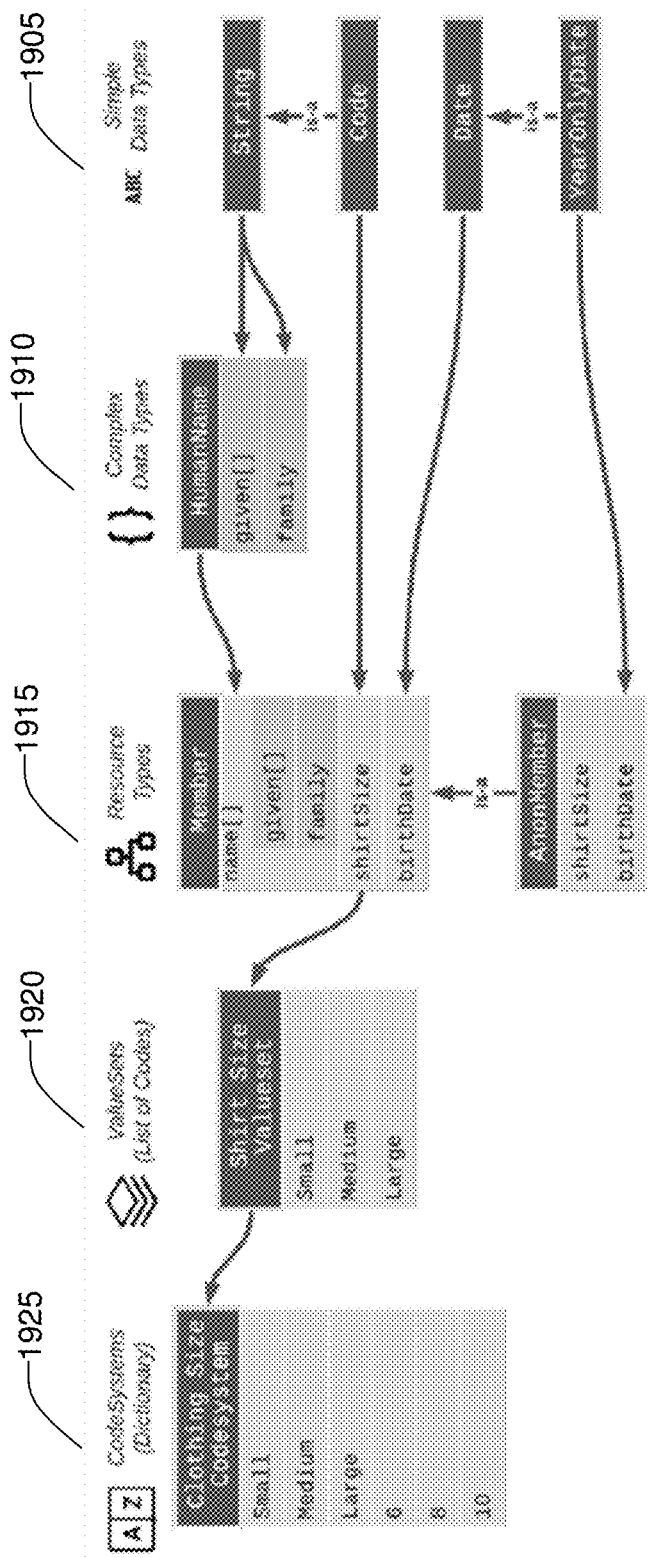
FIG. 19 shows various data types that can be defined using an interoperability schema that can be used to constrain input data and define different data models according to an embodiment.

A consumer system may provide an interoperability schema that uses specific data types to specify a data model used by an application. FIG. 19 shows various data types that can be defined using an interoperability schema that can be used to constrain input data and define different data models according to an embodiment. The interoperability schema allows a user to define simple data types 1905 that include a single value such as string and date. The simple types may be customized to define customized simple types, for example, a string may be customized to define code and date may be customized to define YearOnlyDate that is a lower resolution representation of date that includes year only.

The interoperability schema further allows specification of complex data types 1910 by combining simple data types 1905. A complex data type 1910 represents a structure with sub-elements. An example of a complex data type 1910 is HumanName that includes two simple data types, a given name and a family name.

The interoperability schema further allows specification of resource types 1915 that represent complex types that may be used as units of exchange across computing systems. These may be defined as structures that are returned by APIs, for example, by REST (representational state transfer) APIs. Resource types have identity and they can be the subject of a REST action, such as get, put, or delete operation. A resource type can be referenced by another type.

According to an embodiment, the system records changes to resource types. For interoperability schema allows users to specify value sets 1920, for example, shirt size that has values small, medium, and large. The values of a value set form codes that have values defined in a code system 1925 that represents a dictionary that maps codes to values.

If a change is made to an attribute of instance of a resource type, the system creates a new version of the instance. For example, a member resource type has attributes name (a complex data type), shirtSize (a value set), and birthdate (a simple type). A change to attribute shirtSize in this example is a state change to a member instance, and a new version of that member is created by the system for tracking member changes.

The outputs of a data pipeline unit support different interfaces including stream interface, SQL (structured query language) interface (or database interface), REST interface, a file interface, for example, ADLS (AZURE data lake storage) interface, and so on. A data pipeline unit may provide an SQL query interface that projects the entire output data model in a single SQL schema so that data can be joined in queries. Event stream interface may provide notifications that applications may subscribe to. Accordingly, the application is notified whenever data is available at the event stream interface.

Figure 20:
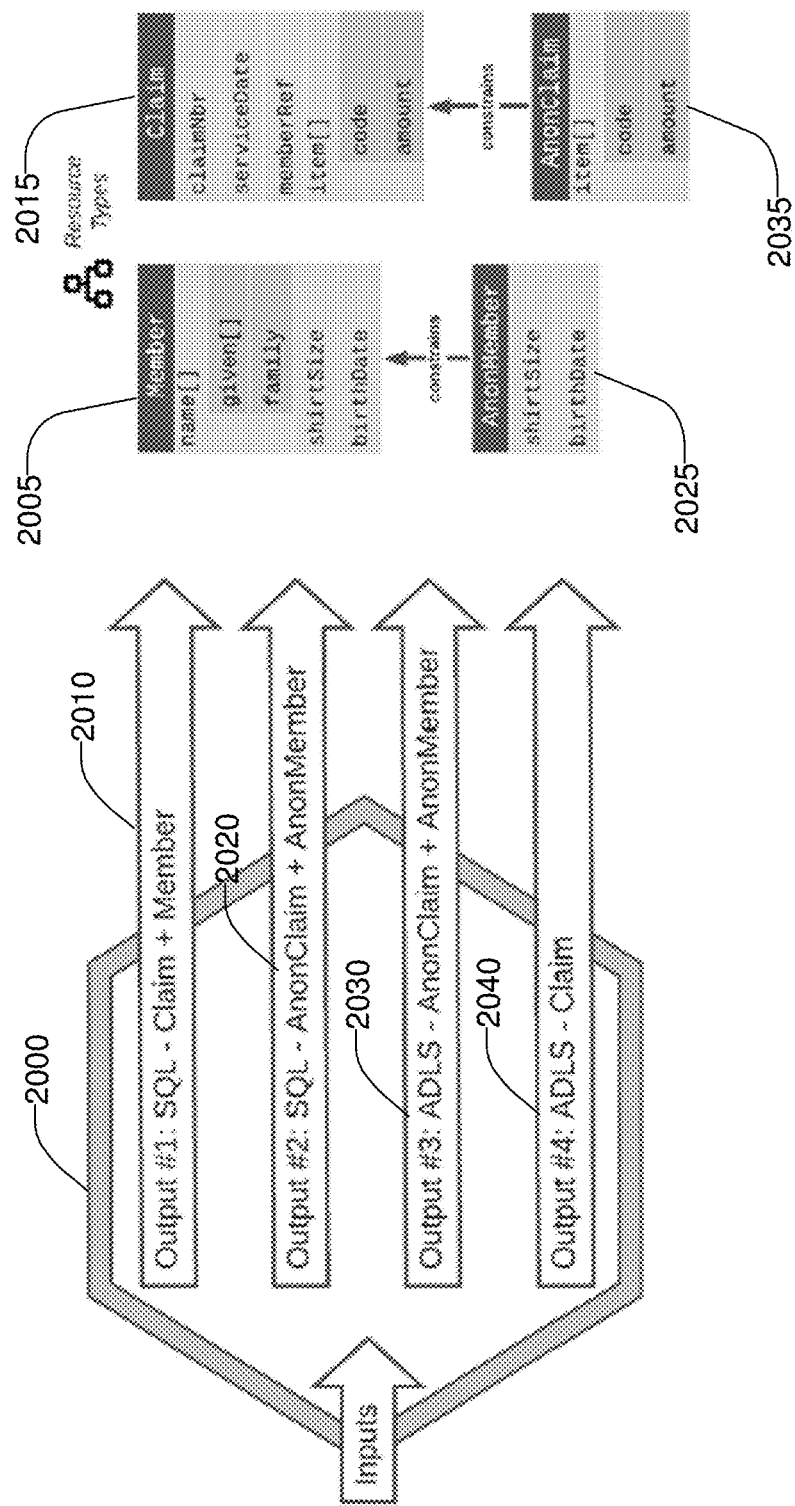
FIG. 20 shows an example data pipeline unit that generates different data models according to an embodiment.

FIG. 20 shows an example data pipeline unit 2000 that generates different data models according to an embodiment. The interoperability schema defines various types including a Member type 2005 and a Claim type 2015. The type AnonMember 2025 is obtained by constraining the Member type by removing the name attribute. The type AnonClaim 2035 is obtained by constraining the Claim type by removing the various attributes including the claim number, member reference, and so on. The data pipeline unit 2000 supports four different output ports.

The output port 2010 provides an SQL interface that has a data model comprising a claim and member objects. The output port 2020 provides an SQL interface that has a data model comprising the AnonClaim and the AnonMember objects. The output port 2030 provides an ADLS interface that has a data model comprising the AnonClaim and the a AnonMember objects. The output port 2040 provides an ADLS interface that has a data model comprising the claim object. Accordingly, two different output ports may have different interfaces, different data models, or both.

Examples of Transformations Generated Based on a Differential Schema

The system uses the specification based on interoperability schema to constrain data computed by various data pipeline units. Following is an example, database language command defining a database table for storing records describing addresses (simple_address) including one or more strings for storing lines representing street address, a string representing city, two character string for representing state and a 5 character string for representing zip code. This represents a storage definition of elements of the records indicating the storage used for the elements.

CREATE TABLE SIMPLE_ADDRESS (
   LINE_1 VARCHAR(64),
   LINE_2 VARCHAR(64),
   CITY VARCHAR(64),
   STATE CHAR(2),
   ZIP CHAR(5)
)

Following are examples of how interoperability schema such as FHIR is used to specify data. Following specification based on interoperability schema represents data elements corresponding to simple_address defined above. The interoperability schema identifies types using URLs and specifies a version for each type specification. An element has an id/path, a minimum and maximum number of occurrences the element may appear (e.g., to specify arrays and repeating types), and an element type which may be any other type. In the following simple_address example, each element uses a simple type. The specification constrains state to have only 2 characters and zip code only 5 characters which matches the storage definition of the elements.

{ "resourceType":"StructureDefinition",
   "url" : http://xyz.com/types/StructureDefinition/simple-address",
   "version":"1.0.0",
   "kind":"logical",
   "derivation":"specialization",

```
"differential": {
    "element": [
        { "id":"SimpleAddress", "path":"SimpleAddress"}
        { "id":"SimpleAddress.line", "path":"SimpleAddress.line",
            "min": 0, "max":"2",
            "type":[{ code:"string" }]
        },
        { "id":"SimpleAddress.city", "path":"SimpleAddress.city",
            "min": 0, "max":"1",
            "type":[{ code:"string" }]
        },
        { "id":"SimpleAddress.state", "path":"SimpleAddress.state",
            "min": 0, "max":"1",
            "type":[{ code:"string" }],
            "maxLength": 2
        },
        { "id":"SimpleAddress.zip", "path":"SimpleAddress.zip",
            "min": 0, "max":"1",
            "type":[{ code:"string" }]
            "maxLength": 5
        }
    ]
  }
}
```

Following are examples of differential interoperability schemas that illustrate how the specification is used to constrain data output by a data pipeline unit. The differential interoperability schema redefines an element from an original interoperability schema with a modified definition. The differences in the specification of the element between the differential interoperability schema and the original interoperability schema are determined by the system. The system determines the constraints that need to be placed on the output of the data pipeline unit based on the differences in the specification. The system generates transformations for the data pipeline unit based on the constraints.

The following differential interoperability schema uses the schema defining the simple_address as shown above as the original interoperability schema and specifies the maximum size of the elements line and zip to be zero, effectively removing them from the simple address. Accordingly, the system generates a filter that remove the two elements line and zip from simple address records.

```
{ "resourceType":"StructureDefinition",
    "url":"http://xyz.com/types/StructureDefinition/city-address",
    "version":"1.0.0",
    "kind":"logical",
    "derivation":"constraint"
    "baseDefinition":
"http://xyz.com/types/StructureDefinition/simple-address"
    "differential": {
        "element":[
            {
                "id":"SimpleAddress.line", "path":"SimpleAddress.line",
                "max" : "0"
            },
            { "id":"SimpleAddress.zip", "path":"SimpleAddress.zip",
                "max":"0:
            }
        ] }
}
```

The following differential interoperability schema uses a schema defining patients that have a gender element as the original interoperability schema. The differential interoperability schema specifies the gender element to have value "female" only. Accordingly, the data pipeline unit is constrained to output only patient records of females. Accordingly the system generates a transformation that selects only records with gender attribute having "female" value.

```
{ "resourceType":"StructureDefinition",
    "url":"http://xyz.com/types/StructureDefinition/female-patient",
    "name":"Female Patient",
    "version":"1.0.0",
    "kind":"resource",
    "derivation":"constraint"
    "baseDefinition":"http://abc.org/fhir/StructureDefinition/Patient"
    "differential": {
        "element":[
            {
                "id":"Patient.gender", "path":"Patient.gender"
                "min": 1,
                "fixedCode":"female"
            }
        ]}
}
```

The following differential interoperability schema defines a date time type that reduces the resolution of date type that includes day, month, and year to a date time representation that has year only. The differential interoperability schema refers to a URL of a datetime type with reduces resolution that includes instructions for computing the lower resolution date time format.

```
{ "resourceType":"StructureDefinition",
    "url" :
"http://xyz.com/types/StructureDefinition/procedure-deresolutioned",
    "name":"De-resolutioned Procedure"
    "version" : "1.0.0",
    "kind":"resource",
    "derivation":"constraint",
    "baseDefinition" : "http://abc.org/fhir/StructureDefinition/Procedure"
    "differential": {
        "element":[
            {
                " id":"Procedure.performed[x] :performDateTime",
                "path" : "Procedure.performedDateTime"
                "type":[{
                    "code":"dateTime",
                    "profile" :
["http://xyz.com/types/StructureDefinition/datetime-yearonly"]
                }]
            }
        ]}
}
```

The following differential interoperability schema constrains the simple address records to records that have addresses within west coast of US (United States). The schema includes a URL of a set of values of codes of states that represent west coast of US. The system generates a transformation for a data pipeline unit that filters simple address records that have state having a code that is within the set of values of codes representing west coast of US. Similar value sets may be used to constrain the addresses to different subsets, for example, addresses on east coast of US, addresses within a specific state, addresses within a predefined set of states such as states where an organization has branches, and so on.

```
{ "resourceType":"StructureDefinition",
    "url":"http://xyz.com/types/StructureDefinition/west-coast-address",
    "version":"1.0.0",
    "kind":"logical",
    "derivation":"constraint",
```

```
    "baseDefinition":"http://xyz.com/types/StructureDefinition/us-address"
    "differential": {
       "element":[
          {"id":"SimpleAddress.state", "'path":"
SimpleAddress.state",
          "binding": {
             "strength":"required",
             "description":"State must be one of the west coast states.",
             "valueSet":
"http://xyz.com/terms/ValueSet/usps-states-west-coast"
          }}
    ]}}
```

According to an embodiment, the interoperability schema is used to define custom primitive types. The system can specify an element to have a custom type, thereby constraining the values of that element. The following snippet of interoperability schema definition specifies integers to have a specific size, for example, 32 bits. Accordingly, if the differential interoperability schema specifies the type of an element to have the following integer type, the system adds transformations to the data pipeline unit to convert any numeric values to generate an integer that can be stored in 32 bits.

```
{
   "type": [{
      "code": "integer"
         "extension":[{
            "url":"http://xyz.com/types/fhir/extension/avro-type",
            "valueCode":"INT32"
         }]
      }]
}
```

The following snippet of interoperability schema defines a social security number type that checks whether an element representing social security numbers satisfies a specific format, for example, a 9 digit value without dashes. Accordingly, if the differential interoperability schema specifies the type of an element to have the social security number type, the system adds transformations to the data pipeline unit to convert other representations of social security numbers to the following representation as specified by the following interoperability schema definition.

{"id" "Member.pers_ssn",
"constraint":[{
"key":"mbr-ssn-pattern",
"severity":"error",
"human":"SSN must be represented without dashes and be at least 9 digits",
"expression":"matches ('^\\{9,}$')"
}]
}

These are examples of how the system uses interoperability schemas to generate data that conforms to specific formats or constraints and is ready for being processed by specific applications. This eases the burdens on the applications to check various constraints and formats and also makes it easier to manage resources that perform the additional processing within the data mesh architecture. Furthermore, the user can provide the data model for data used by the application using the declarative specification of the interoperability schema and the system automatically generates the required instructions to generate data that conforms to the specification.

Applications Using Data Models Generated by Data Pipeline

Figure 21:
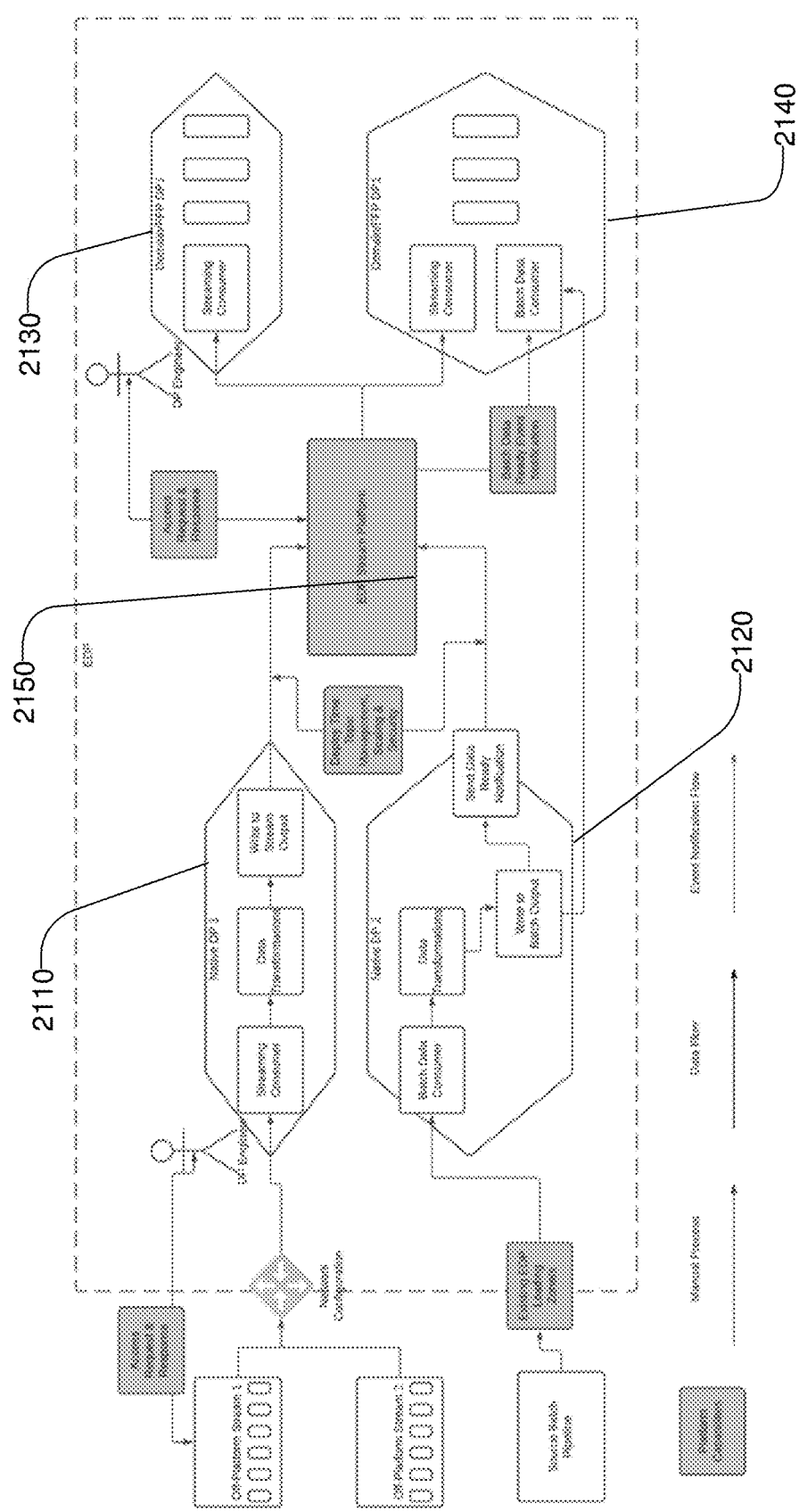
FIG. 21 shows an architecture of a data pipeline that allows input and output ports of stream type or batch type to support different types of applications according to an embodiment.

FIG. 21 shows an architecture of a data pipeline that allows input and output ports of stream type or batch type to support different types of applications according to an embodiment. The data pipeline illustrated in FIG. 21 includes various data pipeline units 2110, 2120, 2130, and 2140. The data pipeline units 2110 and 2130 process stream data and outputs stream data for consumer systems that process stream data. The data pipeline units 2120 and 2140 process batch data and outputs batch data for consumer systems that process batch data. The stream platform 2150 synchronizes the stream data and batch data. Accordingly, the stream platform 2150 generates batch data for data pipeline unit 2140 from stream data received from data pipeline unit 2110 and generates stream data for data pipeline unit 2130 from batch data received from data pipeline unit 2130.

An example application generates events, for example, based on user interactions. For example, the application may process patient requests for a medical system and generate events for every patient visit. The system receives indication of an occurrence of an event associated with the application, for example, a patient visit. The system further receives a filter associated with the event, for example, a filter that allows identifying the patient records. For example, the filter may use information identifying the patient to uniquely identify the patient records from a system. The system applies the filter to identify one or more records, for example, records for the patient. The system triggers execution of the data pipeline for the identified records to generate outputs conforming to the current data model. If the system iteratively modifies the data model based on differential interoperability schemas, the data pipeline generates data conforming to the latest data model. The system provides the generated output to the application. The data pipeline saves the generated outputs in a storage unit of one or more data pipeline units for batch processing, for example, data pipeline unit 2140. Saving the stream data in the data pipeline units configured for batch processing allows the system to user the stream data for batch operations such as periodic report generation. The system may receive a request for a batch operation for example, a request to generate a report describing events that occurred during a time interval such as last month. The data pipeline, for example, the data pipeline unit 2140 generates the requested report. Accordingly, the data pipeline allows batch operations based on stream data and stream operations based on batch data.

Access Control for Data Pipeline

The system manages access control of the data pipeline to minimize exposure of data in case of accidental or malicious breach of data. Accordingly, the system utilizes the data mesh architecture that separates the data pipeline into smaller data pipeline units to enforce the principle of least privilege by creating multiple user or system accounts and providing the accounts with access to different subsets of data processed by the data pipeline.

The system manages access control of a data pipeline deployed on a cloud platform. The system receives a specification of the data pipeline. The specification of the data pipeline specifies a plurality of data pipeline units. At least some of the data pipeline units receive data output by a previous data pipeline unit and provide data as input to a next data pipeline unit. The system identifies a cloud platform for deployment and execution of the data pipeline. The system generates instructions from the specification of the data pipeline for configuring the data pipeline units on the cloud platform. The system creates a connection with the cloud platform. For each of the plurality of data pipeline units, the system creates a runtime system account on the cloud platform. The runtime system account has access to one or more storage units of the data pipeline unit and is used by the system during execution of the data pipeline. The system provisions computing infrastructure on the cloud platform for the data pipeline unit. The system configures the data pipeline on the cloud platform by performing the following steps for each data pipeline unit. The system creates a group of runtime system accounts and adds the following system accounts to the group (1) the runtime system account created for the data pipeline unit and (2) each runtime system account created for a data pipeline unit receiving as input, data output by the data pipeline unit. The system grant read access to the output data of the data pipeline unit to each system account of the group. The system executes the data pipeline by executing instructions of each data pipeline unit as input data becomes available for the data pipeline unit. The use of different user groups including different runtime system accounts for different data pipeline units of the data pipeline results in limiting the scope of data access of different system accounts, thereby implementing a least privilege policy for executing the data pipeline.

According to an embodiment, the system creates an infrastructure system account for each data pipeline unit of the plurality of data pipeline units. The infrastructure system account has privileges to configure resources associated with the data pipeline unit. The system uses the infrastructure account is for provisioning computing infrastructure on the cloud platform for the data pipeline unit.

The techniques disclosed herein provide various benefits including distributed execution of data pipeline, modular upgrades to portions of data pipeline, selecting re-execution of the data pipeline, decentralized ownership and scaling using autonomous teams and individual data pipeline development, and so on. The infrastructure accounts and the runtime accounts are system accounts for use by system processes, for example, processes that execute the data pipeline on the cloud platform.

According to an embodiment, the data pipeline unit has a plurality of output ports and the system creates multiple groups of runtime system accounts for a data pipeline unit, each group of runtime system accounts for an output port of the data pipeline unit. For example, the plurality of output ports may include output port O1 and O2, and system creates a group G1 of runtime system accounts associated with the output port O1 and a group G2 of runtime system for the output port O2. The group G1 of runtime system accounts includes the runtime system account created for the data pipeline unit and each runtime system account created for a data pipeline unit receiving data output using the output port O1. The group G2 of runtime system accounts includes the runtime system account created for the data pipeline unit and each runtime system account created for a data pipeline unit receiving data output using the output port O2. The system grants read access to the data generated by the output port O1 to the runtime system accounts of the group G1 and grants read access to the data generated by the output port O2 to the runtime system accounts of the group G2. A port may also be referred to herein as an interface. Accordingly, an output port is an output interface of the data pipeline unit and an input port is an input interface of the data pipeline unit.

According to an embodiment, the data pipeline unit outputs data that is categorized into different levels of sensitivity. The system creates multiple groups of runtime system accounts for a data pipeline unit, each group of runtime system account for data output by the data pipeline unit that is categorized into a particular level of sensitivity. For example, the data pipeline unit may output a data set DS1 categorized as having a level L1 of sensitivity and a second data set DS2 categorized as having a level L2 of sensitivity. The system creates a group G1 of runtime system accounts with access to data set DS1 categorized as having level L1 of sensitivity and creates a group G2 of runtime system accounts with access to data set DS2 categorized as having level L2 of sensitivity.

According to an embodiment, the system receives a modified specification of the data pipeline unit of the data pipeline. The data pipeline unit provides input to a set S1 of data pipeline units. The data pipeline unit is associated with a group G1 of system accounts having read access to output ports of the data pipeline unit. The system reconfigures the data pipeline unit to conform to the modified specification of the data pipeline unit. Accordingly, the reconfigured data pipeline unit provides input to a set S2 of data pipeline units. The system modifies the group of system accounts having read access to output ports of the data pipeline unit according to a difference between the set S2 of data pipeline units and the set S1 of data pipeline units. For example, if the system determines that the set S2 of data pipeline units includes a particular data pipeline unit D1 that is absent from the set S1 of data pipeline units, the system adds a system account corresponding to the data pipeline unit D1 to the group G1 of system accounts. Similarly, if the system determines that the set S1 of data pipeline units includes a particular data pipeline unit D2 that is absent from the set S2 of data pipeline units, the system deletes a system account corresponding to the data pipeline unit D2 from the group of system accounts. Accordingly, the system modifies the access provided to the various system accounts as the specification of the data pipeline unit is modified.

Access Control Module

Figure 22:
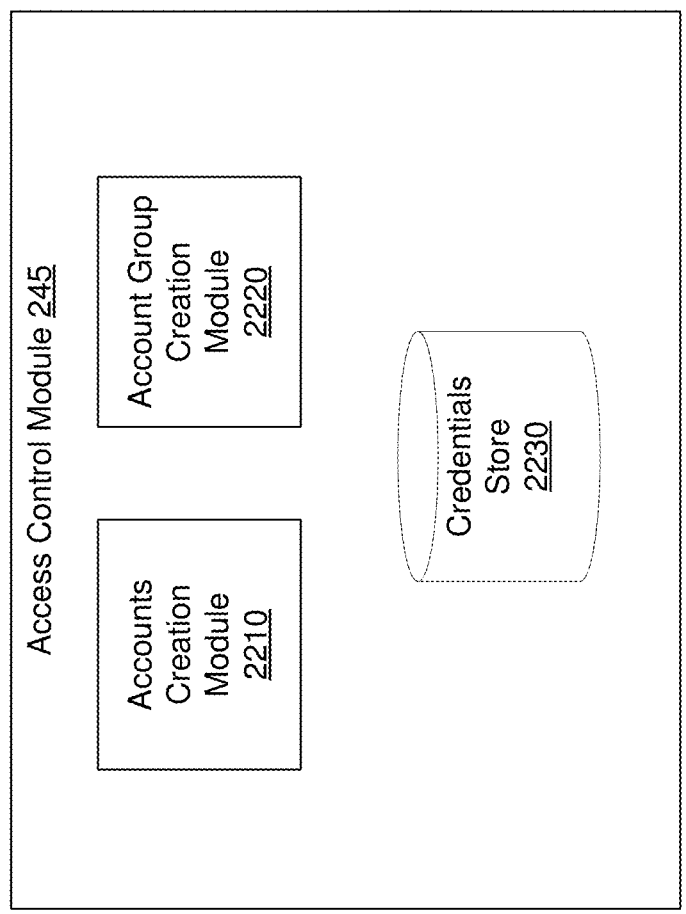
FIG. 22 illustrates the system architecture of the access control module according to an embodiment.

FIG. 22 illustrates the system architecture of the access control module according to an embodiment. The access control module 245 includes an accounts creation module 2210, an accounts group creation module 2220, and a credentials store 2230. Other embodiments may include more or fewer modules than indicated herein. The accounts creation module 2210 creates user accounts and system accounts for various data pipeline units. A system account is used by systems or processes that execute the data pipeline, for example, by system processes that automatically execute the instructions of the data pipeline units. A system account may also be referred to herein as a service principal. A user account is used by users, for example, teams of users or individual users such as developers or end users that need access to the output generated by one or more data pipeline units of the data pipeline.

The accounts group creation module 2220 groups the accounts created into various groups associated with different data pipeline units. Each group is provided data access according to the data that the accounts in the group need to access. The credentials store stores the credentials for various accounts created, for example, login and password information. The system accounts are used by processes executing in the system, for example, processes that execute various operations of the data pipeline units. The user accounts are used by users or applications associated with consumer systems that process the data generated by the data pipeline.

Process for Managing Access Control for the Data Pipeline

Figure 23:
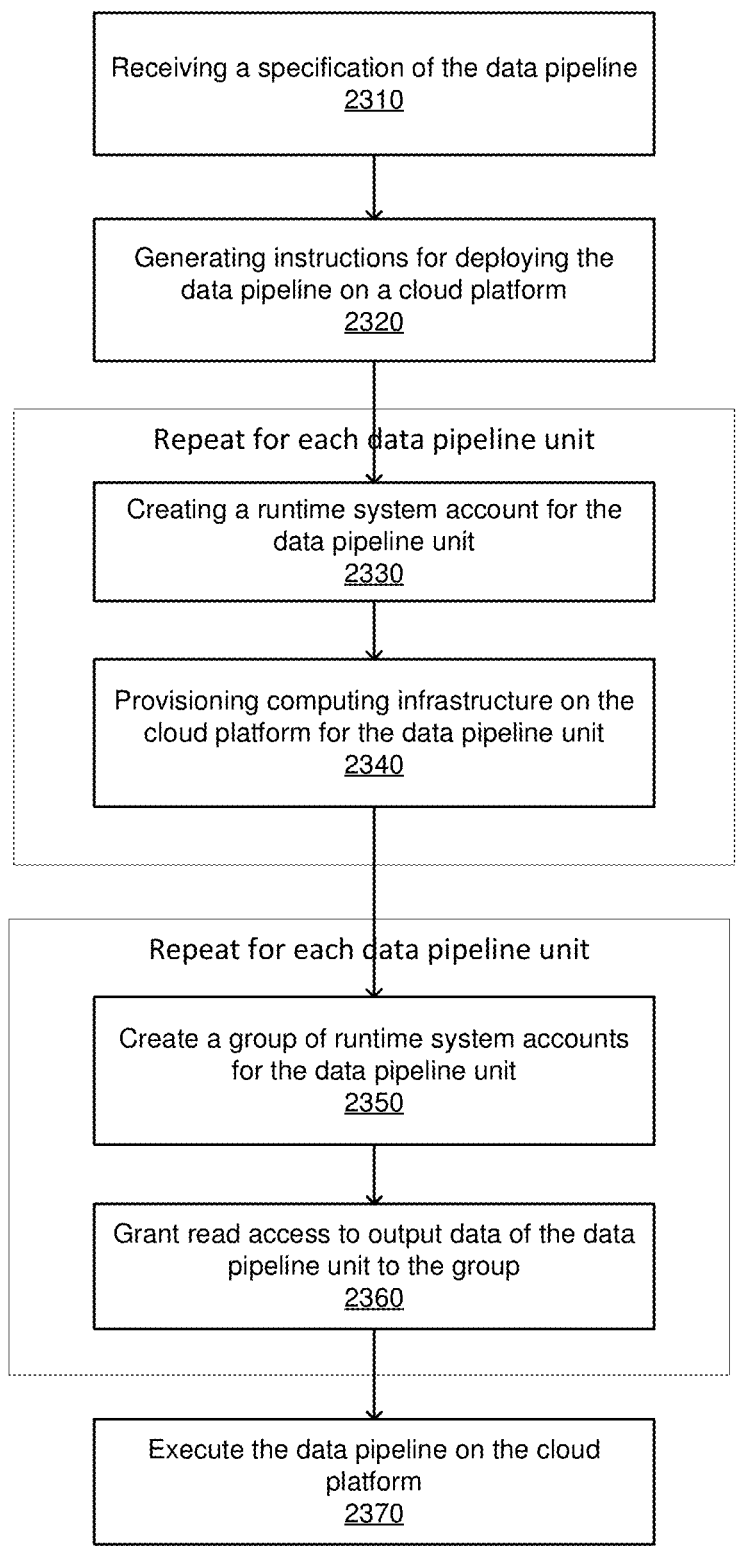
FIG. 23 illustrates the overall process for managing access control of the data pipeline according to an embodiment.

FIG. 22 FIG. 23 illustrates the overall process for managing access control of the data pipeline according to an embodiment. The steps disclosed in FIG. 23 may be performed by various modules of a system such as the data pipeline generation system 100, for example, the access control module 245.

The system receives 2310 a specification of the data pipeline. The specification of the data pipeline comprises a plurality of data pipeline units. At least some of the data pipeline units receive data output by a previous data pipeline unit and provide data as input to a next data pipeline unit. The system identifies a cloud platform for deployment and execution of the data pipeline and generates 2320 instructions from the specification of the data pipeline for configuring the plurality of data pipeline units on the cloud platform. The system creates a connection with the cloud platform and executes the generated instructions.

For each of the plurality of data pipeline units, the system creates 2330 a runtime system account on the cloud platform. The runtime system account has access to one or more storage units of the data pipeline unit. Furthermore, for each data pipeline unit, the system provisions 2340 the computing infrastructure in accordance with the specification of the data pipeline unit on the cloud platform.

The system configures the data pipeline on the cloud platform by performing the following steps for each data pipeline unit. The system creates 2350 a group of runtime system accounts including (1) the runtime system account created for the data pipeline unit and (2) each runtime system account created for a data pipeline unit receiving as input, data output by the data pipeline unit. The system grants 2360 read access to the output data of the data pipeline unit to each system account of the group. According to various embodiments, the system may create one group of runtime system accounts for the data pipeline unit or multiple groups of runtime system accounts for the data pipeline unit. FIGS. 24-26 illustrate these embodiments.

The system executes 2370 the data pipeline by executing instructions of each data pipeline unit as data becomes available as input to the data pipeline unit. The access granted to the various system accounts by the above steps ensures that each system account can only access the minimum amount of data that it needs to process. Accordingly, a system account does not have access to data that it does not need to process. This ensures that if any account modifies data accidentally, the scope of the data modified is limited to the maximum extent possible, thereby minimizing the blast radius of the scope of such modification.

In an embodiment, the system creates for each data pipeline unit of the data pipeline, an infrastructure system account with privileges to configure resources associated with the data pipeline unit. The system uses the infrastructure system account for provisioning computing infrastructure on the cloud platform for the data pipeline unit. The system creates separate infrastructure system account and runtime system account since the access required for each type of system accounts is different. For example, the infrastructure system account that provisions the computing resources may not need read access to sensitive data that may be stored in storage units. Similarly, runtime system account may need read/write access to storage systems used by the data pipeline unit but does not need access to modify the amount of storage, allocate new storage, and so on. Separating the two types of accounts allows the system to ensure that each account has the least privilege needed for provisioning and executing the entire data pipeline on the cloud platform.

Creating Account Groups for Managing Access Control for Data Pipeline

Figure 24A:
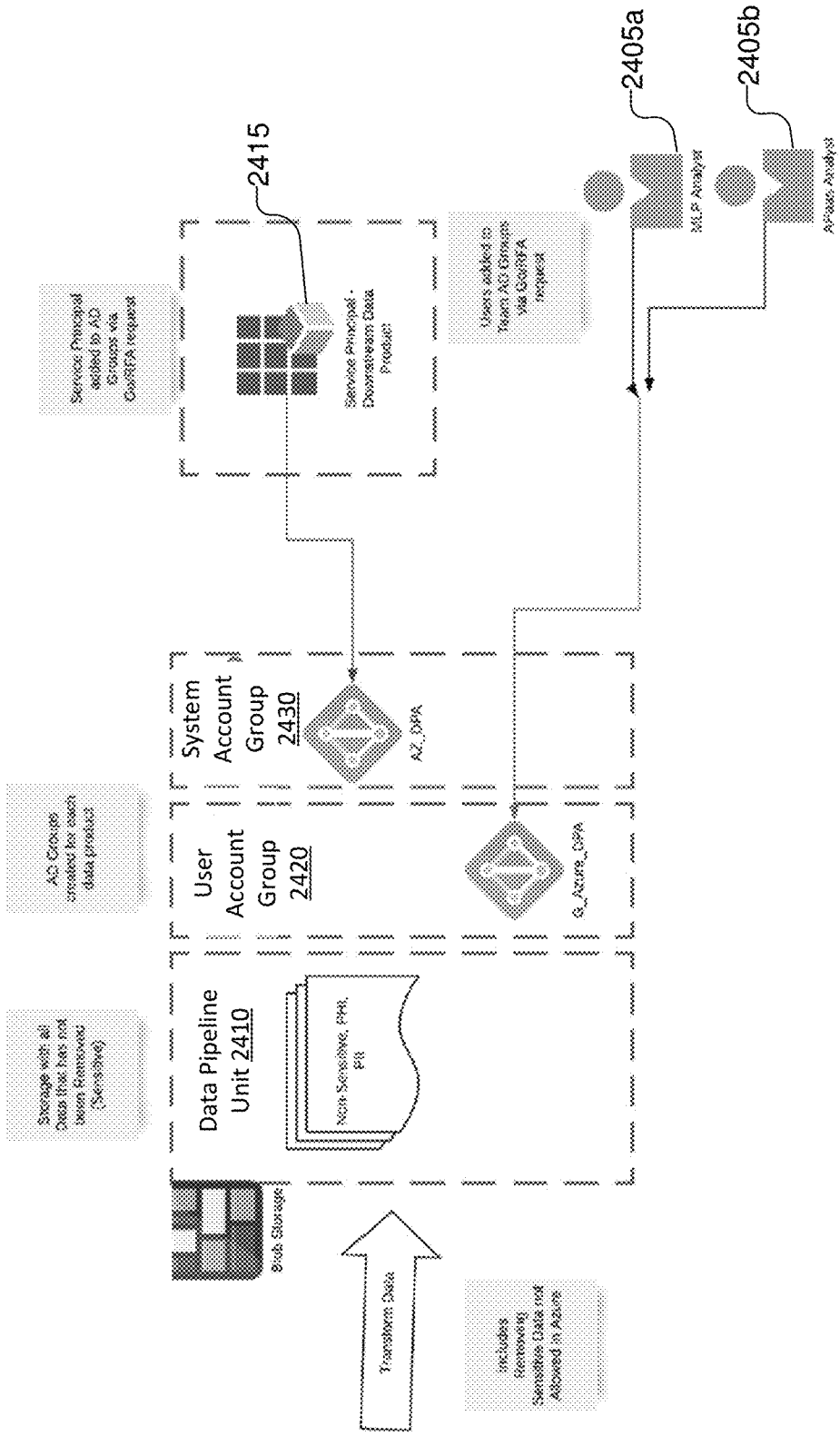
FIG. 24A-B illustrates creation of a group of accounts for each data pipeline unit for handling access control of a data pipeline according to an embodiment.
Figure 24B:
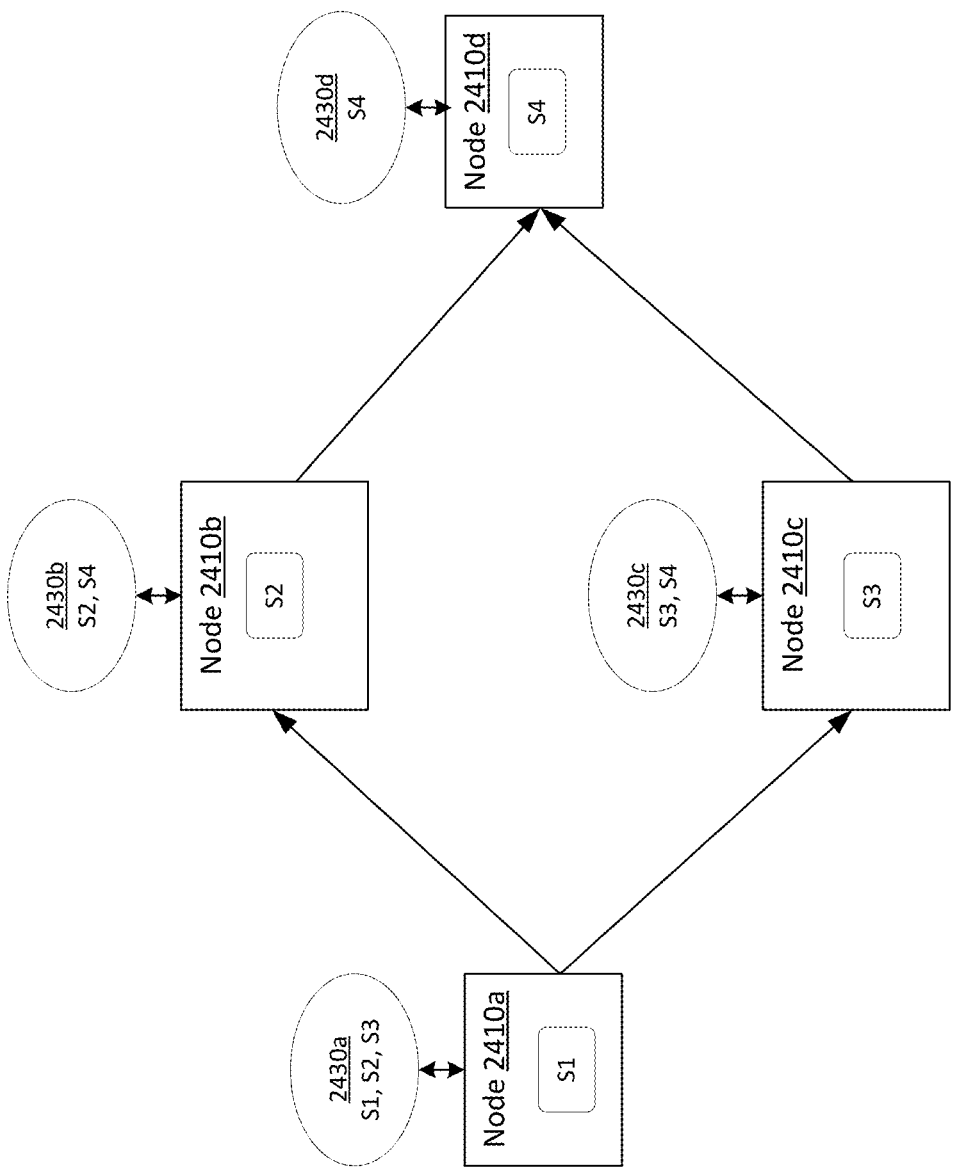

FIG. 24A-B illustrates creation of a group of accounts for each data pipeline unit for handling access control of a data pipeline according to an embodiment. A data pipeline may be represented as a data mesh of nodes and a data pipeline unit may be referred to as a node. The data pipeline unit 2410 has one or more output ports. The system creates a user account group 2420 associated with the data pipeline unit 2410. The system adds one or more user accounts 2405*a*, 2405*b* to the user account group. The user accounts 2405 represent accounts used by users or applications associated with consumer systems that use the output generated by the data pipeline unit. A user account may be used by one or more users, for example, developers, testers, or end users that use the results of execution of the data pipeline. A user account may be used by a team, i.e., a set of users that are working together. Accordingly, the system may associate at least a subset of data pipeline units with user account groups, provided the output of the data pipeline unit is used by an entity that is outside the data pipeline and is not another data pipeline unit.

The system also creates a system account group 2430 for the data pipeline unit 2410. The system adds one or more system accounts 2415 to the system account group 2430. FIG. 24B further illustrates the system account groups created for different data pipeline units 2410. FIG. 24B shows a portion of a data pipeline including the data pipeline units 2410*a*, 2410*b*, 2410*c*, and 2410*d*. Each data pipeline unit is associated with a runtime system account, for example, the data pipeline units 2410*a*, 2410*b*, 2410*c*, and 2410*d* are associated with the runtime system accounts S1, S2, S3, and S4 respectively. The output of data pipeline unit 2410*a* is provided as input to the data pipeline units 2410*b* and 2410*c*. The outputs of both data pipeline units 2410*b* and 2410*c* are provided as inputs to the data pipeline unit 2410*d*.

The system adds the runtime system account associated with a data pipeline unit to all the data pipeline units that feed data into the data pipeline unit, i.e., the data pipeline units that output data that is provided as input to the data pipeline unit. Accordingly, the runtime system account S4 of the data pipeline unit 2410*d* is added to the system account groups 2430*b* and 2430*c* associated with the data pipeline units 2410*b* and 2410*c* respectively that provide input to the data pipeline unit 2410*d*. Similarly, the runtime system accounts S2 and S3 associated with the data pipeline unit 2410*b* and 2410*c* respectively are added to the system account group 2430*a* of the data pipeline unit 2410*a* that outputs data that is input to the data pipeline unit 2410*b* and 2410*c*. Note that the system account associated with a data pipeline unit is also added to the corresponding system account group associated with the data pipeline unit. For example, the system accounts S1, S2, S3, and S4 are added to the corresponding system account groups 2430*a*, 2430*b*, 2430*c*, and 2430*d* respectively that correspond to the data pipeline units 2410*a*, 2410*b*, 2410*c*, and 2410*d* respectively.

Figure 25A:
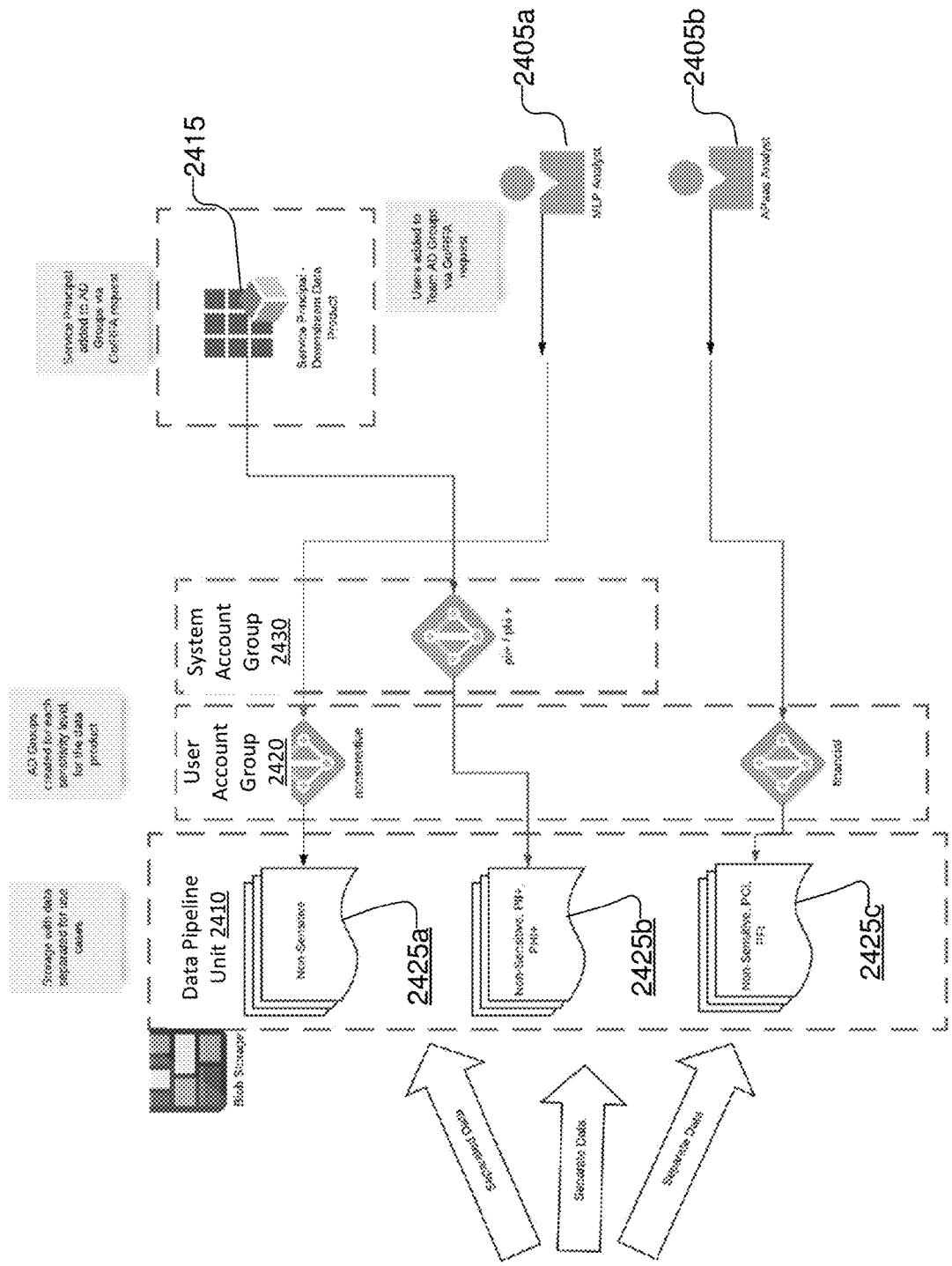
FIG. 25A-B illustrates creation of a group of accounts for each data pipeline unit and for each output port according to an embodiment.
Figure 25B:
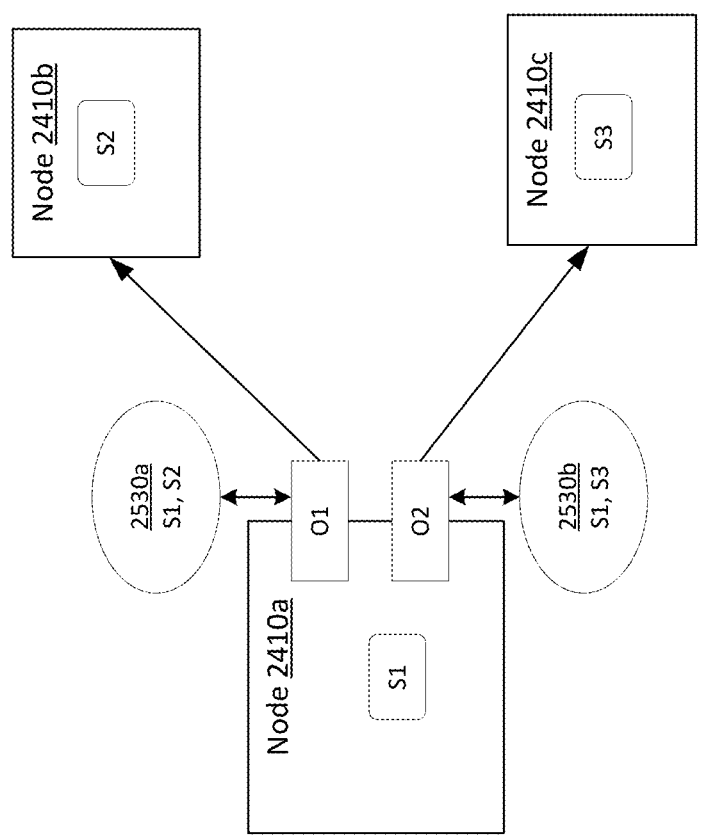

The system according to the embodiments illustrated in FIG. 24A-B creates a system account group for each data pipeline unit. The system according to another embodiment creates different system account groups for different outputs of the same data pipeline unit. FIG. 25A-B illustrates creation of a group of accounts for each data pipeline unit and for each output port according to an embodiment. As shown in FIG. 24A, the data pipeline unit 2410 includes multiple outputs 2425a, 2425b, 2425c. The system may create multiple user account groups and multiple system account groups for different outputs 2425a, 2425b, 2425c of the data pipeline unit 2410. For example, the system may create one user account group for each output of the data pipeline unit. Alternatively, the system may divide the outputs of the data pipeline unit into multiple subsets and create a user account group for each subset of the outputs. FIG. 25B shows a configuration in which the data pipeline unit 2410a has two outputs O1 and O2. The output O1 is provided as input to the data pipeline unit 2410b and the output O2 is provided as input to the data pipeline unit 2410c. The system creates a system account group 2530a for the output O1 that includes the system account S1 of the data pipeline unit 2410a and the system account S2 of the data pipeline unit 2410b. The system also creates a system account group 2530b for the output O2 that includes the system account S1 of the data pipeline unit 2410a and the system account S3 of the data pipeline unit 2410c.

Accordingly, the system adds the system accounts associated with the data pipeline units D1 that receive the data from a particular output O1 of the data pipeline unit D2 to the system account group created for that output O1 of the data pipeline unit D2. The system also adds the system account created for the data pipeline unit D2 to the system account group created for each output O1.

Figure 26A:
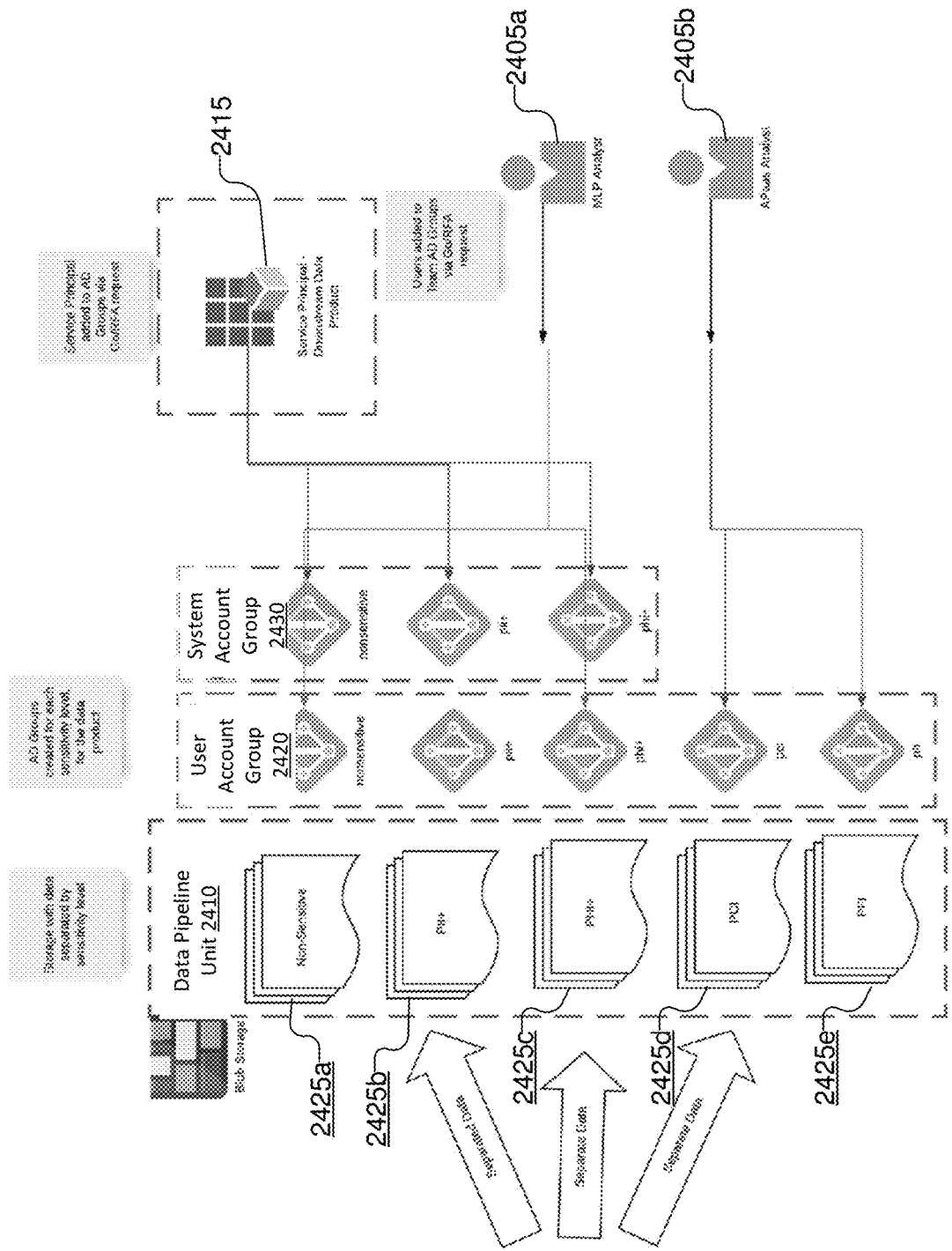
FIG. 26A-B illustrates creation of a group of accounts for each data pipeline unit, for each output port, and for different sensitivity levels of data according to an embodiment.
Figure 26B:
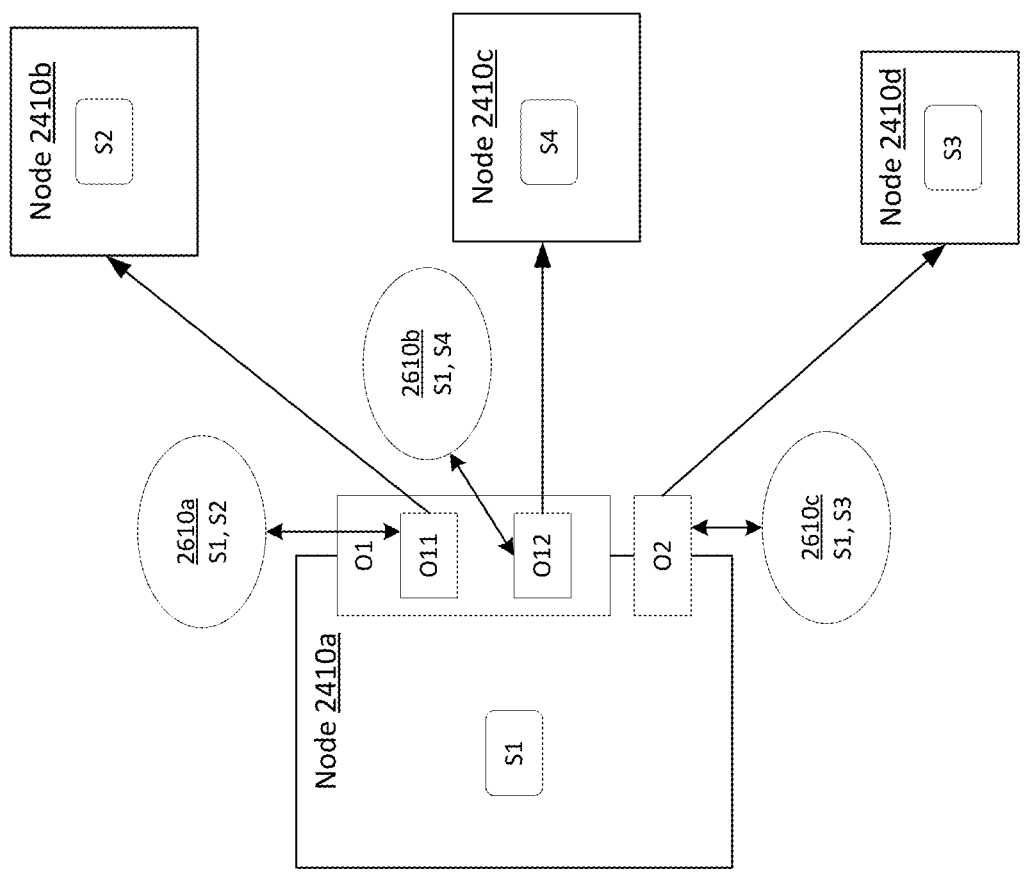

In another embodiment, a data pipeline unit generates output data that may be classified as different categories of sensitivity. For example, certain type of data may include highly sensitive information, other type of data may include less sensitive information, and another type of data may include information that is not considered sensitive. Examples of categories of sensitive information include PII representing personally identifying information, PCI representing payment card information, PHI representing protected health information, PFI representing prospective financial information, and so on. Within each example of the type of sensitive information, there may be additional categories, for example, PII and PII+, PHI and PHI+, and so on. The system may generate different system account groups or user account groups for different types of data that may be output by the data pipeline unit. FIG. 26A-B illustrates creation of a group of accounts for each data pipeline unit, for each output port, and for different sensitivity levels of data according to an embodiment.

FIG. 26A shows the different types of data that may be output by the data pipeline unit, each associated with a different category representing a level (or degree) of sensitivity of the data. For example, data 2425a is not sensitive information, data 2425b is classified as sensitivity level PII+, data 2425c is classified as sensitivity level PHI+, data 2425d is classified as sensitivity level PCI, and data 2425e is classified as sensitivity level PFI. The different subsets of data may be output by different output ports of the data pipeline unit. Alternatively, the same output port may output different types of data having different sensitivity levels. For example, FIG. 26B shows two output ports O1 and O2. The output port O1 outputs two subsets of data, O11 and O12 each having a different category of sensitive information. The subset O11 is provided as input to the data pipeline unit 2410b associated with the runtime system account S2 and the subset O12 is provided as input to the data pipeline unit 2410c associated with the runtime system account S4. The system creates system account group 2510c for the output port O2 and two system account groups 2610a and 2610b for the subsets of data O11 and O12 respectively generated by the output port O1. The system account group 2510a associated with the subset O11 of data of the output port O1 includes the system account S1 created for the data pipeline unit 2410a and the system account S2 created for the data pipeline unit 2410b. The system account group 2510b associated with the subset O12 of data of the output port O1 includes the system account S1 created for the data pipeline unit 2410a and the system account S4 created for the data pipeline unit 2410b. Accordingly, these different system account groups 2610a, 2610b are provided with access to information based on the level of sensitivity of the information output by the data pipeline unit.

ADDITIONAL CONSIDERATIONS

The techniques displayed herein can be used for various applications of data pipelines. For example, the data pipelines may process data collected from systems by instrumenting them. As another example, the data pipelines may process sensor data collected from various systems such as IoT (Internet of Things) based systems. As another example, the data pipelines may be used for an organization processing user data for assessing risk management, compliance with regulations, fraud, and so on. An example of an organization processing user data is a data pipeline for a large insurance company that has recently acquired a number of smaller insurance companies and may extract policy and claim data from the individual database systems of the smaller insurance companies, transform and validate the insurance data in some way, and provide validated and transformed data to various analytical platforms for assessing risk management, compliance with regulations, fraud, etc.

The techniques allow such data pipelines to be implemented in a distributed fashion such that various portions of the data pipeline can be upgraded independent of each other, various portions of the data pipeline may be executed independent of each other, and so on. The disclosed architecture allows collaborative processing between various users or teams working on different data pipeline units. Accordingly, the system supports distributed team ownership of different portions of a data pipeline. The system manages access control for different users and teams such that a user or team does not have access to more data than they need. This minimizes the risk of accidentally modifying data that the user is not supposed to, for example, as a result of defects in programs being developed or even as a result of security breaches. Therefore, the techniques disclosed minimize the blast radius of damage in case there is a security breach or a defect in a program being executed. Furthermore, the support for collaborative processing using multiple teams and users allows scalability in terms of having a large number of developers or teams work independently on different aspects of the data pipeline.

It is to be understood that the Figures and descriptions of the present invention have been simplified to illustrate elements that are relevant for a clear understanding of the present invention, while eliminating, for the purpose of clarity, many other elements found in a multi-tenant system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of the above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for modifying data pipelines configured on a cloud platform, the method comprising:
receiving a specification of a data pipeline comprising a plurality of data pipeline units, the data pipeline generating output representing a data model associated with an application, the data model conforming to an original interoperability schema, wherein an interoperability schema defines format for exchanging data across computer systems independent of the format of storage of the data in the computer systems;
for each data pipeline unit of the data pipeline, generating instructions for configuring the data pipeline unit on the cloud platform from the specification of the data pipeline unit;
deploying the data pipeline on the cloud platform using the generated instructions;
receiving a differential interoperability schema representing a modification to the data model associated with the application, the differential interoperability schema specifying differences compared to the original interoperability schema;
generating a set of instructions to modify the data pipeline such that the modified data pipeline generates outputs representing a modified data model conforming to a composition of the original interoperability schema and the differential interoperability schema;
reconfiguring the data pipeline on the cloud platform based on the generated instructions; and
executing the reconfigured data pipeline on the cloud platform to provide data conforming to the modified data model to the application.

2. The computer-implemented method of claim 1, wherein generating the set of instructions for modifying the data pipeline comprises:
identifying a data pipeline unit of the data pipeline that generates all elements of the modified interoperability schema, wherein the data pipeline unit generates a first set of outputs; and
modifying the identified data pipeline unit to generate a second set of outputs representing the modified data model.

3. The computer-implemented method of claim 1, wherein generating the set of instructions for modifying the data pipeline comprises:
identifying a first data pipeline unit of the data pipeline that generates a first subset of elements of the modified interoperability schema and identifying a second data pipeline unit of the data pipeline that generates a second subset of elements of the modified interoperability schema; and
generating a third data pipeline unit that receives inputs from the first data pipeline unit and the second data pipeline unit and generates a set of outputs representing the modified data model.

4. The computer-implemented method of claim 1, wherein the application is associated with events, executing the reconfigured data pipeline on the cloud platform to provide data conforming to the modified data model to the application comprises:
receiving indication of an occurrence of an event associated with the application;
receiving a filter associated with the event;
applying the filter to identify one or more records;

triggering execution of the data pipeline for the identified one or more records to generate outputs conforming to the modified data model; and providing the generated output to the application.

5. The computer-implemented method of claim 4, further comprising:

saving the generated outputs in a storage unit of one or more data pipeline units for batch processing;

receiving a request to generate a report describing events that occurred during a time interval;

generating a report, wherein the generated report describes a set of events including the event.

6. The computer-implemented method of claim 1, wherein generated instructions for the data pipeline comprise instructions for each data pipeline unit, wherein the instructions for a data pipeline unit comprise:

a system configuration for the data pipeline unit, the system configuration comprising instructions for configuring: one or more storage units on the cloud platform, a cluster of servers for execution of the data pipeline unit on the cloud platform, and one or more processing engines for executing instructions of the data pipeline unit, and a deployment package comprising: data flow instructions for orchestrating the flow of data across resources of the data pipeline unit, and a transformation processing instructions package for performing the one or more data transformations of the data pipeline unit.

7. The computer-implemented method of claim 1, wherein an output of the data pipeline is one of:

a data stream that provides data elements at various time intervals; or a batch input that provides a data set comprising a plurality of data elements at one point in time.

8. The computer-implemented method of claim 1, wherein the differential interoperability schema is a first differential interoperability schema, the modification to the data model is a first modification to the data model, the set of instructions is a first set of instructions, and the modified data model is a first modified data model:

receiving a second differential interoperability schema representing a second modification to the data model associated with the application, the second differential interoperability schema specifying differences compared to the original interoperability schema;

generating a second set of instructions to modify the data pipeline such that the modified data pipeline generates outputs representing a second modified data model conforming to a composition of the original interoperability schema and the second differential interoperability schema;

reconfiguring the data pipeline on the cloud platform based on the second set of generated instructions; and executing the reconfigured data pipeline on the cloud platform to provide data conforming to both the first modified data model and the second modified data model.

9. The computer-implemented method of claim 1, wherein the differential interoperability schema specifies a uniform resource locator (URL) identifying a set of values for an element, wherein generating the set of instructions comprises:

generating a transformation for a data pipeline unit, wherein the transformation excludes records that have elements outside the set of values.

10. The computer-implemented method of claim 1, wherein the differential interoperability schema specifies a uniform resource locator (URL) specifying a procedure associated with an element specified in the original interoperability schema, wherein generating the set of instructions comprises:

generating a transformation for a data pipeline unit, wherein the transformation applies the procedure to data of the element.

11. The computer-implemented method of claim 1, wherein the original interoperability schema specifies a first data type for an element, and the differential schema specifies a second data type for the element, wherein generating the set of instructions comprises:

generating a transformation for a data pipeline unit, wherein the transformation converts data of the element from the first data type to the second data type.

12. The computer-implemented method of claim 1, wherein the differential interoperability schema specifies a specifying a regular expression representing a constraint for an element, wherein generating the set of instructions comprises:

generating a transformation for a data pipeline unit, wherein the transformation excludes records that fail to match the regular expression.

13. The computer-implemented method of claim 1, wherein the differential interoperability schema specifies a maximum size for an element to be zero, wherein generating the set of instructions comprises:

generating a transformation for a data pipeline unit, wherein the transformation excludes the element from the output.

14. A non-transitory computer readable storage medium storing instructions that when executed by a computer processor, cause the computer processor to perform steps for modifying data pipelines configured on a cloud platform, the steps comprising:

receiving a specification of a data pipeline comprising a plurality of data pipeline units, the data pipeline generating output representing a data model associated with an application, the data model conforming to an original interoperability schema, wherein an interoperability schema defines format for exchanging data across computer systems independent of the format of storage of the data in the computer systems;

for each data pipeline unit of the data pipeline, generating instructions for configuring the data pipeline unit on the cloud platform from the specification of the data pipeline unit;

deploying the data pipeline on the cloud platform using the generated instructions;

receiving a differential interoperability schema representing a modification to the data model associated with the application, the differential interoperability schema specifying differences compared to the original interoperability schema;

generating a set of instructions to modify the data pipeline such that the modified data pipeline generates outputs representing a modified data model conforming to a composition of the original interoperability schema and the differential interoperability schema;

reconfiguring the data pipeline on the cloud platform based on the generated instructions; and executing the reconfigured data pipeline on the cloud platform to provide data conforming to the modified data model to the application.

15. The non-transitory computer readable storage medium of claim 14, wherein instructions for generating the set of instructions for modifying the data pipeline cause the computer processor to perform steps comprising:

identifying a data pipeline unit of the data pipeline that generates all elements of the modified interoperability schema, wherein the data pipeline unit generates a first set of outputs; and modifying the identified data pipeline unit to generate a second set of outputs representing the modified data model.

16. The non-transitory computer readable storage medium of claim 14, wherein instructions for generating the set of instructions for modifying the data pipeline cause the computer processor to perform steps comprising:

identifying a first data pipeline unit of the data pipeline that generates a first subset of elements of the modified interoperability schema and identifying a second data pipeline unit of the data pipeline that generates a second subset of elements of the modified interoperability schema; and generating a third data pipeline unit that receives inputs from the first data pipeline unit and the second data pipeline unit and generates a set of outputs representing the modified data model.

17. The non-transitory computer readable storage medium of claim 14, wherein the application is associated with events, executing the reconfigured data pipeline on the cloud platform to provide data conforming to the modified data model to the application comprises, wherein the instructions further cause the computer processor to perform steps comprising:

receiving indication of an occurrence of an event associated with the application;

receiving a filter associated with the event;

applying the filter to identify one or more records;

triggering execution of the data pipeline for the identified one or more records to generate outputs conforming to the modified data model; and providing the generated output to the application.

18. The non-transitory computer readable storage medium of claim 17, wherein the instructions further cause the computer processor to perform steps comprising:

saving the generated outputs in a storage unit of one or more data pipeline units for batch processing;

receiving a request to generate a report describing events that occurred during a time interval; and generating a report, wherein the generated report describes a set of events including the event.

19. The non-transitory computer readable storage medium of claim 14, wherein the differential interoperability schema is a first differential interoperability schema, the modification to the data model is a first modification to the data model, the set of instructions is a first set of instructions, and the modified data model is a first modified data model, wherein the instructions further cause the computer processor to perform steps comprising:

receiving a second differential interoperability schema representing a second modification to the data model associated with the application, the second differential interoperability schema specifying differences compared to the original interoperability schema;

generating a second set of instructions to modify the data pipeline such that the modified data pipeline generates outputs representing a second modified data model conforming to a composition of the original interoperability schema and the second differential interoperability schema;

reconfiguring the data pipeline on the cloud platform based on the second set of generated instructions; and executing the reconfigured data pipeline on the cloud platform to provide data conforming to both the first modified data model and the second modified data model.

20. A computing system comprising:

a computer processor; and a non-transitory computer readable storage medium storing instructions that when executed by a computer processor, cause the computer processor to perform steps of a computer-implemented method for modifying data pipelines configured on a cloud platform, the steps comprising:

receiving a specification of a data pipeline comprising a plurality of data pipeline units, the data pipeline generating output representing a data model associated with an application, the data model conforming to an original interoperability schema, wherein an interoperability schema defines format for exchanging data across computer systems independent of the format of storage of the data in the computer systems;

for each data pipeline unit of the data pipeline, generating instructions for configuring the data pipeline unit on the cloud platform from the specification of the data pipeline unit;

deploying the data pipeline on the cloud platform using the generated instructions;

receiving a differential interoperability schema representing a modification to the data model associated with the application, the differential interoperability schema specifying differences compared to the original interoperability schema;

generating a set of instructions to modify the data pipeline such that the modified data pipeline generates outputs representing a modified data model conforming to a composition of the original interoperability schema and the differential interoperability schema;

reconfiguring the data pipeline on the cloud platform based on the generated instructions; and executing the reconfigured data pipeline on the cloud platform to provide data conforming to the modified data model to the application.

* * * * *